US006852667B2

(12) United States Patent
Hibi et al.

(10) Patent No.: US 6,852,667 B2
(45) Date of Patent: Feb. 8, 2005

(54) PROCESS FOR PRODUCING CHLORINE

(75) Inventors: Takuo Hibi, Ichihara (JP); Hiroaki Abekawa, Sodegaura (JP); Kohei Seki, Chiba (JP); Tatsuya Suzuki, Niihama (JP); Tetsuya Suzuta, Ichihara (JP); Kiyoshi Iwanaga, Ichihara (JP); Takahiro Oizumi, Sendai (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/249,100

(22) Filed: Feb. 12, 1999

(65) Prior Publication Data

US 2002/0028173 A1 Mar. 7, 2002

(30) Foreign Application Priority Data

| Feb. 16, 1998 | (JP) | 10-032677 |
|---|---|---|
| Feb. 25, 1998 | (JP) | 10-043292 |
| Mar. 5, 1998 | (JP) | 10-053366 |
| Mar. 5, 1998 | (JP) | 10-053367 |
| Mar. 26, 1998 | (JP) | 10-079034 |
| Apr. 7, 1998 | (JP) | 10-094680 |
| Apr. 10, 1998 | (JP) | 10-099615 |
| Apr. 21, 1998 | (JP) | 10-110618 |
| May 12, 1998 | (JP) | 10-128709 |

(51) Int. Cl.$^7$ ............ C01B 7/04; B01J 23/46; B01J 37/00; B01J 21/06
(52) U.S. Cl. ........ 502/325; 423/502; 423/507
(58) Field of Search ........ 502/325; 423/502, 423/507

(56) References Cited

U.S. PATENT DOCUMENTS

| 3,873,469 A | | 3/1975 | Foster et al. | |
| 4,134,776 A | * | 1/1979 | Rieger et al. | 106/417 |
| 4,177,101 A | * | 12/1979 | Evans | 502/202 |
| 4,585,540 A | * | 4/1986 | Beer et al. | 502/325 |
| 4,647,592 A | * | 3/1987 | Mauldin | 502/325 |
| 4,847,231 A | | 7/1989 | Grätzel et al. | 502/74 |
| 5,387,726 A | * | 2/1995 | Bankmann et al. | 568/814 |
| 5,527,755 A | * | 6/1996 | Wenski et al. | 502/325 |
| 5,663,112 A | | 9/1997 | Ahn et al. | 502/304 |
| 5,871,707 A | * | 2/1999 | Hibi et al. | 423/502 |
| 5,908,607 A | * | 6/1999 | Abekawa et al. | 423/502 |
| 6,001,768 A | * | 12/1999 | Buysch et al. | 502/325 |

FOREIGN PATENT DOCUMENTS

| DE | 1567 788 | 5/1970 |
| EP | 0 184 413 | 6/1986 |
| EP | 0 455 491 A2 | 11/1991 |
| EP | 0 761 307 | 3/1997 |
| EP | 0 761593 | 3/1997 |
| EP | 0 761 594 | 3/1997 |
| GB | 1046313 | 10/1966 |
| GB | 1 583 571 | 1/1981 |
| JP | 43-805 | 1/1967 |
| JP | 8-225304 | 9/1996 |
| NL | 197 34412 A1 | 2/1998 |

OTHER PUBLICATIONS

Patent Abstracts of Japan [CD–ROM], JP 06–171907, published Jun. 21, 1994.
Patent Abstracts of Japan, vol. 12, No. 117 (C–487), JP 62-241805, published Oct. 22, 1987.
P. Ruterana et al., "Selective Dispersion of the Ru–RuO$_x$/TiO$_2$ Catalyst For Methanation of CO$_2$ At Room Temperature And Atmospheric Pressure", *Mat. Res. Soc. Symp. Proc.*, vol. 139, 1989, pp. 327–332, no month.
Michael R. Prairie et al., "A Fourier Transform Infrared Spectroscopic Study of CO$_2$ Methanation on Supporeted Ruthenium", *Journal of Catalysis*, vol. 129, 1991, pp. 130–144, no month.
N. M. Gupta et al., "FtiR Spectroscopic Study of the Interaction of CO$_2$ and CO$_2$ – H$_2$ over Partially Oxidized Ru/TiO$_2$ Catalyst", *Journal of Catalysts*, vol. 146, 1994, pp. 173–184, no month.
S. Imamuara et al., "Decomposition of Carbon Tetrachloride by Noble Metal Supported Titaniasilica Catalysts", *Catalysis Society of Japan (CATSJ)*, Jun. 1995, pp. 30–31.
S. Imamuara et al., "Decomposition of 1,2 Dichloroethane By Ruthenium–Supported Titaniasilica Catalyst", *38$^{th}$ CATSJ Meeting*, 1996, pp. 193–194, no month.
K. Ravindranathan et al., "Efficient and Selective Supported Catalysts for Methanation Reactions at Room Temperature and Atmospheric Pressure", Institute de Chimie Physique, Ecole Polytechnique Federale de Lausanne, pp. 837–844.

* cited by examiner

Primary Examiner—Ngoc-Yen Nguyen
(74) Attorney, Agent, or Firm—Sughrue Mion, PLLC

(57) ABSTRACT

A process for producing chlorine by oxidizing hydrogen chloride with oxygen. The process uses various supported ruthenium catalysts or a catalyst system containing (A) an active component of a catalyst and (B) a compound having thermal conductivity of a solid phase measured by at least one point within a range from 200 to 500° C. of not less than 4 W/m. ° C.

7 Claims, 8 Drawing Sheets

Horizontally cutting plane

Vertically cutting plane

Cumulative Intrusion vs Radius

Figure 1:
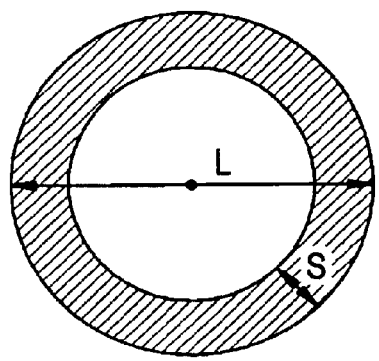

+ Cumulative Intrusion
o Log Differential Intrusion

Cumulative Intrusion vs Radius

+ Cumulative Intrusion
○ Log Differential Intrusion

PROCESS FOR PRODUCING CHLORINE

BACKGROUND OF THE INVENTION

1. Field of the Invention

The present invention relates to a process for producing chlorine. More particularly, the present invention relates to a process for producing chlorine by oxidizing hydrogen chloride with oxygen, wherein said process can produce chlorine by using a catalyst having high activity in a smaller amount at a lower reaction temperature. The above invention also relates to a process for producing chlorine by oxidizing hydrogen chloride, wherein said process can facilitate control of the reaction temperature by making it easy to remove the reaction heat from catalyst bed using a catalyst having good thermal conductibility, which can be formed by containing a compound having high thermal conductivity of a solid phase, and can achieve high reaction conversion by keeping the whole catalyst bed at sufficient temperature for industrially desirable reaction rate.

The present invention also relates to a process for producing a supported ruthenium oxide catalyst. More particularly, the present invention relates to a process for producing a supported ruthenium oxide catalyst, wherein said process is a process for producing a catalyst having high activity and can produce a catalyst having high activity capable of producing the desired compound by using a smaller amount of the catalyst at a lower reaction temperature.

Furthermore, the present invention relates to a supported ruthenium oxide catalyst. The present invention relates to a supported ruthenium oxide catalyst, wherein said catalyst has high activity and can produce the desired compound by using a smaller amount of the catalyst at a lower reaction temperature.

2. Description of the Related Art

It is well known that chlorine is useful as a raw material of vinyl chloride, phosgene, etc., and can be produced by oxidizing hydrogen chloride. For example, the Deacon reaction by using a Cu catalyst is well known. For example, British Patent No. 1,046,313 discloses a process for oxidizing hydrogen chloride by using a catalyst containing a ruthenium compound, and also discloses that ruthenium (III) chloride is particularly effective among the ruthenium compounds. Furthermore, a process for supporting a ruthenium compound on a carrier is also disclosed and, as the carrier, silica gel, alumina, pumice and ceramic material are exemplified. As the Example, a ruthenium chloride catalyst supported on silica is exemplified. However, a test was conducted using a catalyst prepared by using a process for preparing a ruthenium (III) chloride supported on silica disclosed in said patent publication. As a result, the ruthenium compound as a catalyst component is drastically volatilized and it was disadvantageous for industrial use. For example, European Patent EP-0184413A2 discloses a process for oxidizing hydrogen chloride by using a chromium oxide catalyst. However, conventionally known processes had a problem that the activity of the catalyst is insufficient and high reaction temperature is required.

When the activity of the catalyst is low, a higher reaction temperature is required but the reaction of oxidizing hydrogen chloride with oxygen to produce chlorine is an equilibrium reaction. When the reaction temperature is high, it becomes disadvantageous in view of equilibrium and the equilibrium conversion of hydrogen chloride decreases. Therefore, when the catalyst has high activity, the reaction temperature can be decreased and, therefore, the reaction becomes advantageous in view of equilibrium and higher conversion of hydrogen chloride can be obtained. In case of the high reaction temperature, the activity is lowered by volatilization of the catalyst component. Also in this point of view, it has been required to develop a catalyst which can be used at low temperature.

Both high activity per unit weight of catalyst and high activity per unit weight of ruthenium contained in the catalyst are required to the catalyst, industrially. Since high activity per unit weight of ruthenium contained in the catalyst can reduces the amount of ruthenium contained in the catalyst, it becomes advantageous in view of cost. It is possible to select the reaction condition which is more advantageous in view of equilibrium by conducting the reaction at a lower temperature using a catalyst having high activity. It is preferred to conduct the reaction at a lower temperature in view of stability of the catalyst.

The catalyst used in the oxidizing reaction of hydrogen chloride includes, for example, a supported ruthenium oxide catalyst prepared by supporting ruthenium chloride on a carrier, drying the supported one, heating in a hydrogen gas flow to form a supported metal ruthenium catalyst, and oxidizing the catalyst. When ruthenium chloride is reduced with hydrogen, sintering of ruthenium occurs, which results in decrease of activity of the resulting catalyst.

A process for preparing ruthenium oxide supported on a carrier without causing sintering of ruthenium during the preparation step of a catalyst is preferred. First, a process has been desired which is not a process for reducing at high temperature by using hydrogen, but a process for preparing ruthenium oxide on a carrier with preventing sintering by treating a ruthenium compound with a mixture of a basic compound and a reducing compound, or a mixture of an alkali compound and a reducing compound, and oxidizing the treated one.

Second, a process has been desired which is a process for preparing ruthenium oxide on a carrier with preventing sintering by oxidizing after passing through a state of an oxidation number of 1 to less than 4 valence without preparing a ruthenium compound having an oxidation number of 0 valence by completely reduction Third, it has been desired to develop a catalyst preparing process which can obtain a highly active hydrogen chloride oxidizing catalyst by passing through a preparation of a highly dispersed supported metal ruthenium catalyst, when the preparation is carried out by supporting a ruthenium compound on a carrier, reducing the supported one in order to prepare supported metal ruthenium catalyst, and oxidizing to prepare a supported ruthenium oxide catalyst.

A supported ruthenium oxide catalyst obtained by using an anatase crystalline or non-crystalline titanium oxide as a carrier was highly active to oxidation of hydrogen chloride, but it has been required to develop a catalyst having higher activity.

In the case of a conventional carrier which the content of an OH group on the surface of titanium oxide is too large or small, a catalyst having high activity was not obtained and the catalytic activity decreased sometimes as time passed.

When the oxidizing reaction of hydrogen chloride is conducted at a higher reaction rate with conventionally known catalysts, heat generated as a result of the high reaction rate can not be sufficiently removed and the temperature of the catalyst bed increases locally and, therefore, the reaction temperature can not be easily controlled.

Furthermore, when the reaction is conducted by using these catalysts, a large temperature distribution occurs in the catalyst bed and it is impossible to keep the whole system at sufficient temperature for industrially desirable reaction rate without exceeding upper temperature limit for keeping high catalyst activity. Therefore, the reaction conversion is lowered.

As a process for increasing the rate of removing heat generated during the reaction, for example, a process for increasing a heat transfer area in contact with external coolant per volume of the catalyst bed is known. However, when the heat transfer area becomes large, the cost of a reactor increases. On the other hand, when heat is removed by cooling the catalyst bed from outside, heat transfers to an external coolant through the catalyst bed and the heat transfer surface. When the thermal conductivity of the catalyst is improved, the heat removing rate increases. Therefore, it has been required to develop a catalyst having good thermal conductibility, which can increase the heat removing rate, to avoid difficulty of control of the reaction temperature.

It is generally considered that, when a carrier supporting an active component of the catalyst is mixed with an inactive component at the ratio of 1:1, the activity per volume or per weight reduced to half. Therefore, it is required to develop a catalyst having good thermal conductivity as described above and further to develop a catalyst having high activity which the activity of the catalyst per volume or per weight does not decrease.

It is known that, since a supported catalyst is generally prepared by supporting on a carrier having porediameters of from 30 to 200 angstroms, the rate-determining step of the reaction is controlled by the catalyst pore diffusion control and it is difficult to improve the activity of the catalyst. Therefore, it has been required to develop a catalyst having macropores which the inside of the catalytic particles can be utilized.

As a result, since the reaction proceeds in the vicinity of the outer surface of the catalytic particles, it is considered that ruthenium oxide supported on the outer surface of the carrier is used in the reaction but ruthenium oxide supported in the catalytic particles is not used in the reaction. Therefore, it has been required to develop a catalyst obtained by supporting ruthenium oxide on the outer surface of the catalyst.

It is also known that a ruthenium oxide catalyst is useful as a catalyst in process for preparing chlorine by an oxidizing reaction of hydrogen chloride and is obtained by hydrolyzing ruthenium chloride, oxidizing the hydrolyzed one, and calcining the oxidized one. For example, European patent EP-0743277A1 discloses that a ruthenium oxide catalyst supported on titanium oxide is obtained by hydrolyzing a ruthenium compound by using an alkali metal hydroxide, supporting the hydrolyzed one on titanium hydroxide, and calcining the supported one under air. The present inventors have found that the supported ruthenium oxide catalyst is obtained by oxidizing a supported metal ruthenium catalyst. As a process for preparing the supported metal ruthenium catalyst, for example, it is known that a process for preparing a supported metal ruthenium catalyst by supporting ruthenium chloride on a carrier, drying the supported one, and heating the dried one in a hydrogen gas flow. However, there was a problem that a supported ruthenium oxide catalyst prepared by oxidizing a catalyst reduced by hydrogen has low activity due to sintering of ruthenium when ruthenium chloride is reduced with hydrogen.

A process for preparing ruthenium oxide supported on a carrier with preventing sintering has been required. First, a process has been desired which is not a process for reducing at high temperature by using hydrogen, but for treating a ruthenium compound with a mixture of a reducing compound and a basic compound, or a mixture of an alkali compound and a reducing compound, and oxidizing the treated one.

Second, a process has been desired which is a process for preparing ruthenium oxide on a carrier with preventing sintering by oxidizing after passing through a state of an oxidation number of 1 to less than 4 valence without preparing a ruthenium compound having an oxidation number of 0 valence by completely reduction.

In general, it is difficult to reduce the ruthenium compound with a reducing compound, unlike platinum and palladium. For example, because of this, there is a problem that a supported ruthenium oxide catalyst prepared by oxidizing after adding hydrazine to ruthenium chloride has low activity because of a formation of complex by adding hydrazine to ruthenium chloride.

A supported ruthenium oxide catalyst obtained by using an anatase crystalline or non-crystalline titanium oxide as a carrier was highly active to oxidation of hydrogen chloride, but it has been required to develop a catalyst having higher activity.

In the case of a content of an OH group on the surface of titanium oxide which is a conventional carrier is too large or small, a catalyst having high activity was not obtained and the catalytic activity decreased sometimes as time passed.

It is known that the rate-determining step of the reaction is under the catalyst pore diffusion control and it is difficult to improve the activity of the catalyst since a supported catalyst is generally prepared by supporting on a carrier having pore diameters of from 30 to 200 angstroms. As a result, it is considered that ruthenium oxide supported on the outer surface of the carrier is used in the reaction but ruthenium oxide supported in the catalytic particles is not used in the reaction since the reaction proceeds in the vicinity of the outer surface of the catalytic particles. Therefore, it has been required to develop a technique for supporting ruthenium oxide on the outer surface of the catalyst.

SUMMARY OF THE INVENTION

It is an object of the present invention is to provide a process for producing chlorine by oxidizing hydrogen chloride with oxygen, wherein said process can produce chlorine by using a catalyst having high activity in a smaller amount at a lower reaction temperature. One of the above object of the present invention to provide a process for producing chlorine by oxidizing hydrogen chloride, wherein said process can facilitate control of the reaction temperature by making it easy to remove the reaction heat from catalyst bed using a catalyst having good thermal conductivity, which can be formed by containing a compound having high thermal conductivity in solid phase, and can attain high reaction conversion by keeping the whole catalyst bed at sufficient temperature for industrially desirable reaction rate capable of oxidizing hydrogen chloride.

It is still another object of the present invention to provide a process for producing a supported ruthenium oxide catalyst, characterized in that said process is a process for producing a catalyst having high activity and can produce a catalyst having high activity capable of the desired compound using a smaller amount of a catalyst at a lower reaction temperature.

It is a further object of the present invention to provide a supported ruthenium oxide catalyst, characterized in that said catalyst has high activity and can produce the desired compound using a smaller amount of a catalyst at a lower reaction temperature.

That is, the present invention relates to a process for producing chlorine by oxidizing hydrogen chloride with oxygen, wherein said process uses one catalyst selected from the following catalysts (1) to (9):

(1) a supported ruthenium oxide catalyst obtained by the steps which comprises supporting a ruthenium compound on a carrier, treating the supported one by using a basic compound, treating by using a reducing compound, and oxidizing;

(2) a supported ruthenium oxide catalyst obtained by the steps which comprises supporting a ruthenium compound on a carrier, treating the supported one by using a reducing agent to form ruthenium having an oxidation number of 1 to less than 4 valence, and oxidizing;

(3) a supported ruthenium oxide catalyst obtained by the steps which comprises supporting a ruthenium compound on a carrier, reducing the supported one by using a reducing hydrogenated compound, and oxidizing;

(4) a supported ruthenium oxide catalyst obtained by using titanium oxide containing rutile titanium oxide as a carrier;

(5) a supported ruthenium oxide catalyst obtained by the steps which comprises supporting a ruthenium compound on a carrier, treating the supported one by using a reducing compound or reducing agent in a liquid phase, and oxidizing, wherein titanium oxide contains an OH group in an amount of $0.1 \times 10^{-4}$ to $30 \times 10^{-4}$ (mol/g-carrier) per unit weight of a carrier;

(6) a catalyst system containing the following components (A), and not less than 10% by weight of component (B):

(A) an active component of catalyst;

(B) a compound wherein thermal conductivity of a solid phase measured by at least one point within a range from 200 to 500° C. is not less than 4 W/m. ° C.;

(7) a supported ruthenium oxide catalyst having a macro pore with a pore radius of 0.03 to 8 micrometer;

(8) an outer surface-supported catalyst obtained by supporting ruthenium oxide on a carrier at the outer surface; and (9) a supported ruthenium catalyst obtained by using chromium oxide as a carrier.

The present invention also relates to a process for producing a supported ruthenium oxide catalyst selected from the following processes (1) to (5):

(1) a process for producing a supported ruthenium oxide catalyst, which comprises the steps of supporting a ruthenium compound on a carrier, treating the supported one by using a basic compound, treating by using a reducing compound, and oxidizing;

(2) a process for producing a supported ruthenium oxide catalyst, which comprises the steps of supporting a ruthenium compound on a carrier, treating the supported one by using a reducing compound to form ruthenium having an oxidation number of 1 to less than 4 valence, and oxidizing;

(3) a process for producing a supported ruthenium oxide catalyst, which comprises the steps of supporting a ruthenium compound on a titanium oxide carrier containing rutile titanium oxide, treating the supported one by using a reducing agent, and oxidizing;

(4) a process for producing a supported ruthenium oxide catalyst, which comprises the steps of supporting a ruthenium compound on a titanium oxide carrier containing an OH group in an amount of $0.1 \times 10^{-4}$ to $30 \times 10^{-4}$ (mol/g-carrier) per unit weight of a carrier, treating the supported one by using a reducing agent, and oxidizing; and (5) a process for producing a supported ruthenium oxide catalyst containing ruthenium oxide only at an outer surface layer, not less than 80% of the outer surface of said catalyst satisfying the following expression (1):

$$S/L < 0.35 \tag{1}$$

wherein L is a distance between a point (A) and a point (B), said point (B) being a point formed on the surface of a catalyst when a perpendicular line dropped from any point (A) on the surface of the catalyst to the inside of the catalyst goes out from the catalyst at the opposite side of the point (A), and s is a distance between the point (A) and a point (C), said point (C) being a point on the perpendicular line where ruthenium oxide does not exist, wherein said process comprises supporting an alkali on a carrier, supporting at least one ruthenium compound selected from the group consisting of ruthenium halide, rutheniumoxy chloride, ruthenium-acetylacetonato complex, ruthenium organic acid salt and ruthenium-nitrosyl complex on the carrier, treating by using a reducing agent, and oxidizing.

The present invention also relates to a supported ruthenium oxide catalyst obtained by supporting on a titanium oxide carrier containing not less than 20% by weight of rutile titanium oxide.

DESCRIPTION OF THE PREFERRED EMBODIMENTS

The supported ruthenium oxide catalyst (1) used in the present invention is a supported ruthenium oxide catalyst obtained by the steps which comprises supporting a ruthenium compound on a carrier, treating the supported one by using a basic compound, treating by using a reducing compound, and oxidizing the resulting one In general, said catalyst is industrially used in the form of being supported on a carrier.

The supported ruthenium oxide catalyst (2) used in the present invention is a supported ruthenium oxide catalyst obtained by the steps which comprises supporting a ruthenium compound on a carrier, treating the supported one by using a reducing agent to form ruthenium having an oxidation number of 1 to less than 4 valence, and oxidizing the resulting one.

The process for preparing the supported ruthenium oxide catalyst used in the oxidizing reaction of hydrogen chloride include various processes. For example, a process for preparing a catalyst comprising ruthenium oxide having an oxidation number of 4 valence supported on a carrier can be prepared by supporting ruthenium chloride on a carrier, hydrolyzing the supported one by using an alkali, and calcining under an air. Alternatively, a process for preparing a catalyst comprising supported ruthenium oxide having an oxidation number of 4 valence can also be prepared by supporting ruthenium chloride on a carrier, reducing the supported one by using various reducing agents to form ruthenium having a valence of 0, and calcining under an air. It is also possible to exemplify a preparation example of a supported ruthenium oxide catalyst comprising supported ruthenium oxide having an oxidation number of 4, which is prepared by supporting ruthenium chloride on a carrier, treating the supported one by using a mixed solution of various reducing compounds and basic compounds, or treating by using an aqueous alkali solution of a reducing compound, or treating by using various reducing agents, thereby to form a ruthenium compound having an oxidation number of 1 to less than 4 valence, and calcining under an air. The catalyst prepared by this preparation process can be exemplified as a preparation example which is most active to the oxidizing reaction of hydrogen chloride. The process of adjusting the oxidation number of the ruthenium compound supported on the carrier within a range from 1 to less than 4 valence includes various processes, for example, process of treating by using a mixed solution of a reducing compound and a basic compound, process of treating by using an alkali solution of a reducing compound, process of treating by using an organolithium compound, an organosodium compound or an organopotassium compound, process of treating by using an organoaluminum compound, process of treating by using an organomagnesium compound, and process of treating by using hydrogen. When using these reducing agents in an excess amount, the ruthenium compound is reduced to the valence of 0 and, therefore, it is necessary to use a suitable amount.

The process of measuring the oxidation number of the supported ruthenium includes various processes. For example, since nitrogen is mainly generated when using hydrazine as the reducing agent, the valence number of ruthenium can be determined by the amount of nitrogen generated.

The reaction scheme will be shown below.

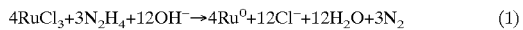

or

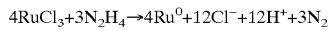

For example, when the ruthenium compound is reduced by using hydrazine under the conditions of an aqueous alkali solution, a hydroxide of ruthenium is formed. Therefore, the oxidation number of ruthenium can be determined by measuring a ratio of ruthenium to oxygen or chlorine binding to ruthenium due to elemental analysis after dehydration under vacuum. When using ruthenium chloride as the ruthenium compound, a hydroxide and a chloride of ruthenium are formed. Therefore, the oxidation number of ruthenium can also be determined by measuring a ratio of ruthenium to oxygen and chlorine binding to ruthenium due to elemental analysis after dehydration under vacuum.

In the present invention, the oxidation number of ruthenium was determined from the amount of nitrogen generated by using the scheme (1).

The common part with the catalysts (1) and (2) will be explained.

The carrier includes, for example, oxides and mixed oxides of elements, such as titanium oxide, alumina, zirconium oxide, silica, titanium mixed oxide, zirconium mixed oxide, aluminum mixed oxide, silicon mixed oxide and the like. Preferable carriers are titanium oxide, alumina, zirconium oxide and silica, and more preferable carrier is titanium oxide.

The ruthenium compound to be supported on the carrier include compounds, for example, ruthenium chloride such as $RuCl_3$ and $RuCl_3$ hydrate; chlororuthenate such as $K_3RuCl_6$, $[RuCl_6]^{3-}$ and $K_2RuCl_6$; chlororuthenate hydrate such as $[RuCl_5(H_2O)_4]^{2-}$ and $[RuCl_2(H_2O)_4]^+$; salt of ruthenic acid, such as $K_2RuO_4$; rutheniumoxy chloride such as $Ru_2OCl_4$, $Ru_2OCl_5$ and $Ru_2OCl_6$; salt of rutheniumoxy chloride, such as $K_2Ru_2OCl_{10}$ and $CsRu_2OCl_4$; ruthenium-ammine complex such as $[Ru(NH_3)_6]^{2+}$, $[Ru(NH_3)_6]^{3+}$ and $[Ru(NH_3)_5H_2O]^{2+}$; chloride and bromide of ruthenium-ammine complex, such as $[Ru(NH_3)_5Cl]^{2+}$, $[Ru(NH_3)_6]Cl_2$, $[Ru(NH_3)_6]Cl_3$ and $[Ru(NH_3)_6]Br_3$; ruthenium bromide such as $RuBr_3$ and $RuBr_3$ hydrate; other ruthenium-organoamine complex; ruthenium-acetylacetonato complex; ruthenium-carbonyl complex such as $Ru(CO)_5$ and $Ru_3(CO)_{12}$; ruthenium organic acid salt such as $[Ru_3O(OCOCH_3)_6(H_2O)_3]OCOCH_3$ hydrate and $Ru_2(RCOO)_4Cl$ (R=C1–3 alkyl group); ruthenium-nitrosyl complex such as $K_2[RuCl_5(NO)]]$, $[Ru(NH_3)_5(NO)]Cl_3$, $[Ru(OH)(NH_3)_4(NO)](NO_3)_2$ and $RU(NO)(NO_3)_3$; and ruthenium-phosphine complex. Preferable compounds are ruthenium halide compounds, for example, ruthenium chloride such as $RuCl_3$ and $RuCl_3$ hydrate and ruthenium bromide such as $RuBr_3$ and $RuBr_3$ hydrate. More preferred one is a ruthenium chloride hydrate.

The process of supporting the ruthenium compound on the carrier includes, for example, impregnation process and equilibrium adsorption process.

The reducing compound used for treating the ruthenium compound supported on the carrier includes, for example, hydrazine, methanol, ethanol, formaldehyde, hydroxylamine or formic acid, or an aqueous solution of hydrazine, methanol, ethanol, formaldehyde, hydroxylamine or formic acid, or a solution of an organic solvent such as alcohol. Preferred are hydrazine, methanol, ethanol, formaldehyde, and solutions of hydrazine, methanol, ethanol and formaldehyde. More preferred are hydrazine and a solution of hydrazine. The reducing compound used for treating the ruthenium compound supported on the carrier includes, for example, a compound having a redox potential of −0.8 to 0.5 V, a solution thereof, and a solution of an organic solvent such as alcohol. Now a standard electrode potential is used in place of the redox potential. Among the compounds listed above, a standard electrode potential of hydrazine is −0.23 V, that of formaldehyde is 0.056 V and that of formic acid is −0.199 V, respectively. It is also a preferable process to use an aqueous alkali solution of the reducing compound.

The basic compound listed as the catalyst (1) includes, for example, ammonia; amine such as alkyl amine, pyridine, aniline, trimethylamine and hydroxyl amine; alkali metal hydroxide such as potassium hydroxide, sodium hydroxide and lithium hydroxide; alkali metal carbonate such as potassium carbonate, sodium carbonate and lithium carbonate; and hydroxide of quaternary ammonium salt.

The basic compound for preparing the catalyst (2) includes, for example, ammonia; amine such as alkyl amine, pyridine, aniline, trimethylamine and hydroxyl amine; alkali metal hydroxide such as potassium hydroxide, sodium hydroxide and lithium hydroxide; alkali metal carbonate such as potassium carbonate, sodium carbonate and lithium carbonate; hydroxide of quaternary ammonium salt; and alkyl aluminum such as triethyl aluminum.

The process of treating the ruthenium compound supported on the carrier by using a reducing compound includes, for example, a process of supporting a ruthenium compound on a carrier, drying the supported one, and dipping the dried one in a reducing compound or a solution of a reducing compound, or impregnating with a reducing compound or a solution of a reducing compound. A process of dipping in an alkali solution of a reducing compound is also a preferable process.

A process of treating by using a reducing compound or an alkali solution of the reducing compound, and adding an alkali metal chloride is also a preferable process.

The process of oxidizing includes, for example, process of calcining under air.

A weight ratio of ruthenium oxide to the carrier is preferably within a range from 0.1/99.9 to 20.0/80.0, more preferably from 0.5/99.5 to 15.0/85.0, and most preferably from 1.0/99.0 to 15.0/85.0. When the ratio of ruthenium oxide is too low, the activity is lowered sometimes. On the other hand, when the ratio of ruthenium oxide is too high, the price of the catalyst becomes high sometimes. Examples of the ruthenium oxide to be supported include ruthenium dioxide, ruthenium hydroxide and the like.

The embodiment of the process for preparing the supported ruthenium oxide catalyst used in the present invention include a preparation process comprising the following steps:

a ruthenium compound supporting step: step of supporting a ruthenium compound on a carrier of a catalyst;

an alkali treating step: step of adding an alkali to one obtained in the ruthenium compound supporting step;

a reducing compound treating step: step of treating one obtained in the alkali treating step by using a reducing compound; and an oxidizing step: step of oxidizing one obtained in the reducing compound treating step.

It is also preferred to use an aqueous alkali solution of a reducing compound to simultaneously conduct the alkali treating step and the reducing compound treating step in the above step.

Preferred embodiment of the process of preparing the supported ruthenium oxide catalyst used in the present invention include a preparation process comprising the following steps;

a ruthenium halide compound supporting step: step of supporting a ruthenium halide compound on a carrier of a catalyst;

an alkali treating step: step of adding an alkali to one obtained in the ruthenium halide compound supporting step;

a reducing compound treating step: step of treating one obtained in the alkali treating step by using hydrazine, methanol, ethanol or formaldehyde; and an oxidizing step: step of oxidizing one obtained in the reducing compound treating step.

It is also preferred to use an aqueous alkali solution of a reducing compound to simultaneously conduct the alkali treating step and the reducing compound treating step in the above step.

More preferred embodiment of the process of preparing the supported ruthenium oxide catalyst used in the present invention include a preparation process comprising the following steps:

a ruthenium halide supporting step: step of supporting ruthenium halide on a carrier of a catalyst;

an alkali treating step: step of adding an alkali to one obtained in the ruthenium halide supporting step;

a hydrazine treating step: step of treating one obtained in the alkali treating step by using hydrazine; and an oxidizing step: step of oxidizing one obtained in the hydrazine treating step.

It is also preferred to use an aqueous alkali solution of a hydrazine to simultaneously conduct the alkali treating step and the hydrazine treating step in the above step.

More preferred embodiment of the process of preparing the supported ruthenium oxide catalyst used in the present invention include a preparation process comprising the following steps:

a ruthenium halide supporting step: step of supporting ruthenium halide on a carrier of a catalyst;

an alkali treating step: step of adding an alkali to one obtained in the ruthenium halide supporting step;

a hydrazine treating step; step of treating one obtained in the alkali treating step by using hydrazine;

an alkali metal chloride adding step: step of adding an alkali metal chloride to one obtained in the hydrazine treating step; and an oxidizing step: step of oxidizing one obtained in the alkali metal chloride adding step.

It is also preferred to use an aqueous alkali solution of hydrazine to simultaneously conduct the alkali treating step and the hydrazine treating step in the above step.

The ruthenium halide supporting step is a step of supporting ruthenium halide on a carrier of a catalyst. The ruthenium compound to be supported on the carrier includes, for example, already listed various ruthenium compounds. Among them, preferred examples thereof are halides of ruthenium, for example, ruthenium chloride such as $RuCl_3$ and $RuCl_3$ hydrate and ruthenium bromide such as $RuBr_3$ and $RuBr_3$ hydrate. More preferred one is a ruthenium chloride hydrate.

The amount of ruthenium halide used in the ruthenium halide supporting step is usually an amount corresponding to a preferable weight ratio of ruthenium oxide to the carrier. That is, ruthenium halide is supported by using a process of impregnating an already listed carrier of the catalyst, or a process of performing equilibrium adsorption. As the solvent, for example, water and an organic solvent such as alcohol are used, and water is preferred. The impregnated one can be dried, and can also be treated by using an alkali without being dried, but it is preferable the impregnated one is dried. Regarding the conditions for drying the impregnated one, the drying temperature is preferably from 50 to 200° C. and the drying time is preferably from 1 to 10 hours.

The alkali treating step is a step for adding an alkali to one obtained in the ruthenium halide supporting step. The alkali used in the alkali treating step includes, for example, hydroxide, carbonate and hydrogencarbonate of alkali metal; aqueous solution of ammonia, ammonium carbonate and ammonium hydrogencarbonate; and solution of an organic solvent such as alcohol. As the alkali, for example, hydroxide, carbonate and hydrogencarbonate of alkali metal are preferably used. As the solvent, for example, water is preferably used. The concentration of the alkali varies depending on the alkali to be used, but is preferably from 0.1 to 10 mol/l.

Regarding a molar ratio of the ruthenium halide to alkali is, for example, 3 mol of sodium hydroxide is equivalent to 1 mol of ruthenium halide. Preferably, the alkali is used in the amount of 0.1–20 equivalent per equivalent of ruthenium halide. The process of adding the alkali include a process of impregnating with a solution of the alkali or a process of dipping in a solution of the alkali. The time of impregnation with the solution of the alkali is usually within 60 minutes. Since the activity of the catalyst decreases when the impregnation time is long, the impregnation time is preferably within 10 minutes. The temperature is preferably from 0 to 100° C., and more preferably from 10 to 60° C.

The hydrazine treating step is a step of treating one obtained in the alkali treating step by using hydrazine. The process of treating by using hydrazine includes, for example, a process of impregnating with a solution of hydrazine and a process of dipping in a solution of hydrazine. The supported ruthenium halide treated by using the alkali in the previous step and an alkali solution maybe added to a hydazine solution in a state of being mixed, or may be added to the hydazine solution after the alkaline solution was separated by filtration. A preferable process is a process of impregnating the supported ruthenium halide with the alkali and immediately adding to the hydrazine solution. The concentration of hydrazine used in the hydrazine treating step is preferably not less than 0.1 mol/l. Hydrazine hydrate such as hydrazine monohydrate may be used as it is. Alternatively, it is used as a solution of an organic solvent such as alcohol. Preferably, an aqueous solution of hydrazine or hydrazine hydrate is used. Anhydride and a monohydrate of hydrazine can also be used. Regarding a molar ratio of ruthenium halide to hydrazine, hydrazine is used in the amount of 0.1 to 20 mol per mol of ruthenium halide. The time of impregnation with the solution of hydrazine is preferably from 5 minutes to 5 hours, and more preferably from 10 minutes to 2 hours. The temperature is preferably from 0 to 100° C., and more preferably from 10 to 60° C. After dipping in the hydrazine solution, the dipping one is preferably separated from the solution by filtration.

It is also preferred to use an aqueous alkali solution of hydrazine to simultaneously conduct the alkali treating step and hydrazine treating step in the above step. Preferable process includes a process of slowly dipping one obtained in the ruthenium halide supporting step to those prepared by mixing a preferable amount of the alkali with a preferable amount of hydazine, and treating for 5 minutes to 5 hours.

More preferable process includes a process of washing a solid produced in the alkali treating step and hydrazine treating step, thereby to remove the alkali and hydrazine, drying, adding an alkali metal chloride in the following alkali metal chloride adding step, drying, and oxidizing.

More preferable process includes a process of washing a solid produced in the alkali treating step and hydrazine treating step by using an aqueous solution of an alkali metal chloride, drying, and oxidizing. This process is preferred because the removal of the alkali and hydrazine, and the addition of the alkali metal chloride can be conducted in the same step.

The alkali metal chloride adding step is a step of adding an alkali metal chloride to one obtained in the alkali treating step and hydrazine treating step. This step is not an indispensable step to prepare the supported ruthenium oxide catalyst, but the activity of the catalyst is further improved by conducting said step. That is, the resulting solid is oxidized by the following oxidizing step, but it is a preferable preparation example to convert it into highly active supported ruthenium oxide by oxidizing the resulting solid treated with the alkali and hydrazine in the presence of an alkali metal salt.

The alkali metal chloride includes, for example, chloride of alkali metal, such as potassium chloride and sodium chloride. Preferable alkaline metal chlorides are potassium chloride and sodium chloride, and more preferable one is potassium chloride. A molar ratio of the alkali metal salt to ruthenium is preferably from 0.01 to 10, and more preferably from 0.1 to 5.0. When the amount of the alkali metal salt used is too small, sufficient highly active catalyst is not obtained. On the other hand, when the amount of the alkali metal salt used is too large, the cost becomes high from an industrial point of view.

The process of adding the alkali metal chloride includes a process of impregnating the resulting supported ruthenium one, obtained by washing, drying, treating by using an alkali and hydrazine, with an aqueous solution of the alkali metal chloride, but more preferable process includes a process of impregnating the resulting supported ruthenium one treated with the alkali and hydrazine by washing with an aqueous alkali metal chloride solution without being washed with water.

For the purpose of adjusting the pH in the case of washing the resulting supported one, hydrochloric acid can be added to an aqueous solution of the alkali metal chloride. The concentration of the aqueous solution of the alkali metal chloride is preferably from 0.01 to 10 mol/l, and more preferably from 0.1 to 5 mol/l.

The purpose of washing lies in removal of the alkali and hydrazine, but the alkali and hydrazine can also be remained as far as the effect of the present invention is not adversely affected.

After impregnating with the alkali metal chloride, the catalyst is usually dried. Regarding the drying conditions, the drying temperature is preferably from 50 to 200° C. and the drying time is preferably from 1 to 10 hours.

The oxidizing step is a step of oxidizing one obtained in the alkali treating step and hydrazine treating step (in the case of using no alkali metal chloride adding step), or a step of oxidizing one obtained in the alkali metal chloride adding step (in the case of using the alkali metal chloride adding step). The oxidizing step can include a process of calcining under an air. It is a preferable preparation example to convert it into highly active supported ruthenium oxide by calcining one treated with the alkali and hydrazine in the presence of an alkali metal salt, in a gas containing oxygen. A gas containing oxygen usually includes air.

The calcination temperature is preferably from 100 to 600° C., and more preferably from 280 to 450° C. When the calcination temperature is too low, particles formed by the alkali treatment and hydrazine treatment are remained in a large amount in the form of a ruthenium oxide precursor and, therefore, the activity of the catalyst becomes insufficient sometimes. On the other hand, when the calcination temperature is too high, agglomeration of ruthenium oxide particles occur and, therefore, the activity of the catalyst is lowered. The calcination time is preferably from 30 minutes to 10 hours.

In this case, it is important to calcine in the presence of the alkali metal salt. By using this process, it is possible to obtain higher activity of the catalyst because that process can form more fine particles of ruthenium oxide, comparing the process which includes calcining in the substantially absence of the alkali metal salt.

By the calcination, the particles supported on the carrier, which are formed by the alkali treatment and hydrazine treatment, are converted into a supported ruthenium oxide catalyst. It can be confirmed by analysis such as X-ray diffraction and XPS (X-ray photoelectron spectroscopy) that the particles formed by the alkali treatment and hydrazine treatment were converted into ruthenium oxide. Incidentally, substantially total amount of particles formed by the alkali treatment and hydrazine treatment are preferably converted into ruthenium oxide, but the particles formed by the alkali treatment and hydrazine treatment can be remained as far as the effect of the present invention is not adversely affected.

The process of oxidizing one treated with the alkali and hydrazine, washing the remained alkali metal chloride, and drying is a preferable preparation process. It is preferred that the alkali metal chloride contained on calcination is sufficiently washed with water. The process of measuring the alkali metal chloride after washing includes a process of examining the presence/absence of white turbidity by adding an aqueous silver nitrate solution to the filtrate. However, the alkali metal chloride may be remained as far as the effect of the present invention is not adversely affected.

According to a preferable preparation process, the washed catalyst is then dried. Regarding the drying conditions, the drying temperature is preferably from 50 to 200° C. and the drying time is preferably from 1 to 10 hours.

The supported ruthenium oxide catalyst produced by the above steps is highly active, and the activity was higher than that of the catalyst prepared by oxidizing a catalyst obtained by reducing ruthenium chloride with hydrogen. Furthermore, a catalyst obtained by previously treating ruthenium chloride by using an alkali, treating by using hydrazine (alternatively, alkali treatment and hydrazine treatment are simultaneously conducted), and oxidizing showed higher activity than that of a catalyst obtained by treating ruthenium chloride with hydrazine, and oxidizing.

The supported ruthenium oxide catalyst used in the catalyst (3) of the present invention, which is obtained by reducing a ruthenium compound supported on a carrier with a reducing hydrogenated compound, and oxidizing, is a catalyst containing a supported ruthenium oxide catalyst comprising ruthenium oxide supported on a carrier. In general, it is industrially used in the form of being supported on a carrier.

As the carrier, the same carriers as those used in the catalysts (1) and (2) of the present invention can be used.

As the weight ratio of the ruthenium oxide to the carrier, the same ratio as that in the catalysts (1) and (2) of the present invention is used.

As the ruthenium compound to be supported on the carrier, for example, the same ruthenium compounds as those used in the catalysts (1) and (2) of the present invention are used.

The process of supporting the ruthenium compound on the carrier includes, for example, impregnation process and equilibrium adsorption process.

The reducing hydrogenated compound used for reducing the ruthenium compound supported on the carrier include for example, boron hydride compound such as $NaBH_4$, $Na_2B_2H_6$, $Na_2B_4H_{10}$, $Na_2B_5H_9$, $LiBH_4$, $K_2B_2H_6$, $K_3B_4H_{10}$, $K_2B_5H_9$ and $Al(BH_4)_3$; organometallic boron hydride compound such as $LiB[CH(CH_3)C_2H_5]_3H$, $LiB(C_2H_5)_3H$, $KB[CH(CH_3)C_2H_5]_3H$ and $KB[CH(CH_3)CH(CH_3)_2]_3H$; metal hydride such as $LiAlH$, $NaH$, $LiH$ and $KH$; and organometallic hydride such as $[(CH_3)_2CHCH_2]_2AlH$. Preferable reducing agents are alkali metal boron hydride compound such as $NaBH_4$, $Na_2B_2H_6$, $Na_2B_4H_{10}$, $Na_2B_5H_9$, $LiBH_4$, $K_2B_2H_6$, $K_3B_4H_{10}$ and $K_2B_5H_9$. More preferable one is $NaBH_4$.

Preferred embodiment of the process of preparing the supported ruthenium oxide catalyst used in the catalyst (3) of the present invention include a preparation process comprising the following steps:

a ruthenium compound supporting step: step of supporting a ruthenium compound on a carrier of a catalyst;

a reducing step: step of reducing one obtained in the ruthenium compound supporting step by using a reducing hydrogenated compound; and an oxidizing step: step of oxidizing one obtained in the reducing step; or a ruthenium compound supporting step: step of supporting a ruthenium compound on a carrier of a catalyst;

a reducing step: step of reducing one obtained in the ruthenium compound supporting step by using a reducing hydrogenated compound;

an alkali metal chloride adding step: step of adding an alkali metal chloride to one obtained in the reducing step; and an oxidizing step: step of oxidizing one obtained in the alkali metal chloride adding step.

More preferred embodiment of the process of preparing the supported ruthenium oxide catalyst used in the catalyst (3) of the present invention include a preparation process comprising the following steps:

a ruthenium halide supporting step: step of supporting ruthenium halide on a carrier of a catalyst;

a reducing step: step of reducing one obtained in the ruthenium hydride supporting step by using an alkali 1metal boron halide compound; and an oxidizing step: step of oxidizing one obtained in the reducing compound treating step; or a ruthenium halide supporting step: step of supporting ruthenium halide on a carrier of a catalyst;

a reducing step: step of reducing one obtained in the ruthenium halide supporting step by using an alkali metal boron hydride compound;

an alkali metal chloride adding step: step of adding an alkali metal chloride to one obtained in the reducing step; and an oxidizing step: step of oxidizing one obtained in the alkali metal chloride adding step.

More preferred embodiment of the process of preparing the supported ruthenium oxide catalyst used in the catalyst (3) of the present invention include a preparation process comprising the following steps:

a ruthenium chloride supporting step: step of supporting ruthenium chloride on a carrier of a catalyst;

a reducing step: step of reducing one obtained in the ruthenium chloride supporting step by using sodium boron hydride; and an oxidizing step: step of oxidizing one obtained in the reducing step; or a ruthenium chloride supporting step: step of supporting ruthenium chloride on a carrier of a catalyst;

a reducing step: step of reducing one obtained in the ruthenium chloride supporting step by using sodium boron hydride;

an alkali metal chloride adding step: step of adding an alkali metal chloride to one obtained in the reducing step; and an oxidizing step: step of oxidizing one obtained in the alkali metal chloride adding step.

The respective steps will be explained below.

The ruthenium chloride supporting step is a step of supporting ruthenium chloride on a carrier of a catalyst. The amount of ruthenium chloride used in the ruthenium chloride supporting step is usually an amount corresponding to a preferable weight ratio of ruthenium oxide to the carrier. That is, a solution of ruthenium chloride is supported on the already listed carrier of the catalyst. As the solvent, for example, water and an organic solvent such as alcohol are used, and water is preferred. A ruthenium compound other than ruthenium chloride can also be used. However, when using a compound which does not dissolve in water, there can be used an organic solvent capable of dissolving it, for example, hexane and tetrahydrofuran. Then, supported one can be dried or reduced without being dried, but a process of drying is preferred. Regarding the conditions for drying the supported one, the drying temperature is preferably from 50 to 200° C. and the drying time is preferably from 1 to 10 hours.

The reducing step is a step of reducing one obtained in the ruthenium chloride supporting step by using sodium boron hydride ($NaBH_4$). The process of the reducing step includes a process of dipping one obtained in the ruthenium chloride supporting step in a solution of sodium boron hydride. The sodium boron hydride solution includes aqueous solution and solution of an organic solvent such as alcohol, but a mixed solution of water and an organic solvent can also be used. Preferably, a mixed solution of water and alcohol is used and, more preferably, a solution of water and ethanol is used. The concentration of the solution of sodium boron hydride is usually from 0.05 to 20% by weight, and preferably from 0.1 to 10% by weight. The molar ratio of the sodium boron hydride to the supported ruthenium is usually from 1.0 to 30, and preferably from 2.0 to 15. The catalyst may be washed with water after reducing, or may be subjected to a step of washing with an aqueous alkali metal chloride solution as an operation of the alkali metal chloride adding step. Preferably, a process of reducing, washing with water, and drying is adopted.

It is also possible to reduce with a reducing compound other then sodium boron hydride. In that case, an aprotic anhydrous solvent is preferably used. For example, a supported ruthenium compound is reduced with a reducing hydrogenated compound other than sodium boron halide by using a toluene solvent.

The alkali metal chloride adding step is a step of adding an alkali metal chloride to one obtained in the reducing step. This step is conducted in the same manner as that in the alkali metal chloride adding step conducted in the catalysts (1) and (2) of the present invention.

The oxidizing step is a step of oxidizing one obtained in the reducing step (in the case of using no alkali metal chloride adding step), or a step of oxidizing one obtained in the alkali metal chloride adding step (in the case of using the alkali metal chloride adding step). This step is conducted in the same manner as that in the oxidizing step conducted in the catalysts (1) and (2) of the present invention.

By the calcination, the metal ruthenium supported on the carrier is converted into a supported ruthenium oxide catalyst. It can be confirmed by analysis such as X-ray diffraction and XPS (X-ray photoelectron spectroscopy) that the metal ruthenium was converted into ruthenium oxide. Incidentally, substantially total amount of the metal ruthenium is preferably converted into ruthenium oxide, but the metal ruthenium can be remained as far as the effect of the present invention is not adversely affected.

The process of oxidizing the supported metal ruthenium, washing the remained alkali metal chloride with water, and drying is a preferable preparation process. It is preferred that the alkali metal chloride contained on calcination is sufficiently washed with water. The process of measuring the alkali metal chloride after washing includes a process of examining the presence/absence of white turbidity by adding an aqueous silver nitrate solution to the filtrate. However, the alkali metal chloride may be remained as far as the effect of the present invention is not adversely affected.

The washed catalyst is preferably then dried. Regarding the drying conditions, the drying temperature is preferably from 50 to 200° C. and the drying time is preferably from 1 to 10 hours.

The supported ruthenium oxide catalyst produced by the above steps is highly active, and is very effective for a process for preparing chlorine by oxidizing hydrogen chloride with oxygen.

The supported ruthenium oxide catalyst used in the catalyst (4) of the present invention is a supported ruthenium oxide catalyst using titanium oxide containing rutile titanium oxide as a carrier. As the titanium oxide, for example, rutile titanium oxide, anatase titanium oxide and non-crystal titanium oxide are known. The titanium oxide containing rutile titanium oxide used in the present invention refers to one containing a rutile crystal, wherein a ratio of the rutile crystal to the anatase crystal in the titanium oxide is measured by X-ray diffraction analysis. The measuring process will be described in detail hereinafter. When the chemical composition of the carrier used in the present invention is composed of titanium oxide alone, the proportion of the rutile crystal is determined from a ratio of the rutile crystal to the anatase crystal in the titanium oxide by using X-ray diffraction analysis. In the present invention, a mixed oxide of the titanium oxide and other metal oxide is also used. In that case, the proportion of the rutile crystal is determined by the following process. The oxide to be mixed with the titanium oxide includes oxides of elements, and preferred examples thereof include alumina, zirconium oxide and silica. The proportion of the rutile crystal in the mixed oxide is also determined from the ratio of the rutile crystal to the anatase crystal in the titanium oxide by using x-ray diffraction analysis. It is necessary to contain the rutile crystal. In this case, the content of the oxide other than the titanium oxide in the mixed oxide is within a range from 0 to 60% by weight. Preferred carrier includes titanium oxide which does not contain a metal oxide other than titanium oxide.

It is necessary that the titanium oxide contains the rutile crystal. The proportion of the rutile crystal is preferably not less than 10%, more preferably not less than 30%, and most preferably not less than 80%.

The process for preparing the titanium oxide containing the rutile crystal includes various processes. In general, the following processes are exemplified. For example, when using titanium tetrachloride as a raw material, titanium tetrachloride is dissolved by adding dropwise in ice-cooled water, and then neutralized with an aqueous ammonia solution to form titanium hydroxide (ortho-titanic acid). Thereafter, the formed precipitate was washed with water to remove a chlorine ion. In that case, when the temperature on neutralization becomes higher than 20° C. or the chlorine ion is remained in the titanium oxide after washing, conversion into a stable rutile crystal is liable to occur on calcination. When the calcination temperature becomes not less than 600° C., conversion into rutile occurs (Catalyst Preparation Chemistry, 1989, page 211, Kodansha). For example, a reaction gas is prepared by passing an oxygen-nitrogen mixed gas through a titanium tetrachloride evaporator and the reaction gas is introduced into a reactor. The reaction between titanium tetrachloride and oxygen starts at a temperature of about 400° C. and titanium dioxide formed by the reaction of a $TiCl_4$—$O_2$ system is mainly an anatase type. However, when the reaction temperature becomes not less than 900° C., formation of a rutile type can be observed (Catalyst Preparation Chemistry, 1989, page 89, Kodansha). The preparation process includes, for example, a process of hydrolyzing titanium tetrachloride in the presence of ammonium sulfate and calcining (e.g. Shokubai Kougaku Kouza 10, Catalyst Handbook by Element, 1978, page 254, Chijin Shokan) and a process of calcining an anatase titanium oxide (e.g. Metal Oxide and Mixed Oxide, 1980, page 107, Kodansha). Furthermore, rutile titanium oxide can be obtained by a process for hydrolyzing an aqueous solution of titanium tetrachloride by heating. Rutile titanium oxide is also formed by previously mixing an aqueous titanium compound solution of titanium sulfate or titanium chloride with a rutile titanium oxide powder, hydrolyzing the mixture by heating or using an alkali, and calcining at low temperature of about 500° C.

The process of determining the proportion of the rutile crystal in the titanium oxide includes a X-ray diffraction analysis and, as a X-ray source, various X-ray sources can be used. For example, a K α ray of copper is used. When using the K α ray of copper, the proportion of the rutile crystal and the proportion of the anatase are respectively determined by using an intensity of a diffraction peak of 2θ=27.5 degree of the plane (110) and an intensity of a diffraction peak of 2θ=25.3 degree of the plane (101). The carrier used in the present invention is one having a peak intensity of the rutile crystal and a peak intensity of the anatase crystal, or one having a peak intensity of the rutile crystal. That is, the carrier has both of a diffraction peak intensity of the rutile crystal and a diffraction peak of the anatase crystal, or has only a diffraction peak of the rutile crystal. Preferred carrier is one wherein a proportion of the peak intensity of the rutile crystal to the total of the peak intensity of the rutile crystal and the peak intensity of the anatase crystal is not less than 10%. Also in the supported ruthenium oxide catalyst using in the titanium oxide carrier containing rutile titanium oxide, an amount of an OH group contained in the carrier is preferably a similar amount to the catalyst (5) of the present invention. Although the details will be described with regard as the catalyst (5) of the present invention, the amount of the OH group of the titanium oxide of the carrier used in the catalyst is usually from $0.1 \times 10^{-4}$ to $30 \times 10^{-4}$ (mol/g-carrier), preferably from $0.2 \times 10^{-4}$ to $20 \times 10^{-4}$ (mol/g-carrier), and more preferably from $3.0 \times 10^{-4}$ to $15 \times 10^{-4}$ (mol/g-carrier).

The supported ruthenium oxide catalyst used in the catalyst (5) of the present invention is a supported, ruthenium oxide catalyst obtained by the steps which comprises supporting a ruthenium compound on a carrier, treating the supported one by using reducing compound or reducing agent in a liquid phase, and oxidizing the resulted one, wherein titanium oxide containing an OH group in an amount of $0.1 \times 10^{-4}$ to $30 \times 10^{-4}$ (mol/g-carrier) per unit weight of a carrier is used as the carrier. The carrier includes, for example, rutile crystal carrier, anatase crystal carrier and non-crystal carrier. Preferable carriers are rutile crystal carrier and anatase crystal carrier, and more preferable one is rutile crystal carrier. It is generally known that a hydroxyl group represented by OH, bound to Ti, exists on the surface of the titanium oxide. The titanium oxide used in the present invention is one containing an OH group, and the process of measuring the content of OH group will be described in detail hereinafter. When the chemical composition of the carrier used in the present invention is consisting essentially of titanium oxide alone, it is determined from the content of the OH group in the titanium oxide. In the present invention, a mixed oxide of the titanium oxide and other metal oxide is also used. The oxide to be mixed with the titanium oxide includes oxides of elements, and preferred examples thereof include alumina, zirconium oxide and silica. In that case, the content of the oxide other than the titanium oxide in the mixed oxide is within a range from 0 to 60% by weight. Also this case, the content of the OH group per unit weight of the carrier contained in the carrier is determined by the measuring process which is also described in detail hereinafter. Preferred carrier is titanium oxide which does not contain the metal oxide other than the titanium oxide.

When the content of the OH group of the carrier is large, the carrier and supported ruthenium oxide may react each other, resulting in deactivation. On the other hand, when the content of the OH group of the carrier is small, the activity of the catalyst is lowered sometimes by sintering of the supported ruthenium oxide and the other phenomenon.

The process of determining the content of the OH group of the titanium oxide includes various processes. For example, a process using a thermogravimetric process (TG) is exemplified. When using the thermogravimetric process, the temperature is kept constant and, after removing excess water in a sample, the sample is heated and the content of the OH group is measured from a weight loss. According to this process, the amount of the sample is small and it is difficult to measure with good accuracy. When heat decomposable impurities exist in the carrier, there is a drawback that the actual content of the OH group is not determined. When using the measurement of ignition loss (Igloss) for measuring the content of the OH group from the weight loss of the sample in the same manner, the measurement with high accuracy can be conducted if the amount of the sample is increased. However, an influence of the heat decomposable impurities is exerted similar to the case of the thermogravimetric process. Furthermore, there is also a drawback that the weight loss obtained by the thermogravimetric process and ignition loss measurement also includes the bulk OH group content which is not effective on preparation of the catalyst.

A process using sodium naphthalene is also exemplified. According to this process, an OH group in a sample is reacted with sodium naphthalene as a reagent and then the content of the OH group is measured from the titration amount of sodium naphthalene. In this case, since a change in concentration of the reagent for titration and a trace amount of water exert a large influence on the results, the measuring results are influenced by the storage state of the reagent. Therefore, it is very difficult to obtain a value with good accuracy.

A titration process using an alkyl alkali metal is also exemplified. The titration process using the alkyl alkali metal includes a preferable process of suspending a titanium oxide carrier or a titanium oxide carrier powder in a dehydrated solvent, adding dropwise an alkyl alkali metal in a nitrogen atmosphere, and determining the amount of the OH group contained in the titanium oxide from the amount of hydrocarbon generated In that case, since an alkyl alkali metal and water contained in the dehydrated solvent react each other to generate hydrocarbon, the content of the OH group in the titanium oxide must be determined by subtracting the generated amount from the measured value.

Most preferred process includes a process of suspending a titanium oxide carrier or a titanium oxide carrier powder in a dehydrated solvent, adding dropwise methyl lithium in a nitrogen atmosphere, and determining the amount of the OH group contained in the titanium oxide from the amount of hydrocarbon generated, and the content of the OH group in the titanium oxide catalyst which is used in the claims of the present invention is a value obtained by this process.

The measuring procedure includes, for example, the following process. First, a sample is previously dried in an air atmosphere at 150° C. for 2 hours and then cooled in a desiccator. Thereafter, a predetermined amount of the sample is transferred in a flask whose atmosphere was replaced by nitrogen, and then suspended in an organic solvent such as dehydrated toluene. The flask is ice-cooled to inhibit heat generation and, after adding dropwise methyl lithium from a dropping funnel, the generated gas is collected and the volume at the measuring temperature is measured. The content of the OH group thus determined, which is used in the catalyst, is usually from $0.1 \times 10^{-4}$ to $30 \times 10^{-4}$ (mol/g-carrier), preferably from $0.2 \times 10^{-4}$ to $20 \times 10^{-4}$ (mol/g-carrier), and more preferably from $3.0 \times 10^{-4}$ to $15 \times 10^{-4}$ (mol/g-carrier).

The process of adjusting the amount of the OH group contained in the titanium oxide carrier to a predetermined amount includes various processes. For example, a calcination temperature and a calcination time of the carrier are used for adjusting the OH group of the carrier. The OH group in the titanium oxide carrier is eliminated by heating, and the content of the OH group can be controlled by changing the calcination temperature and calcination time. The calcination temperature of the carrier is usually from 100 to 1000° C., and preferably from 150 to 800° C. The calcination time of the carrier is usually from 30 minutes to 12 hours. In this case, it is necessary to pay attention to the point that the surface area of the carrier decreases with the increase of the calcination temperature or the calcination time. When the titanium oxide is produced from a gas phase, one having small content of the OH group can be produced. Furthermore, when the titanium oxide is produced from an aqueous phase such as aqueous solution, one having large content of the OH group can be produced. Furthermore, a process of treating the OH group of the carrier by using an alkali and a process of reacting the OH group by using 1,1,1-3,3,3-hexamethyldisilazane are exemplified.

The present invention relates to a process for producing chlorine by using the above supported ruthenium oxide catalyst supported on the carrier. A weight ratio of ruthenium oxide to the carrier is usually within a range from 0.1/99.9 to 20.0/80.0, preferably from 0.5/99.5 to 15.0/85.0, and more preferably from 1.0/99.0 to 15.0/85.0. When the ratio of ruthenium oxide is too low, the activity is lowered sometimes. On the other hand, when the ratio of ruthenium oxide is too high, the price of the catalyst becomes high sometimes. Examples of the ruthenium oxide to be supported include ruthenium dioxide, ruthenium hydroxide and the like.

The process for preparing the supported ruthenium oxide catalyst by using the above carrier is a process comprising the steps of supporting a ruthenium compound on a carrier, treating the Supported one by using a reducing compound or a reducing agent in a liquid phase, and oxidizing, and the step of treating with a reducing compound or a reducing agent in a liquid phase includes, for example, a process of treating with a reducing compound or a reducing agent in a liquid phase which is conducted in the catalysts (1), (2) and (3) of the present invention, and the process described below. That is, the process includes a process of suspending one comprising the already described ruthenium compound supported on the carrier in an aqueous phase or an organic solvent, and bubbling hydrogen, a process of treating by using an organolithium compound such as butyl lithium, or an organosodium compound or an organopotassium compound in an organic solvent, a process of treating by using an organoaluminum compound such as trialkyl aluminum, and a process of treating by using an organomagnesium compound such as Grignard reagent. Furthermore, various organometallic compounds can be used and examples thereof include alkali metal alkoxide such as sodium methoxide; alkali metal naphthalene compound such as sodium naphthalene; azide compound such as sodium azide; alkali metal amide compound such as sodium amide; organocalcium compound; organozinc compound; organoaluminum alkoxide such as alkyl aluminum alkoxide; organotin compound; organocopper compound; organoboron compound; boranes such as borane and diborane; sodium ammonia solution; and carbon monoxide. Various organic compound can also be used and examples thereof include diazomethane, hydroquinone and oxalic acid.

In a process for producing chlorine by oxidizing hydrogen chloride with oxygen, it is preferable that the catalyst (1), (2) or (3) is a supported ruthenium oxide catalyst obtained by using titanium oxide containing not less than 10% by weight of rutile titanium oxide as a carrier.

It is more preferable that the catalyst (1), (2) or (3) is a supported ruthenium oxide catalyst obtained by using titanium oxide containing not less than 30% by weight of rutile titanium oxide as a carrier.

It is preferable that the catalyst (4) or (5) is a supported ruthenium oxide catalyst obtained by supporting a ruthenium compound on a carrier, reducing the supported one by using a reducing hydrogenated compound, and oxidizing.

It is preferable that the catalyst (4) or (5) is a supported ruthenium oxide catalyst obtained by supporting a ruthenium compound on a carrier, treating the supported one by using a reducing compound, and oxidizing.

It is preferable that the catalyst (4) or (5) is a supported ruthenium oxide catalyst obtained by supporting a ruthenium compound on a carrier, treating the supported one by using an alkali solution of a reducing compound, and oxidizing.

Next, catalyst system will be explained bellow. The catalyst system (6) in the present invention is a catalyst system containing at least the following component (A) and (B), wherein the content of the component (B) in the catalyst system is not less than 10% by weight:

(A) an active component of catalyst; and (B) a compound component wherein thermal conductivity of a solid phase measured by at least one point within a range from 200 to 500° C. is not less than 4 W/m. ° C.;

The catalyst system in the present invention means any packing solid capable of forming a catalyst bed layer. For example, the catalyst includes not only particles containing an active component of the catalyst, but also particles of an inactive component containing no catalytic active component. The catalyst bed layer includes fixed bed and fluidized bed.

The catalyst in the present invention means a molding and a powder which contain a catalytic active component, and doesn't mean an inactive molding and an inactive powder included in a catalyst bed.

As the above active component of the catalyst as the component (A) in the present invention, for example, copper, chromium, ruthenium, and a compound thereof are known.

The content of the component (A) in the catalyst is preferably from 0.1 to 90% by weight, and more preferably from 0.2 to 80% by weight. When the content of the component (A) is too small, the activity of the catalyst may be lowered. On the other hand, when the content of the component (A) is too large, the cost of the catalyst may become high.

The example of the above active component of catalyst (A) include ruthenium compound. When using a ruthenium compound, a catalyst having high activity can be prepared, so the ruthenium compound is preferable. The more preferable example include ruthenium oxide. A catalyst having higher activity can be prepared by using ruthenium oxide.

In the view of the catalyst activity, it is preferable that a component (A) is a component supported on the catalyst carrier component or a component (B). For example, in the case of a component (A) is an expensive noble metal compound such as ruthenium, large effects can be realized in the cost of the catalyst by supporting a component (A) on the catalyst carrier component or the component (B) because the catalyst activity increases by supporting a small amount of noble metal.

More preferable example includes supported ruthenium oxide catalyst on the catalyst carrier component or the component (B).

The component (B) in the present invention is a compound wherein thermal conductivity of a solid phase measured by at least one point within a range from 200 to 500° C. is not less than 4 W/m. ° C.

The thermal conductivity of compounds of the solid phase in the present invention means the thermal conductivity measured in the state of continuum (continuous phase) such as a crystal, an amorphous solid, a glass. For example, in the case of the compound is a crystal, thermal conductivity is measured in the phase of crystal solid.

The thermal conductivity of the solid phase is described, for example, in Latest Oxide Handbook—Physiochemical Properties—, (published by Moscow Metallurgical Publication, 1978), Thermophysical PROPERTIES of High Temperature Solid Metals (Oxides and Their Solutions and Mixtures) (published by The Macmillan Company, 1967).

The thermal conductivity of the solid phase is preferably higher. It is necessary not less than 4 W/m. ° C. And it is further preferably not less than 15 W/m. ° C.

Preferred example of the component (B) includes α alumina, rutile tin dioxide, rutile titanium oxide, silicon nitride and silicon carbide. More preferred one is α-alumina. When an inactive component is added, the activity of the catalyst is sometimes lowered. However, by selecting an additive capable of improving the thermal conductibility with maintaining the activity of the catalyst, the reaction can be conducted in more industrially advantageous manner. Since the thermal conductibility can be improved with maintaining the activity of the catalyst by adding α-alumina, preferred example of the component (B) in view of the activity of the catalyst includes α-alumina.

It is necessary the content of the component (B) is not less than 10% by weight, and preferably not less than 20% by weight.

By using a catalyst containing not less than 10% by weight of the component (B), the reaction heat is sufficiently removed, thereby making it easy to control the reaction temperature. Since the whole catalyst bed can be utilized at the temperature capable of oxidizing hydrogen chloride at an industrially sufficient reaction rate, high reaction conversion can be realized.

The catalyst carrier component in the present invention is as follows. The examples thereof include oxides and mixed oxides of elements, such as titanium oxide, alumina, zirconium oxide, silica, titanium mixed oxide, zirconium mixed oxide, aluminum mixed oxide, silicon mixed oxide and the like. Titanium oxide is the most preferable catalyst carrier component among the above example because the catalyst has high catalytic activity by using a ruthenium compound as an active component of catalyst (A).

When a catalyst carrier component is a compound wherein thermal conductivity of a solid phase measured by at least one point with in a range from 200 to 500° C. is not less than 4 W/m. ° C., the above catalyst carrier component is regarded as a component (B). For example, in the case of titanium oxide, there exists rutil crystal titanium oxide, anatase crystal titanium oxide, etc. As thermal conductivity of rutil titanium oxide of a solid phase measured at 200° C. is 7.5 W/m. ° C., rutil titanium oxide is regarded as a component (B). And in the case of alumina, there exists α-alumina, γ-alumina, etc. As thermal conductivity of α-alumina of a solid phase measured at 200° C. is 23 W/m. ° C., α-alumina is regarded as a component (B). As rutil titanium oxide, α-alumina, etc. wherein thermal conductivity of the catalyst carrier component is not less than 4 W/m. ° C. at 200° C. in the solid phase, they are regarded as a component (B). However, as the thermal conductivity of zirconium oxide of a solid phase measured at 400° C. is 2.05 W/m. ° C., zirconium oxide is not regarded as a component (B). Therefore the catalyst carrier component includes apart of component (B). On the contrary, for example, in the case of silicon nitride, the thermal conductivity of a solid phase measured at 200° C. is 24 W/m. ° C., so it is regarded as a component (B), but it is not regarded as a catalyst carrier component because silicon nitride has too small surface area to support an active component of catalyst (A). Therefor, among the component (B), the component which can't support an active component (A) is not a catalyst carrier component. As mentioned above, the catalyst carrier component include a part of component (B).

The catalyst system in the present invention contains not less than 10% by weight of a component (B) because the thermal conductibility improve by containing the component (B). The catalyst system preferably contains not less than 20% by weight of a component (B) because the thermal conductibility can be much improved.

Examples of the shape of the carrier of the catalyst in the case of supporting the active component of the catalyst includes powder, sphere, column, extruded shape and those obtained by spray drying process. In the case of the powder, a process of using the powder after molding into sphere, column, extruded shape and the like is generally used so as to use the powder industrially.

Next the catalyst system which contains the component (B) in the present invention will be explained. The catalyst system comprises two components such as the component (A) and the component (B), or comprises three components such as the component (A), the component (B) and the catalyst carrier component. And the catalyst system can contain the other component such as an inorganic binder which is used for a molding aid.

First embodiment includes a process of using a catalyst made of a molding containing the components (A) and (B) obtained by integrally molding. For example, the catalyst preparation includes the steps which comprises mixing an active component of catalyst (A) with component (B), molding the components by using an inorganic binder, and calcining. The resulting catalyst is preferable catalyst being easily charged in a reactor because of integrally molding.

The process of using a catalyst made of a molding containing the component (A), the component (B) and catalyst carrier component obtained by integrally molding is exemplified. For example, the catalyst preparation method includes the Steps which comprises mixing an active component (A) with fine particle of catalyst carrier component resulted in high surface area catalyst, mixing the resulted one with component (B), molding the component by using inorganic binder, and calcining. The resulting catalyst is preferable as the catalyst is molded integrally and the catalytic activity is improved.

The catalyst made of a molding containing the component (A) supported on a component (B) is exemplified. The catalyst preparation method include the steps which comprises supporting a component (A) on a component (B) which have high surface area, wherein a supported one has high catalytic activity, molding the resulted one by using inorganic binder, and calcining. The resulting catalyst is preferable as the catalyst has high activity, good thermal conductibility, and easily charges into a reactor because of integrally molding.

The catalyst made of a molding containing a component (A) supported on a catalyst carrier component and component (B) is exemplified. The catalyst preparation method includes the steps which comprises supporting a component (A) on a catalyst carrier component having high surface area, mixing the resulted one with component (B), molding the mixed one by using inorganic binder integrally, and calcining. The resulting catalyst is more preferable as the catalyst has high catalytic activity, good thermal conductibility.

The catalyst made of a molding containing a component (A) supported on a mixture of a catalyst carrier component with a component (B) is exemplified. The catalyst preparation method includes the steps which comprises mixing catalyst carrier component with a component (B), molding the resulted one by using inorganic binder integrally, calcining the molded one, and supporting a component (A) on the calcined one. The resulting catalyst is more preferable as the catalyst has high catalytic activity, good thermal conductibility.

A second embodiment includes a process using a catalyst system comprising both of a molding containing the component (A) and (B) obtained by integrally molding and a molding containing the component (B) obtained by integrally molding. For example, the catalyst system is a mixture of the two moldings. The preparation method of one molding of the catalyst includes the steps which comprises mixing a component (A) with a component (B), molding the components by using inorganic binder integrally, calcining. The preparation method of another molding includes the steps which comprises molding the component (B) by using inorganic binder integrally, calcining. The resulting catalyst system is preferable as the catalyst system shows good thermal conductibility. The molding containing a component (A) and a component (B) integrally is exemplified in the first embodiment.

The method includes a process of using a catalyst system comprising both of a molding containing a component (A) and catalyst carrier component obtained by integrally molding and a molding containing a component (B) obtained by integrally molding. One example of the catalyst system is a mixture of the two moldings. The preparation method of one molding of the catalyst includes the steps which comprises supporting a component (A) on a catalyst carrier component, molding the supported one by using inorganic binder integrally, calcining. The preparation of another molding include the steps which comprises molding a component (B) by using inorganic binder integrally, calcining. The another example of the catalyst system is a mixture of the two moldings The preparation method of one molding of the catalyst includes the steps which comprises molding a catalyst carrier component by using inorganic binder integrally, calcining the molded one, supporting a component on the calcined one. The preparation method of another one includes the steps which comprises molding a component (B) by using inorganic binder integrally, calcining. The two examples of the catalyst systems are preferable examples respectively as the catalyst systems show high catalytic activity, and good thermal conductibility Generally the catalyst system obtained by mixing the sphere molding of α-alumina with the sphere molding which comprises a component (A), a catalyst carrier component is more preferable as the catalyst system has good thermal conductibility.

Among the above catalysts, a preferable one is a catalyst which the component (C) is α-alumina.

Among the above catalysts, preferable one is a catalyst which the component (A) is a component containing ruthenium. More preferable one is a catalyst which the component (A) is ruthenium oxide.

Among the above catalysts, preferable one is a catalyst which the carrier of the catalyst is titanium oxide.

The catalyst used in the present invention is a catalyst capable of producing chlorine by oxidizing hydrogen chloride with oxygen. Preferable catalyst includes, for example, catalyst containing copper as an active component of the catalyst, such as Deacon catalyst; catalyst containing chromium as an active component of the catalyst, such as chromia-silica catalyst; and catalyst containing ruthenium as an active component of the catalyst. More preferable catalyst is a catalyst containing ruthenium. Since ruthenium is expensive, a catalyst containing a supported ruthenium catalyst supported on the carrier of the catalyst is a more preferable catalyst.

The supported ruthenium catalyst includes, for example, supported ruthenium oxide catalyst, supported metal ruthenium catalyst, and catalyst obtained by supporting a ruthenium compound.

As the supported ruthenium catalyst, a supported ruthenium oxide catalyst is preferred because high activity can be obtained by low Ru content. The carrier of the supported ruthenium catalyst includes oxides and mixed oxides of elements, such as titanium oxide, alumina, zirconium oxide, silica, titanium mixed oxide, zirconium mixed oxide, aluminum mixed oxide, silicon mixed oxide and the like. Preferable catalyst carrier components are titanium oxide, alumina, zirconium oxide and silica, and more preferable catalyst carrier component is titanium oxide, and most preferable carrier is titanium oxide having rutile crystalline structure.

The supported ruthenium oxide catalyst will be explained below. A weight ratio of ruthenium oxide to the carrier of the catalyst is usually within a range from 0.1/99.9 to 20.0/80.0, preferably from 0.2/99.8 to 15.0/85.0, and more preferably from 0 5/99.5 to 10.0/90.0. When the proportion of the ruthenium oxide is too low, the activity is lowered sometimes. On the other hand, when the proportion of ruthenium oxide is too high, the price of the catalyst becomes high sometimes. Examples of the ruthenium oxide to be supported include ruthenium dioxide, ruthenium hydroxide and the like.

The process of preparing a supported ruthenium oxide will be explained below.

The process of preparing a catalyst includes various processes, and four kinds of preparation process will be shown as an embodiment. A catalyst having high thermal conductibility can be used in the present invention, and a process of increasing the thermal conductibility of the catalyst includes a process for preparing a catalyst by mixing a compound having high thermal conductivity. Examples of the component (B) having high thermal conductivity includes various compounds, but a process using α-alumina is exemplified. The catalyst carrier component includes various compounds but the embodiment using titanium oxide is exemplified. The catalyst is prepared by supporting a ruthenium compound on the catalyst carrier component, but the ruthenium compound to be supported varies depending on the preparation process. Now the embodiment using ruthenium chloride is exemplified.

The first embodiment of four kinds of the preparation processes is a process which comprises uniformly mixing a titanium oxide powder with an α-alumina powder, adding a titanium oxide sol, and molding a carrier of a catalyst. The proportion of the titanium oxide sol to be mixed is preferably within a range from 3 to 30% by weight in terms of titanium oxide in the titanium oxide sol, based on the weight of the titanium oxide and α-alumina. The molding process includes process of molding into a spherical shape and a process of extrusion molding. The molded object is dried and then calcined under air to prepare a carrier of a catalyst. The calcination temperature is preferably within a range from 300 to 800° C. At this stage, a carrier having high thermal conductibility can be obtained. Then, an aqueous solution of ruthenium chloride is supported by impregnation. The amount of ruthenium chloride to be used corresponds to a preferable ratio of the ruthenium oxide to the carrier of the catalyst. Then, the supported one is dried. A supported ruthenium oxide catalyst is prepared by reducing the dried one with a reducing hydrogenated compound such as sodium boron hydride, and oxidizing, or prepared by treating the dried one with a reducing compound such as hydrazine, and oxidizing. The preparation process will be explained in detail hereinafter.

The second embodiment of four kinds of the preparation processes is a process which comprises uniformly mixing a titanium oxide powder with an α-alumina powder, and supporting an aqueous ruthenium chloride by impregnation. The amount of the ruthenium chloride to be used corresponds to a preferable ratio of the ruthenium oxide to the carrier of the catalyst. Then, the supported one is dried. The dried one is reduced with a reducing hydrogenated compound such as sodium boron hydride or treated with a reducing compound such as hydrazine. The preparation process will be explained in detail hereinafter. Then, a titanium oxide sol is added and a carrier of the catalyst is molded. The proportion of the titanium oxide sol is the same proportion as that shown in the first embodiment. Then, a catalyst is prepared by drying the molded one, calcining under air to oxidize ruthenium, and washing with water in the same manner as the process of preparing the supported ruthenium oxide catalyst, which will be explained in detail hereinafter. At this stage, a catalyst having good thermal conductibility can be obtained.

The third embodiment of four kinds of the preparation processes is a process which comprises supporting an aqueous solution of ruthenium chloride on a powder of titanium oxide by impregnation. The amount of the ruthenium chloride to be used corresponds to a preferable ratio of the ruthenium oxide to the carrier of the catalyst Then, the supported one is dried. The dried one is reduced with a reducing hydrogenated compound such as sodium boron hydride or treated with a reducing compound such as hydrazine. The preparation process will be explained in detail hereinafter. Then, α-alumina is uniformly mixed. Then, a titanium oxide sol is added and a carrier of the catalyst is molded. The proportion of the titanium oxide sol is the same proportion as that shown in the first embodiment. Then, a catalyst is prepared by drying the molded one, calcining under air to oxidize ruthenium, and washing with water in the same manner as the process of preparing the supported ruthenium oxide catalyst, which will be explained in detail hereinafter. At this stage, a catalyst having good thermal conductibility can be obtained.

The fourth embodiment of four kinds of the preparation processes is a process which comprises supporting an aqueous solution of ruthenium chloride on a powder of titanium oxide by impregnation. The amount of the ruthenium chloride to be used corresponds to a preferable ratio of the ruthenium oxide to the carrier of the catalyst Then, the supported one is dried. The dried one is reduced with a reducing hydrogenated compound such as sodium boron hydride and then oxidized to prepare a supported ruthenium oxide catalyst. Alternatively, the dried one is treated with a reducing compound such as hydazine and then oxidized to prepare a supported ruthenium oxide catalyst. The preparation process will be explained in detail hereinafter. Then, α-alumina is uniformly mixed. Then, a titanium oxide sol is added and a carrier of the catalyst is molded. The proportion of the titanium oxide sol is the same proportion as that shown in the first embodiment. Then, the molded one is dried and then calcined under air. The calcination temperature is preferably within a range from 300 to 600° C. Then, the calcined one is washed with water to prepare a catalyst.

At this stage, a catalyst having good thermal conductibility can be obtained.

The process for preparing a supported ruthenium oxide catalyst used in the present invention includes a process for preparing a supported ruthenium oxide catalyst by supporting a ruthenium compound on a carrier of a catalyst, reducing the supported one by using a reducing hydrogenated compound such as sodium boron hydride, and oxidizing, or a process for preparing a supported ruthenium oxide catalyst by treating a ruthenium compound by using a reducing compound such as hydrazine, and oxidizing, for example, processes for preparing the catalysts (1), (2) and (3) of the present invention.

The first embodiment of the process for preparing a supported ruthenium oxide catalyst used in the present invention includes a process for preparing a supported ruthenium oxide catalyst by reducing a ruthenium compound supported on a carrier of a catalyst by using a reducing hydrogenated compound, and oxidizing.

The ruthenium compound to be supported on the carrier of the catalyst includes the same compounds as those listed with respect to the catalysts (1), (2) and (3) of the present invention.

The reducing hydrogenated compound used for reducing the ruthenium compound supported on the carrier of the catalyst includes the same compounds as those listed with respect to the catalyst (3) of the present invention.

The second embodiment of the process for preparing a supported ruthenium oxide catalyst used in the present invention includes a process for preparing a supported ruthenium oxide catalyst by reducing a ruthenium compound supported on a carrier of a catalyst by using a reducing compound, and oxidizing.

The ruthenium compound to be supported on the carrier of the catalyst includes the same compounds as those listed with respect to the catalysts (1), (2) and (3) of the present invention.

The reducing compound used for treating the ruthenium compound supported on the carrier of the catalyst includes the same compounds as those listed with respect to the catalysts (1) and (2) of the present invention.

The process for preparing a supported metal ruthenium catalyst will be explained below. The first embodiment of the process for preparing the supported ruthenium oxide catalyst was mentioned after the four embodiment of the process for preparing the catalyst having good thermal conductibility.

The supported metal ruthenium catalyst includes, for example, supported metal ruthenium catalyst obtained by supporting a ruthenium compound shown in the first embodiment of the process for preparing the supported ruthenium oxide on the above-described carrier in the same manner, and reducing the supported one to form metal ruthenium by using a reducing agent, for example, a reducing hydrogenated compound such as sodium boron hydrate shown in the first embodiment of the process for preparing the supported ruthenium oxide catalyst, and supported metal ruthenium catalyst obtained by supporting ruthenium chloride on the above-described carrier, forming a ruthenium hydroxide on the carrier by alkali hydrolysis, and reducing the ruthenium hydroxide by using hydrogen, but a commercially available Ru catalyst may also be used. A ratio of the metal ruthenium to the carrier in the metal ruthenium supported on the carrier is usually from 0.1/99.9 to 20/80, and preferably from 1/99 to 10/90. When the amount of the metal ruthenium is too small, the activity of the catalyst is lowered. On the other hand, when the amount of the metal ruthenium oxide is too large, the price of the catalyst becomes high.

The process for preparing a catalyst comprising a supported ruthenium compound will be explained.

The catalyst comprising a supported ruthenium compound includes the same compounds as those exemplified in the catalysts (1), (2) and (3) of the present invention.

The supporting process includes impregnation process, ion exchange process, precipitation supporting process, coprecipitation process and mixing process. Among them, impregnation process and ion exchange process are preferred.

The impregnation process includes, for example, a preparation process of suspending a carrier in a solution prepared by dissolving a ruthenium compound, evaporating a solvent, and drying. The solvent includes water, methanol and organic solvent, etc.

When the drying temperature of the supported catalyst is too high, volatilization of the ruthenium compound occurs and, therefore, the drying temperature is preferably from 30 to 200° C. under reduced pressure, and is preferably from about 60 to 400° C. under nitrogen. Under air, the drying temperature is generally a temperature at which the ruthenium compound is not decomposed by oxidation with oxygen. The drying time is preferably from about 30 minutes to 5 hours.

In a catalyst using a catalyst containing a molding obtained by integrally molding (A) an active component of catalyst and a catalyst carrier component, and (B) a compound wherein thermal conductivity of a solid phase measured by at least one point within a range from 200 to 500° C. is not less than 4 W/m. ° C., the inventors have succeeded in preparation of a catalyst having almost the same activity of the catalyst prepared from the component (A) and a catalyst carrier component as a catalyst which is obtained by integrally molding three components, a component (A), a catalyst carrier component and a component (B).

It is an object of the present invention to obtain chlorine by oxidizing hydrogen chloride with oxygen using the above catalyst system. When hydrogen chloride is oxidized with oxygen using the above catalyst, a removing rate of heat generated during the reaction increases and, therefore, control of the reaction temperature becomes easier and high reaction conversion can be obtained by keeping the whole catalyst bed at sufficient temperature for an industrially desirable reaction rate. The reaction system for producing chlorine includes, for example, a flow system such as fixed bed or fluidized bed, and a gas phase reaction such as fixed bed flow system and gas phase fluidized bed flow system can be preferably used. The fixed bed system has an advantage that separation between the reaction gas and catalyst is not required and high conversion can be accomplished. In the case of the fixed bed reactor, a reaction tube is packed with catalyst particles and, in the case of the exothermic reaction, the reaction tube is cooled from the outside. In such a packed bed, since effective thermal conductivity of the particle bed is generally smaller than that of a tube material and that of a fluid outside the tube and heat transfer resistance in the particle bed is generally larger than that of a tube material and that of a fluid outside the tube, the whole heat transfer rate can be markedly improved by increasing effective thermal conductivity in the particle bed. The term "effective thermal conductivity of the particle bed" used herein means a heat transfer rate per unit sectional area of the particle bed in a certain direction per unit length and per unit degree of difference which is 1° C. temperature. According to "Thermal Unit Operation, Vol. 1" (1976, page 136~146, Maruzen Co., Ltd.), it is known that effective thermal conductivity of the particle bed depends on effective thermal conductivity of particles to be packed and thermal conductivity of a fluid material existing in the tube, and depends on a fluid velocity when the fluid transfers. Among them, effective thermal conductivity of particles strongly depends on the thermal conductivity of the solid of the component (compound) constituting the particles and, therefore, effective thermal conductivity of the particles and effective thermal conductivity of the particle bed are increased by using the component having large thermal conductivity, and contribute to an improvement in removing rate of heat generated in the reactor in the exothermic reaction such as oxidation reaction of hydrogen chloride. As described above, the effect of the present invention is particularly large when the fixed bed system is adopted. The fluidized bed system has an advantage that heat transfer in the reactor is large and the temperature distribution width in the reactor can be minimized. The temperature distribution width can be further minimized by using the catalyst according to the present invention.

By using the catalyst which has good thermal conductibility (heat transfer) and is capable of easily removing heat, the above effect can be obtained without increasing the heat transfer area per unit volume in the reactor. For example, comparing a multitube reactors having the same reaction volumes, when the heat transfer area is increased by decreasing the diameter of the tube, the number of required tubes and amount of the required material are increased and the price of the reactor becomes high. However, when using the catalyst which has good thermal conductibility (heat transfer) and is capable of easily remove heat, control of the reaction temperature can be made easier without increasing the heat transfer area of the reactor and the reactor with cheap price can be used. Therefore, it is industrially advantageous.

The supported ruthenium oxide catalyst containing macropores having a pore diameter of 0.03 to 8 micrometer used in the catalyst (7) of the present invention is a catalyst containing a supported ruthenium oxide catalyst comprising ruthenium oxide supported on a carrier. In general, it is industrially used in the form of being supported on the carrier.

The carrier includes oxides and mixed oxides of elements, such as titanium oxide, alumina, zirconium oxide, silica, titanium mixed oxide, zirconium mixed oxide, aluminum mixed oxide, silicon mixed oxide and the like. Preferable carriers are titanium oxide, alumina, zirconium oxide and silica, and more preferable carrier is titanium oxide. A weight ratio of ruthenium oxide to the carrier is usually within a range from 0.1/99.9 to 20.0/80.0, preferably from 0.5/99.5 to 15.0/85.0, and more preferably from 1.0/99.0 to 15.0/85.0. When the proportion of the ruthenium oxide is too low, the activity is lowered sometimes. On the other hand, when the proportion of ruthenium oxide is too high, the price of the catalyst becomes high sometimes. Examples of the ruthenium oxide to be supported include ruthenium dioxide, ruthenium hydroxide and the like.

The embodiment of the process for preparing the catalyst containing macropores having a pore diameter of 0.03 to 8 micrometer will be described below. The catalyst is prepared by mixing a carrier powder of titanium oxide with an organic material for forming pores or an inorganic material for forming pores. First, the case using the organic material for forming pores will be illustrated The organic material for forming pores includes celluloses such as crystalline cellulose, fibrous cellulose, filter paper and pulp. Fibrous celluloses such as filter paper and pulp are preferred. After adding water to a carrier powder of titanium oxide and kneading, the organic material for forming pores such as cellulose is added and the mixture is sufficiently kneaded. Then, binders such as titania sol, silica sol and alumina sol may also be added or not. Binders are preferably added. Among sols, titania sol is preferred. After the sol is added and kneading, the kneaded one is extruded and molded into one having a suitable size using a molding machine, such as a extruder. After the molded one is dried, the dried one is calcined to remove the organic material for forming pores such as cellulose. The calcination temperature is preferably from 400 to 700° C., and more preferably from 500 to 600° C. By calcining the carrier under air, the organic material for forming pores can be removed by burning, thereby to form pores having a pore diameter of 0.03 to 8 micrometer in the carrier. A weight ratio of the organic material for forming pores such as cellulose to the carrier powder is usually from 1/99 to 40/60, and preferably from 5/95 to 30/70. A weight ratio of titania, silica and alumina contained in titania sol, silica sol and alumina sol to the carrier powder is usually from 5/95 to 40/60, and preferably from 10/90 to 30/70.

Then, the case using the inorganic material for forming pores will be illustrated. The inorganic material for forming pores includes alkali metal salts such as sodium chloride and potassium chloride; alkali metal sulfates such as sodium sulfate and potassium sulfate; and high-melting point inorganic salts such as potassium nitrate. Chlorides of alkali metals are preferred, and potassium chloride and sodium chloride are more preferred. After adding water to a carrier powder such as titanium oxide and kneading, an aqueous solution of the inorganic material for forming pores such as potassium chloride is added and the mixture is sufficiently kneaded. Then, binders such as titania sol, silica sol and alumina sol may also be added. Binders are preferably added. Among sols, titania sol is preferred. After the sol is added and kneading, the kneaded one is extruded and molded into one having a suitable size using a molding machine, for example a extruder. The molded one is dried. After drying, the dried one is sintered by calcining. The calcination atmosphere includes air and nitrogen, and air is preferred. The calcination temperature is preferably from 400 to 700° C., and more preferably from 500 to 600° C. After cooling to room temperature, the inorganic salt contained in the carrier can be removed by sufficiently washing the carrier with water. The process of confirming that potassium chloride and sodium chloride could be removed includes a process of examining the presence/absence of white turbidity using an aqueous silver nitrate solution. By drying the carrier after washing with water, micropores having a diameter of 0.01 to 0.4 micrometer can be formed in the carrier. A weight ratio of the inorganic material for forming pores such as inorganic salt to the carrier powder is usually from 5/95 to 40/60, and preferably from 5/95 to 30/70. A weight ratio of titania, silica and alumina contained in titania sol, silica sol and alumina sol to the carrier powder is usually from 5/95 to 40/60, and preferably from 5/95 to 30/70. The carrier having micropores can be prepared in the above manner.

Among the above-mentioned organic material for forming pores and inorganic material for forming pores organic material for forming pores is preferable.

The embodiment of the process for preparing the supported ruthenium oxide catalyst is as follows. The preparation of the supported ruthenium oxide catalyst containing macropores having a pore diameter of 0.03 to 8 micrometer is conducted in the same manner as that in process for preparing the catalyst, which is conducted in the catalysts (1), (2) and (3) of the present invention using a carrier prepared in the preparation examples of the already described carrier containing micropores.

The catalyst (7) of the present invention is characterized by using a supported ruthenium oxide catalyst containing macropores having a pore diameter of 0.03 to 8 micrometer, and the pore diameter distribution of macropores can be measured by a mercury porosimeter. The exist of many pores is preferable. The pore diameter of macropores, which can be formed by the process described above, is usually from 0.03 to 8 micrometer, and more preferably from 0.03 to 6 micrometer. The larger pore volume of macropores is preferable. The supported ruthenium oxide catalyst containing macropores is preferably a catalyst wherein a ratio of an accumulated pore volume of 0.03–6 micrometer to an accumulated pore volume of 30–200 angstroms is not less than 0.2/1.0, and preferably not less than 0.29/1.0. Since the pore diameter of the carrier does not change largely by supporting of the ruthenium compound, the pore diameter of the catalyst can be determined by measuring the pore diameter of the carrier.

As the catalyst (8) of the present invention, an outer surface-supported catalyst obtained by supporting ruthenium oxide on a carrier at the outer surface can also be used. The supported ruthenium oxide catalyst used in the present invention is a catalyst wherein the same content as that of ruthenium oxide described in the item of the supported ruthenium oxide containing macropores is used and the same carrier is preferably used, that is, a supported ruthenium oxide catalyst obtained by supporting ruthenium oxide on a carrier. In general, it is industrially used in the form of being supported on the carrier.

The carrier includes oxides and mixed oxides of elements, such as titanium oxide, alumina, zirconium oxide, silica, titanium mixed oxide, zirconium mixed oxide, aluminum mixed oxide, silicon mixed oxide and the like. Preferable carriers are titanium oxide, alumina, zirconium oxide and silica, and more preferable carrier is titanium oxide. A weight ratio of ruthenium oxide to the carrier is usually within a range from 0.1/99.9 to 20.0/80.0, preferably from 0.5/99.5 to 15.0/85.0, and more preferably from 1.0/99.0 to 15.0/85.0. When the proportion of the ruthenium oxide is too low, the activity is lowered sometimes. On the other hand, when the proportion of ruthenium oxide is too high, the price of the catalyst becomes high sometimes. Examples of the ruthenium oxide to be supported include ruthenium dioxide, ruthenium hydroxide and the like.

The process of supporting ruthenium oxide on a carrier at the outer surface includes various processes. For example, when a γ-alumina carrier is impregnated with ruthenium chloride, it is supported at the outer surface and, therefore, it is comparatively easy to prepare a catalyst wherein ruthenium oxide is supported at the outer surface. However, when a carrier such as titanium oxide is impregnated with ruthenium chloride, it penetrates into the inside of the carrier and, therefore, it is not easy to support the carrier at the outer surface. Therefore, as the process of supporting ruthenium oxide on a carrier at the outer surface, various processes have been suggested. For example, a process of supporting ruthenium chloride on a carrier by spraying is illustrated. As the process of supporting ruthenium oxide on a carrier of titanium oxide at the outer surface, any known process may be used. The present inventors have found that ruthenium chloride can be satisfactorily supported on a carrier at the outer surface by using an alkali preliminary impregnation process described below. The procedure will be explained by way of the preparation example. That is, first, a carrier of titanium oxide having a suitable particle diameter is impregnated with an aqueous solution of an alkali metal hydroxide such as potassium hydroxide and a solution of alkali such as ammonium carbonate and ammonium hydrogencarbonate. In this case, a thickness of a layer of ruthenium chloride at the surface to be supported on the carrier is determined by changing the kind of the alkali, concentration of the alkali, amount of ruthenium chloride to be supported, and time from impregnation with ruthenium chloride to drying. For example, when using potassium hydroxide, a thickness of a layer to be impregnated with ruthenium chloride can be changed by changing the concentration of the aqueous solution of potassium hydroxide within a range from 0.1 N to 2.0 N. Then, the carrier is impregnated with an aqueous solution of an alkali, and the carrier is dried. Then, the carrier is impregnated with a solution of ruthenium chloride and the carrier is dried. As the solution, an aqueous solution, a solution of an organic solvent such as alcohol, or a mixed solution of water and an organic solvent is used, and a solution of an organic solvent such as ethanol is preferred. Then, the carrier impregnated with ruthenium chloride is dried and hydrolyzed by using an alkali to form ruthenium hydroxide, which is converted into ruthenium oxide. Alternatively, the supported ruthenium chloride is reduced to form metal ruthenium, which is oxidized to form ruthenium oxide. The process for preparing the supported ruthenium oxide catalyst includes the following process.

That is, the process of supporting ruthenium chloride on a carrier at the outer surface was described above, the embodiment of the preparation process of converting one supporting ruthenium chloride into a supported ruthenium oxide catalyst is described as follows. By using the already described one obtained by supporting ruthenium chloride on a carrier at the outer surface, the process is conducted in the same manner as that in the process for preparing a catalyst conducted in the catalysts (1), (2) and (3) of the present invention.

The catalyst comprising ruthenium oxide supported on a carrier at the outer surface can be prepared in the above manner.

The alkali used in the step of preliminarily impregnating the carrier with an aqueous solution of an alkali preferably includes potassium hydroxide, sodium hydroxide, ammonium carbonate and ammonium hydrogencarbonate. The concentration of the alkali impregnated in the carrier is usually from 0.01 to 4.0 N, and preferably from 0.1 to 3.0 N. When the time from impregnation of ruthenium chloride on the carrier, which is impregnated preliminarily with the alkali, to drying is long, the inside of the carrier is also impregnated with ruthenium chloride and, therefore, a suitable time must be selected according to the kind and concentration of the alkali to be used. Usually, the catalyst is dried immediately after impregnation, or dried until 120 minutes after impregnation. Preferably, the catalyst is dried immediately after impregnation, or dried until 30 minutes after impregnation.

The catalyst of the present invention is an outer surface-supported catalyst obtained by supporting ruthenium oxide on a carrier at the outer surface, and the thickness of the layer for supporting ruthenium oxide is preferably less than 70% of a length from the surface of the carrier as a base point to the center of the carrier particles, and more preferably less than 60% of a length from the surface of the carrier as a base point to the center of the carrier particle. The process of measuring the thickness of the layer for supporting ruthenium oxide includes a process of cutting along the plane passing through the center of the particles of the supported ruthenium oxide catalyst and measuring by using a magnifying glass having graduation, and a process of cutting in the same manner and measuring by using X-ray microanalyser (EPMA). Since the ruthenium component is fixed to the carrier by impregnating the carrier with ruthenium chloride and drying, the ruthenium component does not transfer largely in the step of preparing the catalyst. Therefore, the thickness of the ruthenium oxide layer is determined by measuring the thickness of the layer supporting ruthenium chloride at the stage where the catalyst is impregnated and dried.

As described above, it is also preferable that a process uses a catalyst obtained by supporting ruthenium oxide on a carrier containing macropores at the outer surface, wherein said process combines to use a process for producing chlorine using a supported ruthenium oxide catalyst containing macropores having a pore diameter of 0.03 to 8 micrometer as the catalyst (7) with a process for producing chlorine using an outer surface-supported catalyst obtained by supporting ruthenium oxide on a carrier as the catalyst (8) at the outer surface.

The supported ruthenium catalyst using chromium oxide in the carrier used in the catalyst (9) of the present invention is a catalyst obtained by supporting ruthenium on a chromium oxide carrier.

Ruthenium to be supported include ruthenium oxide, ruthenium chloride and metal ruthenium. A catalyst obtained by calcining the solid, which is obtained by supporting ruthenium chloride or metal ruthenium on a carrier, can also be used. Preferable catalyst includes ruthenium oxide catalyst supported on chromium oxide, ruthenium chloride catalyst supported on chromium oxide, a catalyst obtained by calcining ruthenium chloride catalyst supported on chromium oxide, metal ruthenium catalyst supported on chromium oxide, and catalyst obtained by calcining metal ruthenium oxide catalyst supported on chromium oxide. More preferable catalyst includes ruthenium oxide catalyst supported on chromium oxide, and a catalyst obtained by calcining ruthenium chloride catalyst supported on chromium oxide. More preferable catalyst includes ruthenium oxide catalyst supported on chromium oxide obtained by calcining ruthenium hydroxide catalyst supported on chromium oxide, and a catalyst obtained by calcining ruthenium chloride catalyst supported on chromium oxide.

The process of supporting ruthenium includes impregnation process, ion exchange process and precipitation supporting process. Among them, impregnation process and precipitation supporting process are preferred. A weight ratio of ruthenium to the carrier is preferably within a range from 0.1/99.9 to 20/80, and preferably from 0.5/99.5 to 10/90. When the amount of ruthenium is too small, the activity is lowered sometimes. On the other hand, when the amount of ruthenium is too large, the price of the catalyst becomes high sometimes.

The process of calcining the catalyst obtained by supporting ruthenium on the carrier includes process of heating to 200–500° C. in a gas containing oxygen. The gas containing oxygen includes air and air diluted with nitrogen. Preferable calcination temperature is from 280 to 500° C., and more preferably from 300 to 450° C. The calcination time is usually from 30 minutes to 10 hours.

The third component other than the ruthenium compound may also be added, and the third component includes, for example, palladium compound, copper compound, chromium compound, vanadium compound, nickel compound, alkali metal compound, rare earth compound, manganese compound and alkali earth compound. The amount of the third component to be added is preferably form 0.1 to 10% by weight in terms of a proportion to the carrier.

The chromium oxide carrier means chromium oxide alone, or a mixture of chromium oxide and an oxide of element, or chromium mixed oxide. The oxide of the element to be mixed with chromium oxide includes alumina, silica, silica-alumina, zeolite, diatomaceous earth, titanium oxide and zirconium oxide. The chromium mixed oxide includes chromia-silica, chromia-alumina, chromia-titania and chromia-zirconia. A weight ratio of the additives to chromium oxide is usually within a range from 0/100 to 50/50, and preferably from 0/100 to 30/70. The proportion of chromium contained in the chromium mixed oxide is usually not less than 10% by weight, and preferably not less than 50% by weight.

Preferable chromium oxide carrier includes chromium oxide and chromia-titania. More preferable chromium oxide carrier is chromium oxide alone.

The chromium oxide carrier can be used in the form of a powder, or can also used after molding. The chromium carrier may be a commercially available one, and may also be prepared by using a chromium compound.

The process for preparing the catalyst includes various processes For example, the process for preparing the catalyst obtained by calcining the ruthenium chloride supported on chromium oxide includes the following preparation process. That is, there can be used a process of dissolving ruthenium chloride such as commercially available ruthenium chloride hydrate ($RuCl_3.nH_2O$) in a solvent, impregnating a chromium oxide carrier with the resulting solution, and drying and calcining.

The solvent in which ruthenium chloride is dissolved includes water, hydrochloric acid, and an organic solvent such as methanol, and water or hydrochloric acid is preferred. The amount of ruthenium chloride to be impregnated is usually from 0.1 to 20% by weight, and preferably from 0.5 to 10% by weight, in terms of ruthenium. The drying temperature is usually from 50 to 100° C. The calcination temperature is usually from 200 to 600° C., preferably from 280 to 500° C., and more preferably from 300 to 450° C. The calcination atmosphere includes gas containing oxygen and nitrogen, preferably gas containing oxygen. Preferable examples of the gas containing oxygen include air. The calcination time is usually from 30 minutes to 10 hours.

The process for preparing the ruthenium oxide catalyst supported on chromium oxide includes the following preparation process, that is, a process of suspending a chromium oxide carrier in a solution obtained by dissolving ruthenium chloride such as commercially available ruthenium chloride hydrate ($RuCl_3.nH_2O$) in a solvent, adding an alkali, hydrolyzing ruthenium chloride to form ruthenium hydroxide resulting in supporting it on the carrier by precipitation, and oxidizing the supported one to obtain a ruthenium oxide catalyst supported on chromium oxide. The solvent in which ruthenium chloride is dissolved includes water, aqueous hydrochloric acid solution, and an organic solvent such as methanol, and water or an aqueous hydrochloric acid solution is preferred.

The alkali includes aqueous solution of hydroxide of alkali metal, ammonia, carbonate of alkali metal, and carbonate of ammonia, and an aqueous solution of hydroxide of an alkali metal is preferred Preferable process of oxidizing supported ruthenium hydroxide includes a process of calcining in an air.

The calcination temperature is preferably from 280 to 500° C., and more preferably from 300 to 450° C. The calcination can also be conducted in two stages. When the calcination is conducted in two stages, the first stage is preferably conducted at low temperature ranging from 150 to 300° C. The calcination time is usually from 30 minutes to 10 hours.

The amount of ruthenium oxide to be supported is usually from 0.1 to 20% by weight, and preferably from 0.5 to 10% by weight, in terms of ruthenium.

The process for preparing a ruthenium oxide catalyst supported on chromium oxide also includes the following preparation process.

That is, preferable examples thereof include a process of impregnating a chromium oxide carrier with an aqueous ruthenium chloride solution, adding an alkali, hydrolyzing ruthenium chloride to deposit ruthenium hydroxide on the carrier, and calcining it under air. The alkali includes aqueous solution of hydroxide of alkali metal, ammonia, carbonate of alkali metal, and carbonate of ammonia, and an aqueous solution of hydroxide of an alkali metal is preferred. Preferable examples of the calcination conditions include the above conditions.

As described above, preferable examples of the ruthenium oxide catalyst supported on chromium oxide include catalyst obtained by supporting ruthenium hydroxide on a carrier and calcining the supported one under air.

It can be confirmed by X-ray analysis and analysis by XPS (X-ray photoelectron spectroscopy) that the ruthenium compound was converted into ruthenium oxide.

The process for preparing metal ruthenium catalyst supported on chromium oxide includes a process of impregnating a chromium oxide carrier with an aqueous ruthenium chloride solution, and reducing by using a reducing agent such as hydrogen, and preferable examples thereof include a process of impregnating a chromium oxide carrier with a solution obtained by dissolving commercially available ruthenium chloride hydrate ($RuCl_3.nH_2O$) in a solvent, drying the impregnated one, and reducing by calcining in a gas containing hydrogen or reducing by using a reducing agent such as sodium boron hydride or hydrazine.

The process for preparing a catalyst obtained by calcining a metal ruthenium catalyst supported on chromium oxide includes the following preparation process. That is, preferable examples thereof include a process of calcining the above-mentioned metal ruthenium catalyst supported on chromium oxide in a gas containing oxygen. The calcination temperature is preferably from 280 to 500° C., and more preferably from 300 to 450° C. The calcination time is usually from 30 minutes to 10 hours.

It is an object of the present invention to obtain chlorine by oxidizing hydrogen chloride with oxygen using the above catalyst. The reaction system used to obtain chlorine includes, for example, a flow system such as fixed bed or fluidized bed, and a gas phase reaction such as fixed bed flow system and gas phase fluidized bed flow system can be preferably used. The fixed bed system has an advantage that separation between the reaction gas and catalyst is not required and that high conversion can be accomplished because a raw gas can be sufficiently contacted with a catalyst. The fluidized bed system has an advantage that heat in the reactor can be sufficiently removed and temperature distribution width in the reactor can be minimized.

When the reaction temperature is high, volatilization of ruthenium oxide in a highly oxidized state occurs. Therefore, the reaction is preferably conducted at low temperature and the reaction temperature is usually from 100 to 500° C., preferably from 200 to 400° C. more preferably from 200 to 380° C. The reaction pressure is usually from about atmospheric pressure to 50 atm. As the raw material of oxygen, an air may be used as it is, or pure oxygen may also be used. Since other components are also discharged simultaneously when an inert nitrogen gas is discharged out of the plant, pure oxygen containing no inert gas is preferable. The theoretic molar amount of oxygen based on hydrogen chloride is ¼ mol, but oxygen is usually fed in an amount that is 0.1–10 times of the theoretical amount. In the case of the fixed bed gas phase flow system, the amount of the catalyst to be used is usually from about 10 to 20000 h$^{-1}$ in terms of a ratio (GHSV) to a feed rate of hydrogen chloride as the raw material under atmospheric pressure. GHSV means gas hourly space velocity which is a ratio of a volume of feed hydrogen chloride gas (l/h) to volume of catalyst (1).

The present invention which relates to a process for producing a supported ruthenium oxide catalyst will be described below.

The supported ruthenium oxide catalyst produced in the catalyst (1) of the present invention is a supported ruthenium oxide catalyst prepared in a ruthenium compound supporting step, an alkali treating step, a reducing compound treating step and an oxidizing step, more preferably a supported ruthenium oxide catalyst prepared in a ruthenium halide supporting step, an alkali treating step, a reducing compound treating step and an oxidizing step, and still more preferably a supported ruthenium oxide catalyst prepared in a ruthenium halide supporting step, an alkali treating step, a reducing compound treatment step, an alkali metal chloride adding step and an oxidizing step.

The supported ruthenium oxide catalyst produced in the catalyst (2) of the present invention is a supported ruthenium oxide catalyst obtained by the steps which comprises supporting a ruthenium compound on a carrier, treating the supported one by using a reducing agent to form ruthenium having an oxidation number of 1 to less than 4 valence, and oxidizing the resulted one.

The process for preparing the supported ruthenium oxide catalyst includes various processes. For example, a process for preparing a catalyst comprising ruthenium oxide having an oxidation number of 4 valence supported on a carrier can be prepared by supporting ruthenium chloride on a carrier, hydrolyzing the supported one by using an alkali, and calcining under air. Alternatively, a process for preparing a catalyst comprising supported ruthenium oxide having an oxidation number of 4 valence can also be prepared by supporting ruthenium chloride on a carrier, reducing the supported one by using various reducing agents to form ruthenium having a valence of 0, and calcining under air. It is also possible to exemplify a preparation example of a supported ruthenium oxide catalyst comprising supported ruthenium oxide having an oxidation number of 4, which is prepared by supporting ruthenium chloride on a carrier, treating the supported one by using a mixed solution of various reducing compounds and basic compounds, or treating by using an aqueous alkali solution of a reducing compound, or treating by using various reducing agents, thereby to form a ruthenium compound having an oxidation number of 1 to less than 4 valence, and calcining under air. The catalyst prepared by this preparation process can be exemplified as a preparation example which is most active to the oxidizing reaction of hydrogen chloride. The process of adjusting the oxidation number of the ruthenium compound supported on the carrier within a range from 1 to less than 4 valence includes various processes, for example, process of treating by using a mixed solution of a reducing compound and a basic compound, process of treating by using an alkali solution of a reducing compound, process of treating by using an organolithium compound, an organosodium compound or an organopotassium compound, process of treating by using an organoaluminum compound, process of treating by using an organomagnesium compound, and process of treating by using hydrogen. When using these reducing agents in an excess amount, the ruthenium compound is reduced to the valence of 0 and, therefore, it is necessary to use it in a suitable amount.

The process of measuring the oxidation number of the supported ruthenium includes various processes. For example, since nitrogen is mainly generated when using hydrazine as the reducing agent, the valence number of ruthenium can be determined by the amount of nitrogen generated.

The reaction scheme will be shown below.

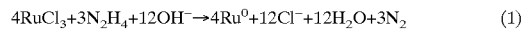

or

For example, when the ruthenium compound is reduced by using hydrazine under the conditions of an aqueous alkali solution, a hydroxide of ruthenium is formed. Therefore, the oxidation number of ruthenium can also be determined by measuring a ratio of ruthenium to oxygen and chlorine bound to ruthenium due to elemental analysis after dehydration under vacuum.

In the present invention, the oxidation number of ruthenium was determined from the amount of nitrogen generated by using the scheme (1).

The common part with the processes (1) and (2) for producing the catalyst will be explained.

The carrier includes, for example, oxides and mixed oxides of elements, such as titanium oxide, alumina, zirconium oxide, silica, titanium mixed oxide, zirconium mixed oxide, aluminum mixed oxide, silicon mixed oxide and the like. Preferable carriers are titanium oxide, alumina, zirconium oxide and silica, and more preferable carrier is titanium oxide.

The ruthenium compound to be supported on the carrier include compounds, for example, ruthenium chloride such as $RuCl_3$ and $RuCl_3$ hydrate; chlororuthenate such as $K_3RuCl_6$, $[RuCl_6]^{3-}$ and $K_2RuCl_6$; chlororuthenate hydrate such as $[RuCl_5(H_2O)_4]^{2-}$ and $[RuCl_2(H_2O)_4]^+$; salt of ruthenic acid, such as $K_2RuO_4$; rutheniumoxy chloride such as $Ru_2OCl_4$, $Ru_2OCl_5$ and $Ru_2OCl_6$; salt of rutheniumoxy chloride, such as $K_2Ru_2OCl_{10}$ and $Cs_2Ru_2OCl_4$; rutheniumammine complex such as $[Ru(NH_3)_6]^{2+}$, $[Ru(NH_3)_6]^{3+}$ and $[Ru(NH_3)_5H_2O]^{2+}$; chloride and bromide of rutheniumammine complex, such as $[Ru(H_3)_5Cl]^{2+}$, $[Ru(NH_3)_6]Cl_2$, $[Ru(NH_3)_6]Cl_3$ and $[Ru(NH_3)_6]Br_3$; ruthenium bromide such as $RuBr_3$ and $RuBr_3$ hydrate; other ruthenium-organoamine complex; ruthenium-acetylacetonato complex; ruthenium-carbonyl complex such as $Ru(CO)_5$ and $Ru_3(CO)_{12}$; ruthenium organic acid salt such as $[Ru_3O(OCOCH_3)_6(H_2O)_3]OCOCH_3$ hydrate and $Ru_2(RCOO)_4Cl$ (R: alkyl group having carbon atoms of 1–3); ruthenium-nitrosyl complex such as $K_2[RuCl_5(NO)]]$, $[Ru(NH_3)_5(NO)]Cl_3$, $[Ru(OH)(NH_3)_4(NO)](NO_3)_2$ and $Ru(NO)(NO_3)_3$; and ruthenium-phosphine complex. Preferable ruthenium compounds are ruthenium halide compounds, for example, ruthenium chloride such as $RuCl_3$ and $RuCl_3$ hydrate and ruthenium bromide such as $RuBr_3$ and $RuBr_3$ hydrate. Preferable ruthenium halide includes ruthenium chloride such as $RuCl_3$ and $RuCl_3$ hydrate and ruthenium bromide such as $RuBr_3$ and $RuBr_3$ hydrate. More preferred one is a ruthenium chloride hydrate.

The process of supporting the ruthenium compound on the carrier includes, for example, impregnation process and equilibrium adsorption process.

The alkali used in the alkali treating step includes, for example, hydroxide, carbonate and hydrogencarbonate of alkali metal; aqueous solution or solution of an organic solvent such as alcohol of ammonia, ammonium carbonate and ammonium hydrogencarbonate. As the alkali, for example, hydroxide, carbonate and hydrogencarbonate of alkali metal are preferably used. As the solvent, water is preferably used. It is also a preferable process to use one obtained by dissolving a reducing compound in an alkali solution.

The reducing compound used in the reducing compound treating step includes, for example, hydrazine, methanol, ethanol, formaldehyde, hydroxylamine or formic acid, or an aqueous solution of hydrazine, methanol, ethanol, formaldehyde, hydroxylamine or formic acid, or a solution of an organic solvent such as alcohol. Preferred are hydrazine, methanol, ethanol, formaldehyde, and solutions of hydrazine, methanol, ethanol and formaldehyde. More preferred are hydrazine and a solution of hydrazine. The reducing compound used for treating the ruthenium compound supported on the carrier includes, for example, a compound having a redox potential of −0.8 to 0.5 V, a solution thereof, and a solution of an organic solvent such as alcohol. Now a standard electrode potential is used in place of the redox potential. Among the compounds listed above, a standard electrode potential of hydrazine is −0.23 V, that of formaldehyde is 0.056 V and that of formic acid is −0.199 V, respectively. It is also a preferable process to use an aqueous alkali solution of the reducing compound.

The basic compound for preparing the catalyst (2) includes, for example, ammonia; amine such as alkyl amine, pyridine, aniline, trimethylamine and hydroxyl amine; alkali metal hydroxide such as potassium hydroxide, sodium hydroxide and lithium hydroxide; alkali metal carbonate such as potassium carbonate, sodium carbonate and lithium carbonate; hydroxide of quaternary ammonium salt; and alkyl aluminum such as triethyl aluminum.

The process of treating by using a reducing compound includes, for example, a process of dipping one obtained in the alkali treating step in a reducing compound or a solution of a reducing compound, or impregnating with a reducing compound or a solution of a reducing compound. It is also a preferable process to use an aqueous alkali solution of the reducing compound.

A process of treating by using a reducing compound or an aqueous alkali solution of a reducing compound, and adding an alkali metal chloride is also a preferable process.

The process of oxidizing includes, for example, process of calcining under air.

A weight ratio of ruthenium oxide to the carrier is preferably within a range from 0.1/99.9 to 20.0/80.0, more preferably from 0.5/99.5 to 15.0/85.0, and still more preferably from 1.0/99.0 to 15.0/85.0. When the ratio of ruthenium oxide is too low, the activity is lowered sometimes. On the other hand, when the ratio of ruthenium oxide is too high, the price of the catalyst becomes high sometimes. Examples of the ruthenium oxide to be supported include ruthenium dioxide, ruthenium hydroxide and the like.

The embodiment of the process for preparing the supported ruthenium oxide catalyst produced by the processes (1) and (2) for producing the catalyst of the present invention include a preparation process comprising the following steps:

a ruthenium compound supporting step: step of supporting a ruthenium compound on a carrier of a catalyst;

an alkali treating step: step of adding an alkali to one obtained in the ruthenium compound supporting step;

a reducing compound treating step: step of treating one obtained in the alkali treating step by using a reducing compound; and an oxidizing step: step of oxidizing one obtained in the reducing compound treating step.

It is also preferred to use an aqueous alkali solution of a reducing compound to simultaneously conduct the alkali treating step and the reducing compound treating step in the above step.

Preferred embodiment of the process of preparing the supported ruthenium oxide catalyst produced by the processes (1) and (2) for producing the catalyst of the present invention include a preparation process comprising the following steps:

a ruthenium halide compound supporting step: step of supporting a ruthenium halide compound on a carrier of a catalyst;

an alkali treating step: step of adding an alkali to one obtained in the ruthenium halide compound supporting step;

a reducing compound treating step: step of treating one obtained in the alkali treating step by using hydrazine, methanol, ethanol or formaldehyde; and an oxidizing step: step of oxidizing one obtained in the reducing compound treating step.

It is also preferred to use an aqueous alkali solution of a reducing compound to simultaneously conduct the alkali treating step and the reducing compound treating step in the above step.

More preferred embodiment of the process of preparing the supported ruthenium oxide catalyst produced by the processes (1) and (2) for producing the catalyst of the present invention include a preparation process comprising the following steps:

a ruthenium halide supporting step; step of supporting ruthenium halide on a carrier of a catalyst;

an alkali treating step: step of adding an alkali to one obtained in the ruthenium halide supporting step;

a hydrazine treating step: step of treating one obtained in the alkali treating step by using hydrazine; and an oxidizing step: step of oxidizing one obtained in the hydrazine treating step.

It is also preferred to use an aqueous alkali solution of hydrazine to simultaneously conduct the alkali treating step and the hydrazine treating step in the above step.

Still more preferred embodiment of the process of preparing the supported ruthenium oxide catalyst produced by the processes (1) and (2) for producing the catalyst of the present invention include a preparation process comprising the following steps:

a ruthenium halide supporting step: step of supporting ruthenium halide on a carrier of a catalyst;

an alkali treating step: step of adding an alkali to one obtained in the ruthenium halide supporting step;

a hydrazine treating step: step of treating one obtained in the alkali treating step by using hydrazine;

an alkali metal chloride adding step: step of adding an alkali metal chloride to one obtained in the hydrazine treating step; and an oxidizing step: step of oxidizing one obtained in the alkali metal chloride adding step.

It is also preferred to use an aqueous alkali solution of hydrazine to simultaneously conduct the alkali treating step and the hydrazine treating step in the above step.

The ruthenium halide supporting step is a step of supporting ruthenium halide on a carrier of a catalyst. The ruthenium compound to be supported on the carrier includes, for example, already listed various ruthenium compounds. Among them, preferred examples thereof are halides of ruthenium, for example, ruthenium chloride such as $RuCl_3$ and $RuCl_3$ hydrate and ruthenium bromide such as $RuBr_3$ and $RuBr_3$ hydrate. Preferred examples of the ruthenium halide include ruthenium chloride such as $RuCl_3$ and $RuCl_3$ hydrate and ruthenium bromide such as $RuBr_3$ and $RuBr_3$ hydrate. More preferred one is a ruthenium chloride hydrate.

The amount of ruthenium halide used in the ruthenium halide supporting step is usually an amount corresponding to a preferable weight ratio of ruthenium oxide to the carrier. That is, is supported by using a process of impregnating a solution of ruthenium halide with already listed carrier or adsorbing said solution to already listed carrier. As the solvent, for example, water and an organic solvent such as alcohol are used, and water is preferred. The impregnated one can be dried, and can also be treated by using an alkali without being dried, but it is preferable the impregnating one is dried. Regarding the conditions for drying the impregnated one, the drying temperature is preferably from 50 to 200° C. and the drying time is preferably from 1 to 10 hours.

The alkali treating step is a step for adding an alkali to one obtained in the ruthenium halide supporting step. The alkali used in the alkali treating step includes, for example, hydroxide, carbonate and hydrogencarbonate of alkali metal; aqueous solution of ammonia, ammonium carbonate and ammonium hydrogencarbonate; and solution of an organic solvent such as alcohol. As the alkali, for example, hydroxide, carbonate and hydrogencarbonate of alkali metal are preferably used. As the solvent, for example, water is preferably used. The concentration of the alkali varies depending on the kind of alkali to be used, but is preferably from 0.1 to 10 mol/l.

Regarding a molar ratio of the ruthenium halide to the alkali is, for example, 3 mol of sodium hydrooxide is equivalent to 1 mol of ruthenium halide in case of using sodium hydroxide. Preferably, the alkali is used in the amount of 0.1–20 times equivalent per that of ruthenium halide. The process of adding the alkali include a process of impregnating with a solution of the alkali or a process of dipping in a solution of the alkali. The time of impregnation with the solution of the alkali is usually within 60 minutes. Since the activity of the catalyst decreases when the impregnation time is long, the impregnation time is preferably within 10 minutes. The impregnation temperature is preferably from 0 to 100° C., and more preferably from 10 to 60° C.

The hydrazine treating step is a step of treating one obtained in the alkali treating step by using hydrazine. The process of treating by using hydrazine includes, for example, a process of impregnating with a solution of hydrazine and a process of dipping in a solution of hydrazine. The supported ruthenium halide treated by using the alkali in the previous step and an alkali solution may be added to a hydazine solution in a state of being mixed, or may be added to the hydazine solution after the alkaline solution was separated by filtration. A preferable process is a process of impregnating the supported ruthenium halide with the alkali and immediately adding to the hydrazine solution. The concentration of hydrazine used in the hydrazine treating step is preferably not less than 0.1 mol/l. Hydrazine hydrate such as hydrazine monohydrate may be used as it is. Alternatively, it is used as a solution of an organic solvent such as alcohol. Preferably, an aqueous solution of hydrazine or hydrazine hydrate is used. Anhydride and a monohydrate of hydrazine can also be used. Regarding a molar ratio of ruthenium halide to hydrazine, hydrazine is used in the amount of 0 1 to 20 mol per mol of ruthenium halide. The time of impregnation with the solution of hydrazine is preferably from 5 minutes to 5 hours, and more preferably from 10 minutes to 2 hours. The temperature is preferably from 0 to 100° C., and more preferably from 10 to 60° C. After dipping in the hydrazine solution, the dipping one is preferably separated from the solution by filtration.

It is also preferred to use an aqueous alkali solution of hydrazine to simultaneously conduct the alkali treating step and hydrazine treating step in the above step. Preferable process includes a process of slowly dipping one obtained in the ruthenium halide supporting step to those prepared by mixing a preferable amount of the alkali with a preferable amount of hydazine, and treating for 5 minutes to 5 hours.

More preferable process includes a process of washing a solid produced in the alkali treating step and hydrazine treating step, thereby to remove the alkali and hydrazine, and then drying, adding an alkali metal chloride in the following alkali metal chloride adding step, drying, and oxidizing.

More preferable process includes a process of washing a solid produced in the alkali treating step and hydrazine treating step by using an aqueous solution of an alkali metal chloride, and then drying, and oxidizing. This process is preferred because the removal of the alkali and hydrazine, and the addition of the alkali metal chloride can be conducted in the same step.

The alkali metal chloride adding step is a step of adding an alkali metal chloride to one obtained in the alkali treating step and hydrazine treating step. This step is not an indispensable step to prepare the supported ruthenium oxide catalyst, but the activity of the catalyst is further improved by conducting said step. That is, the resulting solid is oxidized by the following oxidizing step, but it is a preferable preparation example to convert it into highly active supported ruthenium oxide by oxidizing the resulting solid treated with the alkali and hydrazine in the presence of an alkali metal salt.

The alkali metal chloride includes, for example, chloride of alkali metal, such as potassium chloride and sodium chloride. Preferable alkaline metal chlorides are potassium chloride and sodium chloride, and more preferable one is potassium chloride. A molar ratio of the alkali metal salt to ruthenium is preferably from 0.01 to 10, and more preferably from 0.1 to 5.0. When the amount of the alkali metal salt used is too small, sufficient highly active catalyst is not obtained. On the other hand, when the amount of the alkali metal salt used is too large, the cost becomes high from an industrial point of view.

The process of impregnating with the aqueous alkali metal chloride solution includes a process of impregnating the resulting supported ruthenium one obtained by washing, drying, treating by using hydrazine, but more preferable process includes a process of impregnating the resulting supported ruthenium one treated with the alkali and hydrazine by washing with an aqueous alkali metal chloride solution without being washed with water.

For the purpose of adjusting the pH in the case of washing the resulting supported ruthenium one, hydrochloric acid can also be added to an aqueous solution of the alkali metal chloride. The concentration of the aqueous solution of the alkali metal chloride is preferably from 0.01 to 10 mol/l, and more preferably from 0.1 to 5 mol/l.

The purpose of washing lies in removal of the alkali and hydrazine, but the alkali and hydrazine can also be remained as far as the effect of the present invention is not adversely affected.

After impregnating with the alkali metal chloride, the catalyst is usually dried. Regarding the drying conditions, the drying temperature is preferably from 50 to 200° C. and the drying time is preferably from 1 to 10 hours.

The oxidizing step is a step of oxidizing one obtained in the alkali treating step and hydrazine treating step (in the case of using no alkali metal chloride adding step), or a step of oxidizing one obtained in the alkali metal chloride adding step (in the case of using the alkali metal chloride adding step). The oxidizing step can include a process of calcining under air. It is a preferable preparation example to convert it into highly active supported ruthenium oxide by calcining one treated with the alkali and hydrazine in the presence of an alkali metal salt in a gas containing oxygen. A gas containing oxygen usually includes air.

The calcination temperature is preferably from 100 to 600° C., and more preferably from 280 to 450° C. When the calcination temperature is too low, particles formed by the alkali treatment and hydrazine treatment are remained in a large amount in the form of a ruthenium oxide precursor and, therefore, the activity of the catalyst becomes insufficient sometimes. On the other hand, when the calcination temperature is too high, agglomeration of ruthenium oxide particles occur and, therefore, the activity of the catalyst is lowered. The calcination time is preferably from 30 minutes to 10 hours.

In this case, it is important to calcine in the presence of the alkali metal salt. By using this process, it is possible to obtain higher activity of the catalyst because that process of forming more fine particle of ruthenium oxide, comparing the process which includes calciing in the substantially absence of the alkali metal salt.

By the calcination, the particles supported on the carrier, which are formed by the alkali treatment and hydrazine treatment, are converted into a supported ruthenium oxide catalyst. It can be confirmed by analysis such as X-ray diffraction and XPS (X-ray photoelectron spectroscopy) that the particles formed by the alkali treatment and hydrazine treatment were converted into ruthenium oxide. Incidentally, substantially total amount of particles formed by the alkali treatment and hydrazine treatment are preferably converted into ruthenium oxide, but the particles formed by the alkali treatment and hydrazine treatment can be remained as far as the effect of the present invention is not adversely affected.

The process of oxidizing one treated with the alkali and hydrazine, washing the remained alkali metal chloride, and drying the washed one is a preferable preparation process. It is preferred that the alkali metal chloride contained on calcination is sufficiently washed with water. The process of measuring the alkali metal chloride after washing includes a process of examining the presence/absence of white turbidity by adding an aqueous silver nitrate solution to the filtrate. However, the alkali metal chloride may be remained as far as the effect of the present invention is not adversely affected.

According to a preferable preparation process, the washed catalyst is then dried. Regarding the drying conditions, the drying temperature is preferably from 50 to 200° C. and the drying time is preferably from 1 to 10 hours.

The supported ruthenium oxide catalyst produced by the above steps is highly active, and the activity was higher than that of the catalyst prepared by oxidizing a catalyst obtained by reducing ruthenium chloride with hydrogen. Furthermore, a catalyst obtained by previously treating ruthenium chloride by using an alkali, treating by using hydrazine, or treating by using alkali and hydrazine simultaneously, and oxidizing showed higher activity than that of a catalyst obtained by treating ruthenium chloride with hydrazine, and oxidizing.

The supported ruthenium oxide catalyst produced by the process (3) for producing the catalyst of the present invention is a supported ruthenium oxide catalyst using titanium oxide containing rutile titanium oxide as a carrier. As the titanium oxide, for example, rutile titanium oxide, anatase titanium oxide and non-crystal titanium oxide are known. The titanium oxide containing rutile titanium oxide used in the present invention refers to one containing a rutile crystal by measuring a ratio of the rutile crystal to the anatase crystal in the titanium oxide by X-ray diffraction analysis. The measuring process will be described in detail hereinafter. When the chemical composition of the carrier used in the present invention is composed of titanium oxide alone, the proportion of the rutile crystal is determined from a ratio of the rutile crystal to the anatase crystal in the titanium oxide by using X-ray diffraction analysis. In the present invention, a mixed oxide of the titanium oxide and other metal oxide is also used. In that case, the proportion of the rutile crystal is determined by the following process. The oxide to be mixed with the titanium oxide includes oxides of elements, and preferred examples thereof include alumina, zirconium oxide and silica. The proportion of the rutile crystal in the mixed oxide is also determined from the ratio of the rutile crystal to the anatase crystal in the titanium oxide by using X-ray diffraction analysis, but it is necessary to contain the rutile crystal. In this case, the content of the oxide other than the titanium oxide in the mixed oxide is within a range from 0 to 60% by weight. Preferred carrier includes titanium oxide which does not contain a metal oxide other than titanium oxide.

It is necessary that the titanium oxide contains the rutile crystal. The content of the rutile crystal is preferably not less than 10%, more preferably not less than 30%, and most preferably not less than 80%.

The process for preparing the titanium oxide containing the rutile crystal includes various processes. In general, the following processes are exemplified. For example, when using titanium tetrachloride as a raw material, titanium tetrachloride is dissolved by adding dropwise in ice-cooled water, and then neutralized with an aqueous ammonia solution to form titanium hydroxide (ortho-titanic acid). Thereafter, the formed precipitate was washed with water to remove a chlorine ion. In that case, when the temperature on neutralization becomes higher than 20° C. or the chlorine ion is remained in the titanium oxide after washing, conversion into a stable rutile crystal is liable to occur on calcination. When the calcination temperature becomes not less than 600° C., conversion into rutile occurs (Catalyst Preparation Chemistry, 1989, page 211, Kodansha). For example, a reaction gas is prepared by passing an oxygen-nitrogen mixed gas through a titanium tetrachloride evaporator and the reaction gas is introduced into a reactor. The reaction between titanium tetrachloride and oxygen starts at a temperature of about 400° C. and titanium dioxide formed by the reaction of a $TiCl_4$—$O_2$ system is mainly an anatase type. However, when the reaction temperature becomes not less than 900° C., formation of a rutile type can be observed (Catalyst Preparation Chemistry, 1989, page 89, Kodansha). The preparation process includes, for example, a process of hydrolyzing titanium tetrachloride in the presence of ammonium sulfate and calcining (erg. Shokubai Kougaku Kouza 10, Catalyst Handbook by Element, 1978, page 254, Chijin Shokan) and a process of calcining an anatase titanium oxide (e.g. Metal Oxide and Mixed Oxide, 1980, page 107, Kodansha). Furthermore, rutile titanium oxide can be obtained by a process for hydrolyzing an aqueous solution of titanium tetrachloride by heating. Rutile titanium oxide is also formed by previously mixing an aqueous titanium compound solution of titanium sulfate or titanium chloride with a rutile titanium oxide powder, hydrolyzing the mixture by heating or using an alkali, and calcining at low temperature of about 500° C.

The process of determining the proportion of the rutile crystal in the titanium oxide includes a X-ray diffraction analysis and, as a X-ray source, various X-ray sources can be used. For example, a K α ray of copper is used. When using the K α ray of copper, the proportion of the rutile crystal and the proportion of the anatase are respectively determined by using an intensity of a diffraction peak of 2θ=27.5 degree of the plane (110) and an intensity of a diffraction peak of 2θ=25.3 degree of the plane (101). The carrier used in the present invention is one having a peak intensity of the rutile crystal and a peak intensity of the anatase crystal, or one having a peak intensity of the rutile crystal. That is, the carrier has both of a diffraction peak intensity of the rutile crystal and a diffraction peak of the anatase crystal, or has only a diffraction peak of the rutile crystal. Preferred carrier is one wherein a proportion of the peak intensity of the rutile crystal to the total of the peak intensity of the rutile crystal and the peak intensity of the anatase crystal is not less than 10%. Also in the supported ruthenium oxide catalyst using the titanium oxide carrier containing rutile titanium oxide, an amount of an OH group contained in the carrier is preferably similar amount to the catalyst which is produced by the process (4) of the present invention. Although the details will be described with regard as the process (4) for producing the catalyst of the present invention, the amount of the OH group of the titanium oxide of the carrier used in the catalyst is usually from $0.1 \times 10^{-4}$ to $30 \times 10^{-4}$ (mol/g-carrier), preferably from $0.2 \times 10^{-4}$ to $20 \times 10^{-4}$ (mol/g-carrier), and more preferably from $3.0 \times 10^{-4}$ to $15 \times 10^{-4}$ (mol/g-carrier).

The supported ruthenium oxide catalyst produced by the process (4) for producing the catalyst of the present invention is a supported ruthenium oxide catalyst obtained by the steps which comprises supporting a ruthenium compound on a carrier, treating the supported one by using a reducing compound or a reducing agent in a liquid phase, and oxidizing the resulted one, wherein titanium oxide containing an OH group in an amount of $0.1 \times 10^{-4}$ to $30 \times 10^{-4}$ (mol/g-carrier) per unit weight of a carrier is used as the carrier. The carrier includes, for example, rutile crystal carrier, anatase crystal carrier and non-crystal carrier. Preferable carriers are rutile crystal carrier and anatase crystal carrier, and more preferable one is rutile crystal carrier. It is generally known that a hydroxyl group represented by OH bound to Ti exists on the surface of the titanium oxide. The titanium oxide used in the present invention is one containing an OH group, and the process of measuring the content of OH group will be described in detail hereinafter. When the chemical composition of the carrier used in the present invention is consisting essentially of titanium oxide alone, it is determined from the content of the OH group in the titanium oxide. In the present invention, a mixed oxide of the titanium oxide and other metal oxide is also used. The oxide to be mixed with the titanium oxide includes oxides of elements, and preferred examples thereof include alumina, zirconium oxide and silica. In that case, the content of the oxide other than the titanium oxide in the mixed oxide is within a range from 0 to 60% by weight. Also this case, the content of the OH group per unit weight of the carrier contained in the carrier is determined by the measuring process which is also described in detail hereinafter. Preferred carrier is titanium oxide which does not contain the metal oxide other than the titanium oxide.

When the content of the OH group of the carrier is large, the carrier and supported ruthenium oxide may react each other, resulting in deactivation. On the other hand, when the content of the OH group of the carrier is small, the activity of the catalyst is lowered sometimes by sintering of the supported ruthenium oxide and the other phenomenon.

The process of determining the content of the OH group of the titanium oxide includes various processes. For example, a process using a thermogravimetric process (TG) is exemplified. When using the thermogravimetric process, the temperature is kept constant and, after removing excess water in a sample, the sample is heated and the content of the OH group is measured from a weight loss. According to this process, the amount of the sample is small and it is difficult to measure with good accuracy. When heat decomposable impurities exist in the carrier, there is a drawback that the actual content of the OH group is not determined. When using the measurement of ignition loss (Igloss) for measuring the content of the OH group from the weight loss of the sample in the same manner, the measurement with high accuracy can be conducted if the amount of the sample is increased. However, an influence of the heat decomposable impurities is exerted similar to the case of the thermogravimetric process. Furthermore, there is also a drawback that the weight loss obtained by the thermogravimetric process and ignition loss measurement also includes the bulk OH group content which is not effective on preparation of the catalyst.

A process using sodium naphthalene is also exemplified. According to this process, an OH group in a sample is reacted with sodium naphthalene as a reagent and then the content of the OH group is measured from the titration amount of sodium naphthalene. In this case, since a change in concentration of the reagent for titration and a trace amount of water exert a large influence on the results, the measuring results are influenced by the storage state of the reagent. Therefore, it is very difficult to obtain a value with good accuracy.

A titration process using an alkyl alkali metal is also exemplified. The titration process using the alkyl alkali metal includes a preferable process of suspending a titanium oxide carrier or a titanium oxide carrier powder in a dehydrated solvent, adding dropwise an alkyl alkali metal in a nitrogen atmosphere, and determining the amount of the OH group contained in the titanium oxide from the amount of hydrocarbon generated. In that case, since an alkyl alkali metal and water contained in the dehydrated solvent react each other to generate hydrocarbon, the content of the OH group in the titanium oxide must be determined by subtracting the generated amount from the measured value.

Most preferred process includes a process of suspending a titanium oxide carrier or a titanium oxide carrier powder in a dehydrated toluene, adding dropwise methyl lithium in a nitrogen atmosphere, and determining the amount of the OH group contained in the titanium oxide from the amount of methane generated, and the content of the OH group in the titanium oxide catalyst of the present invention is a value obtained by this process.

The measuring procedure includes, for example, the following process. First, a sample is previously dried under air atmosphere at a temperature of 150° C. for 2 hours and then cooled in a desiccator. Thereafter, a predetermined amount of the sample is transferred in a flask whose atmosphere was replaced by nitrogen, and then suspended in an organic solvent such as dehydrated toluene. The flask is ice-cooled to inhibit heat generation and, after adding dropwise methyl lithium from a dropping funnel, the generated gas is collected and the volume at the measuring temperature is measured. The content of the OH group thus determined, which is used in the catalyst, is usually from $0.1 \times 10^{-4}$ to $30 \times 10^{-4}$ (mol/g-carrier), preferably from $0.2 \times 10^{-4}$ to $20 \times 10^{-4}$ (mol/g-carrier), and more preferably from $3.0 \times 10^{-4}$ to $15 \times 10^{-4}$ (mol/g-carrier).

The process of adjusting the amount of the OH group contained in the titanium oxide carrier to a predetermined amount includes various processes. For example, a calcination temperature and a calcination time of the carrier are used for adjusting the OH group of the carrier. The OH group in the titanium oxide carrier is eliminated by heating, and the content of the OH group can be controlled by changing the calcination temperature and calcination time. The calcination temperature of the carrier is usually from 100 to 1000° C., and preferably from 150 to 800° C. The calcination time of the carrier is usually from 30 minutes to 12 hours. In this case, it is necessary to pay attention to the point that the surface area of the carrier decreases with the increase of the calcination temperature or the calcination time. When the titanium oxide is produced from a gas phase, one having small content of the OH group can be produced. Furthermore, when the titanium oxide is produced from an aqueous phase such as aqueous solution, one having large content of the OH group can be produced. Furthermore, a process of treating the OH group of the carrier by using an alkali and a process of reacting the OH group by using 1,1,1-3,3,3-hexamethyldisilazane are exemplified.

The present invention relates to a process for producing a supported ruthenium oxide catalyst using the above carrier. A weight ratio of ruthenium oxide to the carrier is usually within a range from 0.1/99.9 to 20.0/80.0, preferably from 0.5/99.5 to 15.0/85.0, and more preferably from 1.0/99.0 to 15.0/85.0. When the ratio of ruthenium oxide is too low, the activity is lowered sometimes. On the other hand, when the ratio of ruthenium oxide is too high, the price of the catalyst becomes high sometimes. Examples of the ruthenium oxide to be supported include ruthenium dioxide, ruthenium hydroxide and the like.

The process for preparing the supported ruthenium oxide catalyst by using the above carrier is a process comprising the steps of supporting a ruthenium compound on a carrier, treating the supported one by using a reducing compound or a reducing agent in a liquid phase, and oxidizing. A process of treating the supported one reducing by using a reducing compound or a reducing agent in a liquid phase includes, for example, a process of treating the supported one by using a reducing compound or a reducing agent in a liquid phase which is conducted in the catalysts produced (1), (2) of the present invention and in the catalysts reduced by a reducing agent such as sodium boron hydride, and the process described below. That is, the process includes a process of suspending one comprising the already described ruthenium compound supported on the carrier in an aqueous phase or an organic solvent, and bubbling hydrogen, a process of treating by using an organolithium compound such as butyl lithium, or an organosodium compound or an organopotassium compound in an organic solvent, a process of treating by using an organoaluminum compound such as trialkyl aluminum, and a process of treating by using an organomagnesium compound such as Grignard reagent. Furthermore, various organometallic compounds can be used and examples thereof include alkali metal alkoxide such as sodium methoxide; alkali metal naphthalene compound such as sodium naphthalene; azide compound such as sodium azide; alkali amide compound such as sodium amide; organocalcium compound, organozinc compound; organoaluminum alkoxide such as alkyl aluminum alkoxide; organotin compound; organocopper compound; organoboron compound; boranes such as borane and diborane; sodium ammonia solution; and carbon monoxide. Various organic compound can also be used and examples thereof include diazomethane, hydroquinone and oxalic acid.

In a process for producing a supported ruthenium oxide catalyst, it is preferable that the catalyst (1) or (2) is a supported ruthenium oxide catalyst obtained by using titanium oxide containing not less than 10% by weight of rutile titanium oxide as a carrier. It is more preferable that the catalyst (1) or (2) is a supported ruthenium oxide catalyst obtained by using titanium oxide containing not less than 30% by weight of rutile titanium oxide as a carrier.

It is preferable that in the case of the catalyst (3) or (4), said process comprises supporting a ruthenium compound on a carrier, reducing the supported one by using a reducing hydrogenated compound, and oxidizing.

It is preferable that in the case of the catalyst (3) or (4), said process comprises supporting a ruthenium compound on a carrier, treating the supported one by using a reducing compound, and oxidizing.

It is preferable that in the case of the catalyst (3) or (4), said process comprises supporting a ruthenium compound on a carrier, treating the supported one by using an alkali solution of a reducing compound, and oxidizing.

It is preferable that the catalyst (3) or (4) is obtained by supporting a ruthenium halide on a carrier, treating the supported one by using a reducing compound, and oxidizing.

It is preferable that the catalyst (3) or (4) is obtained by supporting a ruthenium halide on a carrier, treating the supported one by using an alkali solution of a reducing compound, and oxidizing.

The catalyst produced by the process (5) for producing a catalyst of the present invention is a supported ruthenium oxide catalyst containing ruthenium oxide only at an outer surface layer, not less than 80% of the outer surface of said catalyst satisfying the following expression (1):

$$S/L < 0.35 \qquad (1)$$

wherein L is a distance between a point (A) and a point (B), said point (B) being a point formed on the surface of a catalyst when a perpendicular line dropped from any point (A) on the surface of the catalyst to the inside of the catalyst goes out from the catalyst at the opposite side of the point (A), and S is a distance between the point (A) and a point (C), said point (C) being a point on the perpendicular line where ruthenium oxide does not exist.

Furthermore, preferably, S/L<0.30.

That is, as defined in the above formula (1), the catalyst of the present invention substantially contains ruthenium oxide only at an outer surface shell layer, and does not contain ruthenium oxide in the inside of the catalyst. By adopting such a structure, the activity per unit weight of ruthenium contained in the catalyst can be enhanced.

The structure of the catalyst of the present invention will be described specifically by using a cross sectional view of the catalyst.

The case where the catalyst has a spherical shape is as shown in FIG. 1. L corresponds to a diameter passing through a center of a sphere and S corresponds to a thickness of an outer surface shell layer of a sphere containing ruthenium oxide.

Figure 2:
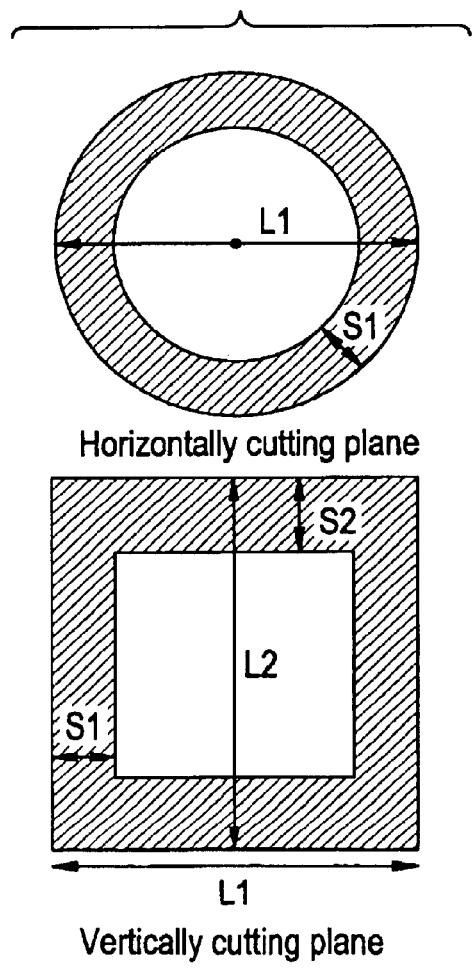

The case where the catalyst has a columnar shape is as shown in FIG. 2.

Figure 3:
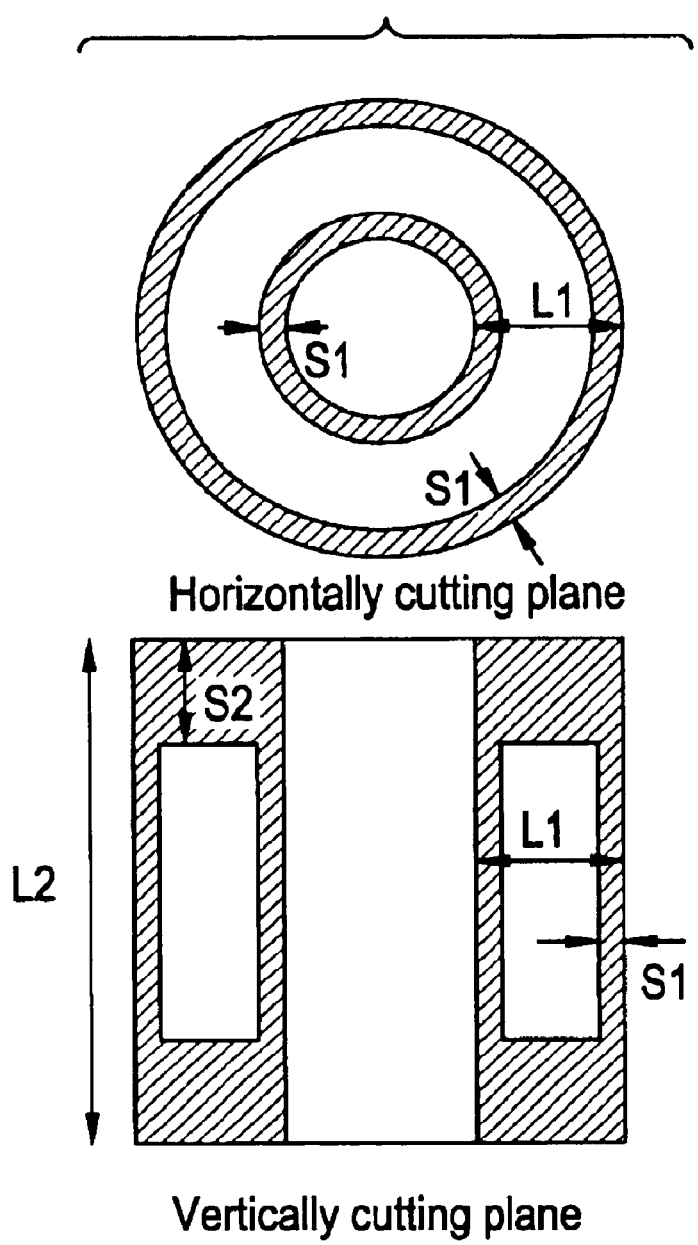

The case where the catalyst has a cylindrical tablet is as shown in FIG. 3.

The catalyst of the present invention may have a shape other than that described above.

The process for producing the catalyst explained below is preferable to obtain a catalyst suited for the above conditions. Particularly, preferably the catalyst is prepared so as to satisfy the above formula (1) by preliminarily supporting an alkali on a carrier to be used, supporting a specific ruthenium compound, and forming a precipitate of a ruthenium compound on the outer surface of the carrier by the acid-base reaction.

The process of confirming that the catalyst satisfies the above formula (1) includes a process of cutting along the plane passing through the center of the particles of the supported ruthenium oxide catalyst and measuring by using a magnifying glass having graduation, and a process of cutting in the same manner and measuring by using X-ray microanalyser (Electron probe micro analyzer) (EPMA). Since the ruthenium component is fixed to the carrier by forming a precipitate of a ruthenium compound on the carrier and drying, the ruthenium component does not transfer largely in the step of preparing the catalyst. Therefore, the thickness of the ruthenium oxide layer is determined by measuring the thickness of the layer supporting the ruthenium compound at the stage where the ruthenium compound forms a precipitate on the carrier and dried.

The catalyst of the present invention is produced by supporting an alkali on a carrier, supporting at least one ruthenium compound selected from the group consisting of ruthenium halide, rutheniumoxy chloride, ruthenium-acetonato complex, ruthenium organic acid salt and ruthenium-nitrosyl complex, treating the supported one by using a reducing agent, and oxidizing. By using these steps, the activity of the catalyst can be enhanced.

The carrier includes oxides and mixed oxides of elements, such as titanium oxide, alumina, zirconium oxide, silica, titanium mixed oxide, zirconium mixed oxide, aluminum mixed oxide, silicon mixed oxide and the like. Preferable carriers are titanium oxide, alumina, zirconium oxide and silica, and more preferable carrier is titanium oxide. A weight ratio of ruthenium oxide to the carrier is usually within a range from 0.1/99.9 to 20.0/80.0, preferably from 0.5/99.5 to 15.0/85.0. and more preferably from 1.0/99.0 to 15.0/85.0. When the proportion of the ruthenium oxide is too low, the activity is lowered sometimes. On the other hand, when the proportion of ruthenium oxide is too high, the price of the catalyst becomes high sometimes. Examples of the ruthenium oxide to be supported include ruthenium dioxide, ruthenium hydroxide and the like.

The process of supporting ruthenium oxide on a carrier at the outer surface will be explained below. That is, the present inventors have found that ruthenium oxide can be satisfactorily supported on a carrier such as titanium oxide at the outer surface by using an alkali preliminary impregnation process described below and, therefore, the example of procedure will be explained by way of the preparation example. That is, first, a carrier of titanium oxide having a suitable particle diameter is impregnated with an aqueous solution of an alkali metal hydroxide such as potassium hydroxide or an alkali such as ammonium carbonate and ammonium hydrogencarbonate. In this case, a thickness of a layer of a ruthenium compound at the surface to be supported on the carrier is decided by changing the kind of the alkali, concentration of the alkali, amount of ruthenium compound to be supported, and time from impregnation with ruthenium compound to drying. For example, when using potassium hydroxide, a thickness of a layer to be impregnated with the ruthenium compound can be changed by changing the concentration of the aqueous solution within a range from 0.1 N to 2.0 N. Then, the carrier is impregnated with an aqueous solution of an alkali and the carrier is dried. Then, the carrier is impregnated with a solution of ruthenium chloride. As the solution, an aqueous solution, a solution of an organic solvent such as alcohol, or a mixed solution of water and an organic solvent is used, but a solution of an organic solvent such as ethanol is preferred. Then, the carrier impregnated with the ruthenium compound is dried and hydrolyzed by using an alkali to form ruthenium hydroxide, which is converted into ruthenium oxide. Alternatively, the supported ruthenium compound is reduced to form metal ruthenium, which is oxidized to form ruthenium oxide.

The alkali used preferably in the step of impregnating the carrier with an aqueous solution of an alkali includes potassium hydroxide, sodium hydroxide, ammonium carbonate and ammonium hydrogencarbonate. The concentration of the alkali with which the carrier is impregnated is usually from 0.01 to 4.0 N, and preferably from 0.1 to 3.0 N. When the time from impregnation of ruthenium compound with the carrier, which is impregnated with the alkali, to drying is long, the inside of the carrier is impregnated with ruthenium compound and, therefore, a suitable time must be selected according to the kind and concentration of the alkali to be used. Usually, the support is dried immediately after impregnation, or dried until 120 minutes after impregnation. Preferably, the catalyst is dried immediately after impregnation, or dried until 30 minutes after impregnation.

The ruthenium compound to be supported on the carrier include halide of ruthenium, for example, ruthenium chloride such as $RuCl_3$ and $RuCl_3$ hydrate and ruthenium bromide such as $RuBr_3$ and $RuBr_3$ hydrate; rutheniumoxy chloride such as $Ru_2OCl_4$, $Ru_2OCl_5$ and $Ru_2OCl_6$; [Ru($CH_3COCHCOCH_3$)$_3$]ruthenium-acetylacetonato complex; ruthenium organic acid salt such as [$Ru_3O$ ($OCOCH_3$)$_6$ ($H_2O$)$_3$]$OCOCH_3$ hydrate and $Ru_2(RCOO)_4Cl$(R: alkyl group having carbon atoms of 1–3); and ruthenium-nitrosyl complex such as [Ru(NH$_3$)$_5$(NO)]Cl$_3$, [Ru(OH) (NH$_3$)$_4$ (NO)](NO$_3$)$_2$ and Ru(NO) (NO$_3$)$_3$. Preferable ruthenium compounds are ruthenium halide, for example, ruthenium chloride such as $RuCl_3$ and $RuCl_3$ hydrate and ruthenium bromide such as $RuBr_3$ and $RuBr_3$ hydrate. More preferred one is a ruthenium chloride hydrate.

Then, the embodiment of the process for preparing a supported ruthenium oxide catalyst will be described. That is, a process of hydrolyzing a supported ruthenium by using an alkali such as aqueous solution of an alkali metal hydroxide to form ruthenium hydroxide, and oxidizing to form ruthenium oxide, and a process of reducing a supported ruthenium compound to form metal ruthenium, and oxidizing to form ruthenium oxide are exemplified. Now a process of reducing a ruthenium compound will be illustrated. The process of reducing a ruthenium compound includes a process of heating under a hydrogen gas flow, a process of performing wet reduction by using hydrazine, formaldehyde and sodium boron hydride and a process of reducing by using lithium boron halide, potassium boron halide, lithium tri-sec-butyl-boron halide, sodium tri-sec-butyl-boron halide, potassium tri-sec-butyl-boron halide, lithium aluminum hydride, diisobutylaluminum hydride, sodium hydride and potassium hydride. Now the process using sodium boron hydride (NaBH$_4$) will be illustrated. That is, a ruthenium compound is supported on the above-mentioned carrier, dried and then dipped in a solution of sodium boron hydride. The solution includes aqueous solution, and solution of an organic solution such as alcohol. A mixed solution of water and an organic solvent can also be used. After wet reduction is conducted by using the above-mentioned solution, the reduced one is washed with water and then dried. Then, the carrier supporting ruthenium is oxidized to form ruthenium oxide. A process using an oxidizing agent and a process of calcining under air can be used. It is also preferable process that a process of impregnating a ruthenium supported one with an aqueous alkali metal chloride solution, drying the impregnated one, and calcining under air to form ruthenium oxide. In this case, a supported ruthenium oxide catalyst can be prepared by washing the remained alkali metal chloride with water, and drying.

The amount of the ruthenium compound with which the carrier is impregnated is usually the same amount as that of the ruthenium compound, which corresponds to the already described preferable amount of ruthenium oxide to be supported.

The reducing agent used in the case of reducing the supported ruthenium compound includes various reducing agents. When using sodium boron hydride ($NaBH_4$), it is preferably used in the form of a solution. The concentration is usually from 0.05 to 20% by weight, and preferably from 0.1 to 10% by weight. A molar ratio of sodium boron hydride to the supported ruthenium compound is usually from 1.0 to 30, and preferably from 2.0 to 15.

Then, a process for preparing a supported ruthenium oxide catalyst by oxidizing the resulting supported metal ruthenium catalyst after reduction will be illustrated. Now the process of calcining under air is illustrated. It is a preferable preparation example that the supported metal ruthenium is oxidized by calcining under gas containing oxygen in the presence of an alkali metal salt to form highly active supported ruthenium oxide. As the gas containing oxygen, an air is usually used.

The calcination temperature is usually from 100 to 600° C., and preferably from 280 to 450° C. When the calcination temperature is too low, metal ruthenium particles are remained in a large amount and, therefore, the activity of the catalyst becomes insufficient sometimes. On the other hand, when the calcination temperature is too high, agglomeration of ruthenium oxide particles occur and, therefore, the activity of the catalyst is lowered. The calcination time is preferably from 30 minutes to 10 hours.

In this case, it is preferred to calcine in the presence of an alkali metal salt. By using this process, it is possible to obtain higher activity of the catalyst because that process can forming more fine particles of ruthenium oxide comparing the process which include calcining in the substantially absence of the alkali metal salt.

The alkali metal salt includes potassium chloride and sodium chloride. Among them, potassium chloride and sodium chloride are preferred, and potassium chloride is more preferred.

A molar ratio of the alkali metal salt to ruthenium is preferably from 0.01 to 10, and more preferably from 0.1 to 5. When the amount of the alkali metal salt to be used is too small, sufficiently highly active catalyst is not obtained. On the other hand, when the amount of the alkali metal salt is too small, the industrial cost becomes high.

By the calcination, metal ruthenium supported on the carrier is converted into a supported ruthenium oxide catalyst. It can be confirmed by analysis such as X-ray diffraction and XPS (X-ray photoelectron spectroscopy) that the metal ruthenium was converted into ruthenium oxide. Incidentally, substantially total amount of the metal ruthenium is preferably converted into ruthenium oxide, but the metal ruthenium can be remained as far as the effect of the present invention is not adversely affected.

It is also possible to obtain chlorine by oxidizing hydrogen chloride with oxygen using the catalyst of the present invention. The reaction system used to obtain chlorine includes, for example, flow system such as fixed bed or fluidized bed, and a gas phase reaction such as fixed bed flow system and gas phase fluidized bed flow system can be preferably used. The fixed bed system has an advantage that separation between the reaction gas and catalyst is not required and that high conversion can be accomplished because a raw gas can be sufficiently contacted with a catalyst. The fluidized bed system has an advantage that heat in the reactor can be sufficiently removed and temperature distribution width in the reactor can be minimized.

When the reaction temperature is high, volatilization of ruthenium oxide in a highly oxidized state occurs. Therefore, the reaction is preferably conducted at low temperature and the reaction temperature is usually from 100 to500° C., preferably from 200 to400° C., more preferably from 200 to 380° C. The reaction pressure is usually from about atmospheric pressure to 50 atm. As the raw material of oxygen, an air may be used as it is, or pure oxygen may also be used. Since other components are also discharged simultaneously when an inert nitrogen gas is discharged out of the plant pure oxygen containing no inert gas is preferable. The theoretic molar amount of oxygen based on hydrogen chloride is ¼ mol, but oxygen is usually fed in an amount that is 0.1–10 times of the theoretical amount. In the case of the fixed bed gas phase flow system, the amount of the catalyst to be used is usually from about 10 to 20000 $h^{-1}$ in terms of a ratio (GHSV) to a feed rate of hydrogen chloride as the raw material under atmospheric pressure. GHSV means gas hourly space velocity which is a ratio of a volume of feed hydrogen chloride gas (l/h) to volume of catalyst (1).

The present invention which relates to a supported ruthenium oxide catalyst will be described below.

The supported ruthenium oxide of the present invention is a supported ruthenium oxide catalyst using titanium oxide containing not less than 20% of rutile titanium oxide as a carrier. As the titanium oxide, for example, rutile titanium oxide, anatase titanium oxide and non-crystal titanium oxide are known. The titanium oxide containing rutile titanium oxide used in the present invention refers to one containing a rutile crystal by measuring a ratio of the rutile crystal to the anatase crystal in the titanium oxide by using X-ray diffraction analysis. The measuring process was described in detail in this invention which relates to a process for producing chlorine and a process for producing a supported ruthenium oxide catalyst. When the chemical composition of the carrier used in the present invention is composed of titanium oxide alone, the proportion of the rutile crystal is determined from a ratio of the rutile crystal to the anatase crystal in the titanium oxide by using X-ray diffraction analysis. In the present invention, a mixed oxide of the titanium oxide and other metal oxide is also used. In that case, the proportion of the rutile crystal is determined by the following process. The oxide to be mixed with the titanium oxide includes oxides of elements, and preferred examples thereof include alumina, zirconium oxide and silica. The proportion of the rutile crystal in the mixed oxide is also determined from the ratio of the rutile crystal to the anatase crystal in the titanium oxide by using X-ray diffraction analysis, but it is necessary to contain the rutile crystal. In this case, the content of the oxide other than the titanium oxide in the mixed oxide is within a range from 0 to 60% by weight. Preferred carrier includes titanium oxide which does not contain a metal oxide other than titanium oxide.

The catalyst activity increases higher as the content of rutile crystal in titanium oxide becomes larger because the catalyst activity of the ruthenium oxide supported on rutile crystal titanium oxide is higher than the catalyst activity of the ruthenium oxide supported on anatase crystal or non-crystal titanium oxide It is necessary that the titanium oxide contains not less than 20% of the rutile crystal. The content of the rutile crystal is preferably not less than 30%, more preferably not less than 80%, and most preferably not less than 90%.

The process for preparing the titanium oxide containing the rutile crystal includes various processes and described in this invention which relates to a process for producing chlorine and a process for producing a supported ruthenium oxide catalyst.

The process of determining the proportion of the rutile crystal in the titanium oxide includes a X-ray diffraction analysis. The carrier used in the present invention is one having both of a diffraction peak intensity of the rutile crystal and a diffraction peak of the anatase crystal. The carrier includes one wherein a proportion of the peak intensity of the rutile crystal to the total of the peak intensity of the rutile crystal and the peak intensity of the anatase crystal is not less than 20%, and preferably not less than 30%.

The catalyst activity can be increased by the optimization of the content of OH group contained in a carrier when the supported ruthenium oxide catalyst on the titanium oxide containing not less than 20% of rutile titanium oxide is used in the oxidation reaction.

It is generally known that a hydroxyl group represented by OH bound to Ti exists on the surface of the titanium oxide. The titanium oxide used in the present invention is one containing an OH group. And the process of measuring the content of OH group was described in this invention which relates to a process for producing chlorine and a process for producing a supported ruthenium oxide catalyst. When the chemical composition of the carrier used in the present invention is composed of titanium oxide alone, it is determined from the content of the OH group in the titanium oxide. In the present invention, a mixed oxide of the titanium oxide and other metal oxide is also contained. The oxide to be mixed with the titanium oxide includes oxides of elements, and preferred examples thereof include alumina, zirconium oxide and silica. In that case, the content of the oxide other than the titanium oxide in the mixed oxide is within a range from 0 to 60% by weight. Preferred carrier is titanium oxide which does not contain the metal oxide other than the titanium oxide.

When the content of the OH group of the carrier is large, the carrier and supported ruthenium oxide may react each other, resulting in deactivation. On the other hand, when the content of the OH group of the carrier is small, the activity of the catalyst is lowered sometimes by sintering of the supported ruthenium oxide and the other phenomenon.

That is, in the range of the content of OH group, the catalyst activity increases to show the peak and decreases as the content of OH group increases wherein the content of OH group has appropriate range corresponding to the amount of the ruthenium compound for supporting. Thus, the catalyst shows a high activity in the appropriate range of the content of OH group. The content of the OH group, which is used in the catalyst, is usually from $0.1 \times 10^{-4}$ to $30 \times 10^{-4}$ (mol/g-carrier), preferably from $0.2 \times 10^{-4}$ to $20 \times 10^{-4}$ (mol/g-carrier), and more preferably from $3.0 \times 10^{-4}$ to $10 \times 10^{-4}$ (mol/g-carrier).

The process of adjusting the amount of the OH group contained in the titanium oxide carrier to a predetermined amount was described in this invention which relates to a process for producing chlorine and a process for producing a supported ruthenium oxide catalyst.

The present invention relates to a supported ruthenium oxide catalyst supported on the above carrier, and a weight ratio of ruthenium oxide to the carrier is usually within a range from 0.1/99.9 to 20.0/80.0, preferably from 0.5/99.5 to 15.0/85.0, and more preferably from 1.0/99.0 to 15.0/85.0. When the proportion of ruthenium oxide is too low, the activity is lowered sometimes. On the other hand, when the proportion of ruthenium oxide is too high, the price of the catalyst becomes high sometimes. Examples of the ruthenium oxide to be supported include ruthenium dioxide, ruthenium hydroxide and the like.

The process for preparing the supported ruthenium oxide catalyst by using the above carrier includes various processes.

The process for preparing the supported ruthenium oxide catalyst of the present invention includes processes for preparing the catalysts (1), (2) and (3) of the invention of the process for producing chlorine.

As the ruthenium compound to be supported on a carrier, compounds listed in the catalysts (1), (2) and (3) of the invention of the process for producing chlorine can be similarly used.

As the reducing compound used for treating the ruthenium compound supported on the carrier, compounds listed in the catalyst (1) of the invention of the process for producing chlorine can be used. As the reducing hydrogenated compound, compounds listed in the catalyst (3) of the invention of the process for producing chlorine can be used.

It is a preferable preparation process of catalyst that the process comprises supporting ruthenium compound on a carrier, treating by basic compounds. The above basic compounds can be used as same as mentioned in the catalyst (1), (2) in this invention which relates to a process for producing chlorine.

Specific examples of the process for preparing the supported ruthenium oxide catalyst of the present invention includes process explained in the portion in common with the catalysts (1) and (2) of the invention of the process for producing chlorine and process explained in the catalyst (3) of the invention of the process for producing chlorine.

It is also possible to obtain chlorine by oxidizing hydrogen chloride with oxygen using the above-mentioned catalyst. The reaction system used to obtain chlorine was described in this invention which relates to a process for producing chlorine and a process for producing a supported ruthenium oxide catalyst.

As described above, according to the present invention, there could be provided a process for producing chlorine by oxidizing hydrogen chloride with oxygen, wherein said process can produce chlorine by using a catalyst having high activity in a smaller amount at a lower reaction temperature. There could also be provided a process for producing chlorine by oxidizing hydrogen chloride, wherein said process can facilitate control of the reaction temperature by making it easy to remove the reaction heat from catalyst bed by using a catalyst having good thermal conductibility, which can be formed by containing a compound having high thermal conductivity of a solid phase, and can achieve high reaction conversion by keeping the whole catalyst bed at sufficient temperature for industrially desirable reaction rate.

According to the present invention, there could also be provided a process for producing a supported ruthenium oxide catalyst, wherein said process is a process for producing a catalyst having high activity and can produce a catalyst having high activity capable of producing the desired compound by using a smaller amount of the catalyst at a lower reaction temperature.

According to the present invention, there could also be provided a supported ruthenium oxide catalyst, wherein said catalyst has high activity and can produce the desired compound by using a smaller amount of the catalyst at a lower reaction temperature.

The following Examples further illustrate the present invention in detail but are not to be construed to limit the scope thereof.

EXAMPLE 1

A catalyst was prepared by the following process. That is, 0.81 g of commercially available ruthenium chloride ($RuCl_3 \cdot nH_2O$, Ru content: 37.3% by weight) was previously dissolved in 6.4 g of pure water to prepare an aqueous solution, and 20.0 g of a titanium oxide powder (P25, manufactured by Nippon AEROSIL Co., Ltd.) was impregnated with this solution. Then, the impregnated powder was dried at 60° C. for 2 hours. After drying, the powder was sufficiently ground in a mortar to obtain 20.3 g of a dark green powder. According to the same manner as that described above, the same operation was repeated nine times to obtain 183.8 g of a dark green powder.

Then, 10.4 g of this powder was dipped in a mixed solution of 2.1 g of a potassium hydroxide solution adjusted to 2N and 30.1 g of pure water in a ultrasonic cleaner at room temperature for 1 minute. In a suspension of the dipped one and the solution, a solution of 0.61 g of a hydrazine monohydrate and 5.0 g of pure water was poured under nitrogen at room temperature with applying an ultrasonic wave. At the time of pouring, bubbling was observed in the solution. After the solution was allowed to stand for 15 minutes until the bubbling disappeared, the supernatant was separated by filtration. 500 ml of pure water was added, followed by washing for 30 minutes and further separation by filtration. This operation was repeated five times. The pH of the wash at the first time was 9.1, and the pH of the wash at the fifth time was 7.4. To the powder separated by filtration, a 2 mol/l potassium chloride solution was added and, after stirring, the powder was separated by filtration again. This operation was repeated three times. The amount of the potassium chloride solution added was 54.4 g at the first time, 52.1 g at the second time and 52.9 g at the third time, respectively. The procedure from the operation of dipping in the potassium hydroxide solution was repeated six times in the same manner to obtain 107 g of a cake. 53.1 g of the resulting cake was dried at 60° C. for 4 hours to obtain 34.1 g of a gray powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated twenty-one times and, after adding dropwise an aqueous silver nitrate solution to the wash, it was confirmed that potassium chloride is not remained. Then, 28.0 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$$RuO_2/(RuO_2+TiO_2) \times 100 = 1.9\% \text{ by weight}$$

The calculated value of the content of ruthenium was as follows.

$$Ru/(RuO_2+TiO_2) \times 100 = 1.5\% \text{ by weight}$$

X-ray diffraction analysis of the titanium oxide powder used was conducted under the following conditions.

Apparatus: Rotaflex RU200B (manufactured by Rigaku Co.)
X-ray type: Cu K α
X-ray output: 40 kV-40 mA
Divergence slit: 1°
Scattering slit: 1°
Receiving slit: 0.15 mm
scanning speed: 1°/min.
Scanning speed: 5.0–75.0°
Monochromator: curved crystal monochromator is used The proportion of a peak intensity (381 cps) of a rutile crystal ($2\theta=27.4°$) to a total value of a peak intensity (381 cps) of a rutile crystal ( ) and a peak intensity (1914 cps) of an anatase crystal ($2\theta=25.3°$) was 17%. Consequently, the content of the rutile crystal was 17%.

The ruthenium oxide catalyst supported on titanium oxide (17.8 g) thus obtained was charged separately in two zones of the same glass reaction tube. The inner diameter of the glass reaction tube was 15 mm and a thermocouple protective tube having an outer diameter of 6 mm was inserted therein. In the upper zone, the catalyst was charged after diluting by sufficiently mixing 5.9 g of the ruthenium oxide catalyst supported on titanium oxide with 23.6 g of a commercially available spherical (2 mm in size) α-alumina carrier (SSA995, manufactured by Nikkato Co.). In the lower zone, 11.9 g of the ruthenium oxide catalyst supported on titanium oxide was charged without being diluted. A hydrogen chloride gas (96 ml/min.) and an oxygen gas (53 ml/min.) were respectively supplied bypassing from the top to the bottom of the reactor under atmospheric pressure (in terms of 0° C., 1 atm). The upper zone of the glass reaction tube was heated in an electric furnace to adjust the internal temperature (hot spot) to 361° C. Similarly, the lower zone was heated to adjust the internal temperature (hot spot) to 295° C. 4.5 Hours after the beginning of the reaction, the gas at the reaction outlet was sampled by passing it through an aqueous 30% potassium iodide solution, and then the amount of chlorine formed and amount of the non-reacted hydrogen chloride were respectively determined by iodometric titration and neutralization titration. As a result, the conversion of hydrogen chloride was 93.0%.

According to the same reaction manner as that described above except that the hydrogen chloride gas (146 ml/min.) and the oxygen gas (74 ml/min.) were respectively supplied under atmospheric pressure (in terms of 0° C., 1 atm) and that the internal temperature of the upper zone was adjusted to 360° C. and the internal temperature of the lower zone was adjusted to 300° C., the reaction was conducted. 4. 5 Hours after the beginning of the reaction, the conversion of hydrogen chloride was 91.6%.

EXAMPLE 2

A catalyst was prepared by the following process. That is, 3.52 g of commercially available ruthenium chloride ($RuCl_3 \cdot nH_2O$, Ru content: 35.5% by weight) was dissolved in 7.61 g of water, followed by sufficient stirring to obtain an aqueous ruthenium chloride solution. The resulting aqueous solution was added dropwise in 25.0 g of a spherical (1–2 mm φ in size) titanium oxide carrier (CS-300S-12,anatase crystal manufactured by Sakai Chemical Industry Co., Ltd.), thereby to support ruthenium chloride by impregnation. The supported one was dried in an air at 60° C. for 4 hours to obtain 28.0 g of a ruthenium chloride supported on titanium oxide. 4.0 g of the resulting ruthenium chloride supported on titanium oxide (28.0 g) was dipped in a mixed solution of 2.4 g of an aqueous potassium hydroxide solution adjusted to 2 mol/l and 1.2 g of pure water at room temperature for 1 minute. Then, the dipped one was poured, together with the solution, into 0.67 g of a hydrazine monohydrate under nitrogen at room temperature. At the time of pouring, bubbling was observed in the solution. After the solution was allowed to stand for about 15 minutes until the bubbling disappeared, 4.0 g of pure water was poured, followed by stirring. Then, the supernatant was removed by decantation. Then, 30 ml of an aqueous potassium chloride solution adjusted to 2 mol/l was poured and, after stirring, the supernatant was removed by decantation. By repeating this operation six times, washing with the aqueous potassium chloride solution was conducted. Then, the washed one was dried under air at 60° C. for 4 hours to obtain a spherical gray solid containing potassium chloride.

Then, the solid was heated under air from room temperature to 350° C. for about 1 hour and then calcined at the same temperature for 3 hours to obtain a spherical solid. Washing was conducted by adding 0.5 liter of pure water to the resulting solid, stirring and allowing to stand 30 minutes, and the resulting solid was separated by filtration. This operation was repeated four times. The washing time was about 4 hours. The washed one was dried under air at 60° C. for 4 hours to obtain 3.73 g of a black spherical ruthenium oxide catalyst supported on titanium oxide.

Incidentally, the calculated value of the content of ruthenium oxide was as follows.

$RuO_2/(RuO_2+TiO_2) \times 100 = 6.1\%$ by weight

The calculated value of the content of ruthenium was as follows.

$Ru/(RuO_2+TiO_2) \times 100 = 4.7\%$ by weight

The ruthenium oxide catalyst supported on titanium oxide (2.5 g) thus obtained was diluted by mixing with a 5 g of spherical titanium oxide carrier (1~2 mm φ in size) and then charged in a quartz reaction tube (inner diameter: 12 mm). A hydrogen chloride gas (192 ml/min.) and an oxygen gas (184 ml/min.) were respectively supplied under atmospheric pressure (in terms of 0° C., 1 atm). The quartz reaction tube was heated in an electric furnace to adjust the internal temperature (hot spot) to 300° C. 1.8 Hours after the beginning of the reaction, the gas at the reaction outlet was sampled by passing it through an aqueous 30 wt % potassium iodide solution, and then the amount of chlorine formed and amount of the non-reacted hydrogen chloride were respectively determined by iodometric titration and neutralization titration The formation activity of chlorine per unit weight of the catalyst determined by the following equation was $3.68 \times 10^{-4}$ mol/min.g-catalyst.

Chlorine formation activity per unit weight of catalyst (mol/min.g-catalyst)=amount of outlet chlorine formed (mol/min)/weight of catalyst (g)

The formation activity of chlorine per unit weight of Ru determined by the following equation was $78.4 \times 10^{-4}$ mol/min.g-Ru.

Chlorine formation activity per unit weight of Ru (mol/min.g-Ru)=amount of outlet chlorine formed (mol/min)/weight of RU (g)

EXAMPLE 3

A catalyst was prepared by the following process. That is, 3.52 g of commercially available ruthenium chloride ($RuCl_3 \cdot nH_2O$, Ru content: 35.5% by weight) was dissolved in 7.6 g of water, followed by sufficient stirring to obtain an aqueous ruthenium chloride solution. The resulting aqueous solution was added dropwise in 25.0 g of a spherical (1–2 mm φ in size) titanium oxide carrier (CS-300S-12, manufactured by Sakai Chemical Industry Co., Ltd.), thereby to support ruthenium chloride by impregnation. The supported one was dried under air at 60° C. for 4 hours to obtain 28.1 g of a ruthenium chloride supported on titanium oxide. 4.0 g of the resulting ruthenium chloride supported on titanium oxide (28.1 g) was dipped in a mixed solution of 2.4 g of an aqueous potassium hydroxide solution adjusted to 2 mol/l and 1.2 g of pure water at room temperature for 1 minute. Then, the dipped one was poured, together with the solution, into 0.67 g of a hydrazine monohydrate under nitrogen at room temperature. At the time of pouring, bubbling was observed in the solution. After the solution was allowed to stand for about 15 minutes until the bubbling disappeared, 30 ml of pure water was poured, followed by stirring. Then, the supernatant was removed by decantation. By repeating this operation six times, washing with water was conducted. Then, the washed one was dried under air at 60° C. for 4 hours. The dried solid was impregnated with 1.3 g of an aqueous potassium hydroxide solution adjusted to 1.4 mol/l, and then dried under air at 60° C. for 0.5 hours to obtain a spherical gray solid containing potassium chloride.

The calculated value of a molar ratio of potassium chloride to ruthenium was 1.0. Then, the solid was heated under air from room temperature to 350° C. for about 1 hour and then calcined at the same temperature for 3 hours to obtain a spherical solid. Washing was conducted by adding 0.5 l of pure water to the resulting solid and filtering. This operation was repeated four times. The washing time was about 4 hours. The washed one was dried under air at 60° C. for 4 hours to obtain 3.65 g of a black spherical ruthenium oxide catalyst supported on titanium oxide.

Incidentally, the calculated value of the content of ruthenium oxide was as follows.

$RuO_2/(RuO_2+TiO_2) \times 100 = 6.1\%$ by weight

The calculated value of the content of ruthenium was as follows.

$Ru/(RuO_2+TiO_2) \times 100 = 4.7\%$ by weight

The ruthenium oxide catalyst supported on titanium oxide (2.5 g) thus obtained was charged in a quartz reaction tube (inner diameter: 12 mm) in the same manner as that described in Example 2, and then the reaction was conducted according to the same reaction manner as that described in Example 2. 1.8 Hours after the beginning of the reaction, the formation activity of chlorine per unit weight of the catalyst was $3.63 \times 10^{-4}$ mol/min.g-catalyst.

The formation activity of chlorine per unit weight of the Ru was $77.3 \times 10^{-4}$ mol/min.g-Ru.

EXAMPLE 4

A catalyst was prepared by the following process. that is, 50.0 g of a titanium oxide powder (STR-60N, 100% rutile crystal, manufactured by Sakai Chemical Industry Co., Ltd.) was kneaded with 33.4 g of pure water and 6.6 g of a titanium oxide sol (CSB, $TiO_2$ content: 38% by weight, manufactured by Sakai Chemical Industry Co., Ltd.). At room temperature, a dry air was blown to the kneaded one, which was then dried until suitable viscosity was obtained. The weight loss of water by drying was 0.2 g. After drying, the mixture was sufficiently kneaded again. The kneaded one was extruded into a form of a noodle of 1.5 mm ø in size. After drying under air at 60° C. for 4 hours, 46.3 g of a white noodle-shaped titanium oxide was obtained. After heating under air from room temperature to 500° C. over 1.3 hours, calcination was conducted at the same temperature for 3 hours. After the completion of the calcination, 45.3 g of a white extruded titanium oxide carrier was obtained by cutting the noodle-shaped solid into pieces of about 5 mm in size. Then, 40.0 g of this carrier was impregnated with an aqueous solution prepared by dissolving 3.23 g of commercially available ruthenium chloride ($RuCl_3.nH_2O$, Ru content: 37.3% by weight) in 21.9 g of pure water, and dried at 60° C. for 2 hours. Then, the resulting solid was dipped in a solution of 16.7 g of a 2N potassium hydroxide solution, 241 g of pure water and 4.1 g of hydrazine monohydrate under nitrogen at room temperature, with stirring every 15 minutes. Bubbling occurred on dipping. After 80 minutes, filtration was conducted by using a glass filter. Washing was conducted for 30 minutes by adding 500 ml of water, followed by filtration. This operation was repeated five times. The pH of the wash was 9.2 at the first time, and the pH of the wash was 7.2 at the fifth time. To the extruded solid separated by filtration, 50 g of a 0.5 mol/l of potassium chloride solution was added and, after stirring, the extruded solid was separated by filtration again. This operation was repeated three times. The resulting solid was dried at 60° C. for 4 hours to obtain a gray solid. After heating from room temperature to 350° C. in an air over 1 hour, the solid was calcined at the same temperature for 3 hours. After the completion of the calcination, 500 ml of pure water was added and the mixture was stirred and, furthermore, the solid was separated by filtration. This operation was repeated ten times and, after adding dropwise an aqueous silver nitrate solution to the wash, it was confirmed that potassium chloride is not remained. Then, 41.1 g of a bluish gray extruded ruthenium oxide catalyst supported on titanium oxide was obtained by drying this solid at 60° C. for 4 hours.

Incidentally, the calculated value of the content of ruthenium oxide was as follows.

$RuO_2/(RuO_2+TiO_2)\times100=3.8\%$ by weight

The calculated value of the content of ruthenium was as follows.

$Ru/(RuO_2TiO_4)\times100=2.9\%$ by weight

X-ray diffraction analysis of the titanium oxide powder (STR-60N) used was conducted under the same conditions as those of Example 1. As a result, a peak intensity of a rutile crystal ($2\theta=27.4°$) was 1015 cps. On the contrary a anatase crystal ($2\theta=25.3°$) peak was not detected. Consequently, the content of the rutile crystal was 100%.

According to the same reaction manner as that described in Example 2 except that the catalyst was diluted by mixing 2.50 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the oxygen gas (192 ml/min.) was passed through the reaction tube and the internal temperature was adjusted to 298° C., there action was conducted. 2.3 Hours after the beginning of the reaction, the formation activity of chlorine per unit weight of the catalyst was $8.88\times10^{-4}$ mol/min.g-catalyst.

EXAMPLE 5

A catalyst was prepared by the following process. That is, 15.0 g of a titanium oxide powder (STR-60N, 100% rutile crystal, manufactured by Sakai chemical Industry co., Ltd.) was dipped in an aqueous solution of 2.01 g of commercially available ruthenium chloride ($RuCl_3.nH_2O$, Ru content: 37.3% by weight) and 26.7 g of pure water, evaporated under reduced pressure at 50° C. for 4 hours, and then dried at 60° C. for 2 hours. After drying, the powder was sufficiently ground to obtain a black powder. This powder was dipped in a solution of 10.4 g of a 2N potassium hydroxide solution, 69.9 of pure water and 2.53 g of hydrazine monohydrate under nitrogen at room temperature. Bubbling occurred on dipping. The gas bubbled during the treatment for 1 hour was collected and the volume was measured. As a result, it was 74 ml in a normal state. The reduced powder was separated by filtration. Washing was conducted for 30 minutes by adding 500 ml of water, followed by filtration. This operation was repeated five times. The pH of the wash was 9.4 at the first time, and the pH of the wash was 7.1 at the fifth time. To the powder separated by filtration, 50 g of a 2 mol/l of potassium chloride solution was added and, after stirring, the powder was separated by filtration again. This operation was repeated three times. The resulting cake was dried at 60° C. for 4hours to obtain a blackish brown powder. After heating from room temperature to 350° C. in an air over 1 hour, the solid was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 14.5 g of a black powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2)\times100=6.2\%$ by weight

The calculated value of the content of ruthenium was as follows.

$Ru/(RuO_2+TiO_2)\times100=4.7\%$ by weight

X-ray diffraction analysis of the titanium oxide carrier used was conducted under the same conditions as those of Example 1. As a result, The proportion of a peak intensity (1389 cps) of a rutile crystal ($2\theta=27.4°$) to a total value of a peak intensity (1389 cps) of a rutile crystal and a peak intensity (40 cps) of an anatase crystal ($2\theta=25.3°$) was 97%. Consequently, the content of the rutile crystal was 97%.

The content of the OH group of the carrier was measured in the following manner. That is, a sample was previously dried in an air at 150° C. for 2 hours and cooled in a desiccator. Then, 1.06 g of the sample was transferred to the flask whose atmosphere was replaced by nitrogen, and was suspended in 40 ml of a dehydrated toluene solvent. To inhibit heat generation, the flask was ice-cooled and 5 ml of methyl lithium was dropped from a dropping funnel under nitrogen. As a result, 52 ml of a methane gas was evolved. The same operation was conducted, except for using toluene without charging no sample. As a result, 30 ml of a methane gas was evolved. At this time, the temperature was 24° C. The content Q (mol/g-carrier) of the OH group was calculated by using the following equation (1):

$$Q=(V-V_0)/(22400\times(273+T)/273)/W \quad (1)$$

where
V: amount of gas evolved (ml), volume of a methane gas evolved at the temperature T during the measurement $V_0$: blank amount of gas evolved (ml), volume of a methane gas evolved at the temperature T from remained water in the measuring system when measuring without putting a sample
T: Measuring temperature (° C.)
W: Amount of sample (g)
As a result, Q was $8.5\times10^{-4}$ (mol/g-carrier).

Furthermore, the valence of Ru reduced was calculated from the amount of nitrogen produced by the hydrazine treatment according to the following scheme (2).

As a result, the following scheme was obtained.

$$\tfrac{1}{4}N_2H_4 \rightarrow e^- + H^+ + \tfrac{1}{4}N_2 \uparrow \quad (1)$$

In the present invention, the valence of ruthenium was determined by the scheme (1).

The valence of Ru when the reaction (1) proceeds is represented by the following equation:

$$\text{Valence number of Ru}=3-((V/22400\times4)/N) \quad (2)$$

where V: amount of gas produced (ml),
N: amount of Ru content which was charged (mol)
The valence number of Ru was calculated as 1.22.
Ru was reduced to the valence of 1.22.

On the other hand, in addition to the above reaction, there is also known the reaction (3) represented by the following scheme:

$$9/2N_2H_4 \rightarrow e^- + 5NH_3 + 3H^+ + 2N_2 \uparrow \quad (3)$$

According to the same reaction manner as that described in Example 2 except that the catalyst was diluted by mixing 2.5 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the oxygen gas (192 ml/min.) was passed through the reaction tube, the reaction was conducted. 2.2 Hours after the beginning of the reaction, the formation activity of chlorine per unit weight of the catalyst was $5.10\times10^{-4}$ mol/min.g-catalyst.

EXAMPLE 6

Figure 7:
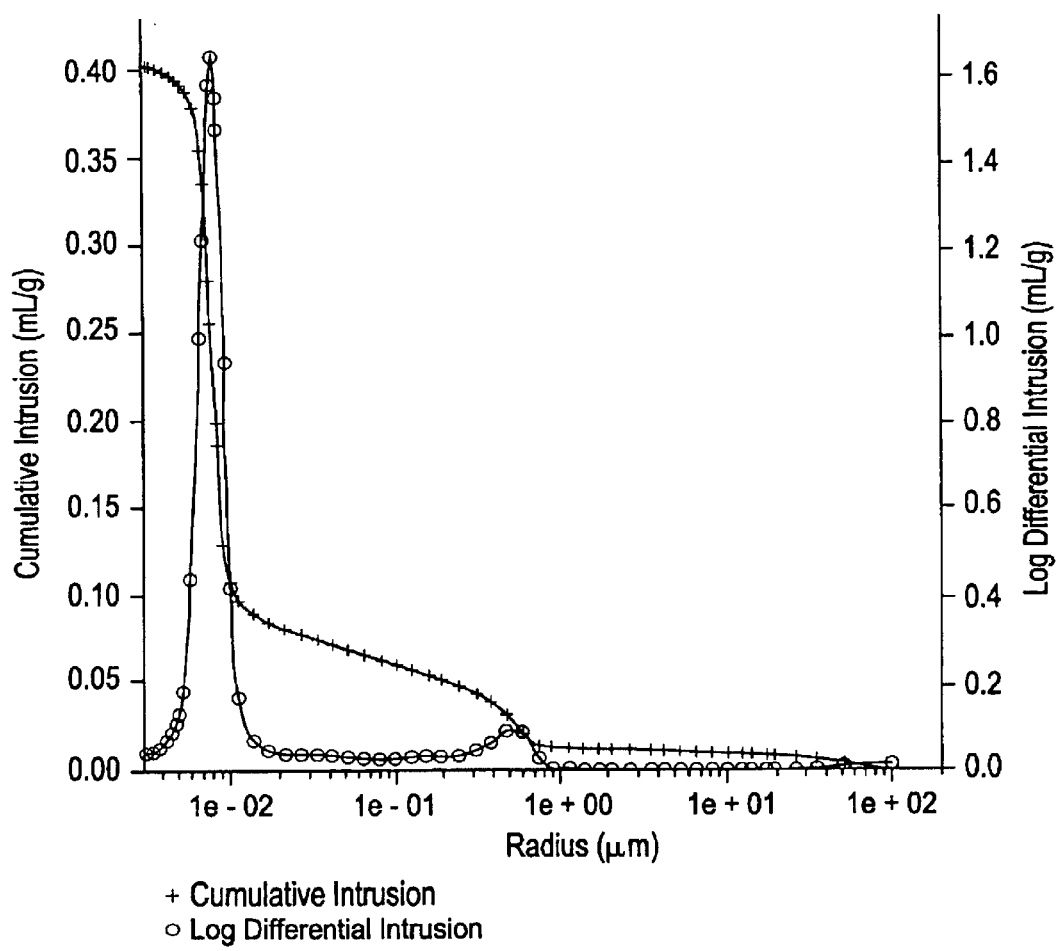

A catalyst was prepared by the following process. That is, 5.0 g of a spherical (1–2 mm in size) titanium oxide carrier (CS-300S-12, anatase crystal, manufactured by Sakai Chemical Industry Co., Ltd.) was impregnated with a solution prepared previously by dissolving 0.71 g of ruthenium chloride ($RuCl_3 \cdot nH_2O$, Ru content: 35.5% by weight) in 1.7 g of water, and then dried at 60° C. for2hours. Then, a solution of 0.84 g of sodium boron hydride ($NaBH_4$), 4.1 g of water and 22.1 g of ethanol was prepared. After the solution was sufficiently cooled in an ice bath, an already prepared ruthenium chloride supported on titanium carrier was added and ruthenium chloride was reduced. At this time, bubbling was observed. After the bubbling was terminated, the reduced solid was separated by filtration. After washing with 500 ml of pure water for 30 minutes, the solid was separated by filtration. This operation was repeated five times. Then, this solid was dried at 60° C. for 4 hours. As a result, 5.2 g of a black solid was obtained. Then, this solid was impregnated with a solution prepared by dissolving 0.19 g of potassium chloride in 3.1 g of pure water by two portions. The impregnation amount of the potassium chloride solution was 1.7 g at the first time. After drying at 60° C. for 1 hour, the amount was 1.4 g at the second time. The resulting solid was dried at 60° C. for 4 hours. The dried one was heated under air to 350° C. over 1 hour and then calcined at the same temperature for 3 hours. Then, the resulting solid was washed with 500 ml of pure water for 30 minutes and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.1 g of a spherical black ruthenium oxide catalyst supported on titanium oxide. The pore radius of the resulting catalyst was within a range from 0.004 to 0.02 micrometer. The pore distribution curve of this catalyst measured by a mercury porosimeter is shown in FIG. 7.

Incidentally, the calculated value of the content of ruthenium oxide was as follows.

$$RuO_2/(RuO_2+TiO_2)\times100=6.2\% \text{ by weight}$$

The calculated value of the content of ruthenium was as follows.

$$Ru/(RuO_2+TiO_2)\times100=4.7\% \text{ by weight}$$

X-ray diffraction analysis of the titanium oxide used was conducted under the same conditions as those of Example 1. As a result, a peak of a rutile crystal (2θ=27.4°) was not detected to a anatase crystal peak intensity (1824 cps, 2θ=25.3°). Consequently, the content of the rutile crystal was 0%.

Under the same conditions as those of Example 5 except that the amount of the sample was 2.56 g and the amount of toluene was 40 ml, the content of the OH group of the carrier was measured. As a result, 86 ml of a methane gas was evolved. The content of the OH group of the carrier was $9.0\times10^{-4}$ (mol/g-carrier).

According to the same reaction manner as that described in Example 2 except that 2.5 g of the ruthenium oxide catalyst supported on titanium oxide thus obtained was charged in a reaction tube and that the hydrogen chloride (187 ml /min.) and the oxygen gas (199 ml/min.) were passed through the reaction tube, the reaction was conducted. 2. 0 Hours after the beginning of the reaction, the formation activity of chlorine per unit weight of the catalyst was $3.92\times10^{-4}$ mol/min.g-catalyst.

EXAMPLE 7

A catalyst was prepared by the following process. That is, 10.1 g of a titanium oxide powder (P25, manufactured by Nippon AEROSIL Co., Ltd.) was impregnated with an aqueous solution prepared previously by dissolving 0.41 of commercially available ruthenium chloride ($RuCl_3 \cdot nH_2O$, Ru content: 37.3% by weight) in 3.5 g of pure water, and then dried at 60° C. for 2 hours. After drying, the powder was sufficiently ground in a mortar to obtain a dark green powder. To reduce this powder with sodium boron hydride, a solution was prepared by dissolving 0.50 g of sodium boron hydride in 100.0 g of ethanol and cooled in an ice bath. To this sodium boron hydride solution, the total amount of ruthenium chloride supported on titanium oxide was added with stirring. Bubbling occurred on addition. After 1 hour, the supernatant was removed by decantation. 500 ml of pure water was added, followed by washing for 30 minutes and further separation by filtration. This operation was repeated five times. The pH of the wash at the first time was 9.3, and the pH of the wash at the fifth time was 4.2. To the powder separated by filtration, a 2 mol/l potassium chloride solution was added and, after stirring, the powder was separated by filtration again. This operation was repeated three times. The amount of the potassium chloride solution added was 48.1 g at the first time, 52.9 g at the second time and 47.2 g at the third time, respectively. The resulting cake was dried at 60° C. for 4 hours to obtain a gray powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 9.2 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$$RuO_2/(RuO_2+TiO_2) \times 100 = 1.9\% \text{ by weight}$$

The calculated value of the content of ruthenium was as follows.

$$Ru/(RuO_2+TiO_2) \times 100 = 1.5\% \text{ by weight}$$

According to the same reaction manner as that described in Example 2 except that 2.5 g of the ruthenium oxide catalyst supported on titanium oxide thus obtained was charged in a reaction tube and that the hydrogen chloride (195 ml/min.) and the oxygen gas (198 ml/min.) were passed through the reaction tube, the reaction was conducted. 2.0 Hours after the beginning of the reaction, the formation activity of chlorine per unit weight of the catalyst was $5.56 \times 10^{-4}$ mol/min.g-catalyst.

EXAMPLE 8

A catalyst was prepared by the following process. That is, 10.1 g of a titanium oxide powder (P25, manufactured by Nippon AEROSIL Co., Ltd.) was impregnated with an aqueous solution prepared previously by dissolving 0.40 g of commercially available ruthenium chloride ($RuCl_3 \cdot nH_2O$, Ru content: 37.3% by weight) in 3.4 g of pure water, and then dried at 60° C. for 2 hours. After drying, the powder was sufficiently ground in a mortar to obtain a dark green powder. The powder was dipped in a solution of 2.1 g of a 2N potassium hydroxide solution and 30.2 g of pure water, and then stirred with putting a flask in an ultrasonic cleaner. After 1 minute, a solution of 0.59 g of hydrazine monohydrate and 5.1 g of pure water were added to the suspension under stirring at room temperature under nitrogen. Bubbling occurred on addition. After 15 minutes, the reduced powder was separated by filtration. To the resulting powder, 500 ml of pure water was added, followed by washing for 30 minutes and further separation by filtration. This operation was repeated five times. The pH of the wash at the first time was 7.8, and the pH of the wash at the fifth time was 6.0. To the powder separated by filtration, a 2 mol/l potassium chloride solution was added and, after stirring, the powder was separated by filtration again. This operation was repeated three times. The amount of the potassium chloride solution added was 53.6 g at the first time, 62.4 g at the second time and 39.4 g at the third time, respectively. The resulting cake was dried at 60° C. for 4 hours to obtain a beige powder. After heating from room temperature to 350t under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 8.4 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$$RuO_2/(RuO_2+TiO_2) \times 100 = 1.9\% \text{ by weight}$$

The calculated value of the content of ruthenium was as follows.

$$Ru/(RuO_2+TiO_2) \times 100 = 1.4\% \text{ by weight}$$

X-ray diffraction analysis of the titanium oxide powder used was conducted under the same conditions as those of Example 1. As a result, the content of the rutile crystal was 17%.

Under the same conditions as those of Example 5 except that the amount of the sample was 4.08 g and the amount of toluene was 80 ml, the content of the OH group of the carrier was measured. As a result, 88 ml of a methane gas was evolved. The content of the OH group of the carrier was $2.8 \times 10^{-4}$ (mol/g-carrier).

According to the same reaction manner as that described in Example 2 except that 2.5 g of the ruthenium oxide catalyst supported on titanium oxide thus obtained was charged in a reaction tube and that the hydrogen chloride (187 ml/min.) and the oxygen gas (199 ml/min.) were passed through the reaction tube and the internal temperature was adjusted to 301° C., the reaction was conducted. 2.0 Hours after the beginning of the reaction, the formation activity of chlorine per unit weight of the catalyst was $5.33 \times 10^{-4}$ mol/min.g-catalyst.

EXAMPLE 9

A catalyst was prepared by the following process. That is, 19.7 g of a titanium oxide powder (P25, manufactured by Nippon AEROSILerogyl Co., Ltd.) was impregnated with an aqueous solution prepared previously by dissolving 0.81 g of commercially available ruthenium chloride ($RuCl_3 \cdot nH_2O$, Ru content: 37.3% by weight) in 6.0 g of pure water, and then dried at 60° C. for 2 hours. After drying, the powder was sufficiently ground in a mortar to obtain a dark green powder. To reduce this powder with sodium boron hydride, a solution was prepared by dissolving 1.00 g of sodium boron hydride in 200 g of ethanol and cooled in an ice bath. To this sodium boron hydride solution, the total amount of ruthenium chloride supported on titanium oxide was added with stirring. Bubbling occurred on addition. After 1 hour, the supernatant was removed by decantation. 500 ml of pure water was added, followed by washing for 30 minutes and further separation by filtration. This operation was repeated five times. The pH of the wash at the first time was 9.8, and the pH of the wash at the fifth time was 6.6. The resulting cake was dried at 60° C. for 4 hours. As a result, 18.0 g of a bluish gray powder was obtained. Then, the resulting powder was impregnated with an aqueous solution of 0.66 g of potassium chloride and 9.0 g of pure water. The resulting powder was dried at 60° C. for 4 hours. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 17.3 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 2.0\%$ by weight

The calculated value of the content of ruthenium was as follows.

$Ru/(RuO_2+TiO_2) \times 100 = 1.5\%$ by weight

X-ray diffraction analysis of the titanium oxide powder used was conducted under the same conditions as those of Example 1. As a result, the content of the rutile crystal was 17%.

According to the same reaction manner as that described in Example 2 except that 2.5 g of the ruthenium oxide catalyst supported on titanium oxide thus obtained was charged in a reaction tube and that the hydrogen chloride (195 ml/min.) and the oxygen gas (198 ml/min.) were passed through the reaction tube and the internal temperature was adjusted to 299° C., the reaction was conducted. 2.0 Hours after the beginning of the reaction, the formation activity of chlorine per unit weight of the catalyst was $4.41 \times 10^{-4}$ mol/min.g-catalyst.

EXAMPLE 10

A catalyst was prepared by the following process. That is, a titanium oxide powder (STR-60N, 100% rutile crystal system, manufactured by Sakai Chemical Industry Co., Ltd.) was previously heated in an air from room temperature to 500° C. over 1.4 hours and calcined at the same temperature for 3 hours. Then, 15.1 g of the calcined one was dipped in an aqueous solution of 0.61 g of commercially available ruthenium chloride ($RuCl_3 \cdot nH_2O$, Ru content: 37.3% by weight) and 26.7 g of pure water, evaporated under reduced pressure at 50° C. for 4 hours, and then dried at 60° C. for 2 hours. After drying, the powder was sufficiently ground to obtain a dark green powder. This powder was dipped in a solution of 3.2 g of a 2N potassium hydroxide solution, 52.6 of pure water and 0.77 g of hydrazine monohydrate at room temperature under nitrogen. Bubbling occurred on dipping. After 1 hour, the reduced powder was separated by filtration. To the resulting powder, 500 ml of pure water was added, followed by washing for 30 minutes and further separation by filtration. This operation was repeated seven times. The pH of the wash was 9.9 at the first time, and the pH of the wash was 7.5 at the seventh time. To the powder separated by filtration, 50 g of a 2 mol/l of potassium chloride solution was added and, after stirring, the powder was separated by filtration again. This operation was repeated three times. The resulting solid was dried at 60° C. for 4 hours to obtain a reddish gray powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 13.9 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 1.9\%$ by weight

The calculated value of the content of ruthenium was as follows.

$Ru/(RuO_2+TiO_2) \times 100 = 1.5\%$ by weight

Under the same conditions as those of Example 5 except that the amount of the sample was 1.31 g and the amount of toluene was 40 ml, the content of the OH group of the carrier was measured. As a result, 48 ml of a methane gas was evolved. The content of the OH group of the carrier was $5.6 \times 10^{-4}$ (mol/g-carrier).

According to the same reaction manner as that described in Example 2 except that the catalyst was diluted by mixing 2.5 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the oxygen gas (192 ml/min.) was passed through the reaction tube, the reaction was conducted. 2.0 Hours after the beginning of the reaction, the formation activity of chlorine per unit weight of the catalyst was $4.27 \times 10^{-4}$ mol/min.g-catalyst.

EXAMPLE 11

A catalyst was prepared by the following process. That is, a titanium oxide powder (STR-60N, 100% rutile crystal system, manufactured by Sakai Chemical Industry Co., Ltd.) was previously heated from room temperature to 700° C. under air over 1.9 hours and calcined at the same temperature for 3 hours. Then, 15.0 g of the calcined one was dipped in an aqueous solution of 0.61 g of commercially available ruthenium chloride ($RuCl_3 \cdot nH_2O$, Ru content: 37.3% by weight) and 26.7 g of pure water, evaporated under reduced pressure at 50° C. for 4 hours, and then dried at 60° C. for 2 hours. After drying, the powder was sufficiently ground to obtain a dark green powder. This powder was dipped in a solution of 3.2 g of a 2N potassium hydroxide solution, 52.6 g of pure water and 0.77 g of hydrazine monohydrate at room temperature under nitrogen. Bubbling occurred on dipping. After 1 hour, the reduced powder was separated by filtration. To the resulting powder, 500 ml of pure water was added, followed by washing for 30 minutes and further separation by filtration. This operation was repeated seven times. The pH of the wash was 9.9 at the first time, and the pH of the wash was 7.5 at the seventh time. To the powder separated by filtration, 50 g of a 2 mol/l of potassium chloride solution was added and, after stirring, the powder was separated by filtration again. This operation was repeated three times. The resulting solid was dried at 60° C. for 4 hours to obtain a gray powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 13.5 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 2.0\%$ by weight

The calculated value of the content of ruthenium was as follows $Ru/(RuO_2+TiO_2) \times 100 = 1.5\%$ by weight Under the same conditions as those of Example 5 except that the amount of the sample was 2.02 g and the amount of toluene was 40 ml, the content of the OH group of the carrier was measured. As a result, 46 ml of a methane gas was evolved. The content of the OH group of the carrier was $3.3 \times 10^{-4}$ (mol/g-carrier).

According to the same reaction manner as that described in Example 2 except that the catalyst was diluted by mixing 2.5 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the oxygen gas (192 ml/min.) was passed through the reaction tube, the reaction was conducted. 2.0 Hours after the beginning of the reaction, the formation activity of chlorine per unit weight of the catalyst was $4.32 \times 10^{-4}$ mol/min.g-catalyst.

EXAMPLE 12

A catalyst was prepared by the following process. That is, 120 of a titanium oxide powder (STR-60N, rutile crystal, manufactured by Sakai Chemical Industry Co., Ltd.) was kneaded with 76.3 g of pure water and 15.8 g of a titanium oxide sol (CSB, $TiO_2$ content: 38% by weight, manufactured by Sakai Chemical Industry Co., Ltd.). At room temperature, a dry air was blown to the kneaded one, which was then dried until suitable viscosity was obtained. The weight loss of water by drying was 10.5 g. After drying, the mixture was sufficiently kneaded again. This kneaded one was extruded into a form of a noodle of 1.5 mm φ in size. After drying under air at 60° C. for 4 hours, 119 g of a white noodle-shaped titanium oxide was obtained. After heating under air from room temperature to 500° C. over 1.4 hours, calcination was conducted at the same temperature for 3 hours. After the completion of the calcination, 115 g of a white extruded titanium oxide was obtained by cutting the noodle-shaped solid into pieces of about 5 mm in size. Then, 50.0 g of the resulting carrier was impregnated with an aqueous solution prepared by dissolving 2.04 g of commercially available ruthenium chloride ($RuCl_3 \cdot nH_2O$, Ru content: 37.3% by weight) in 27.0 g of pure water, and dried at 60° C. for 2 hours. Then, the resulting solid was dipped in a solution of 10.5 g of a 2N potassium hydroxide solution, 300 g of pure water and 2.57 g of hydrazine monohydrate under nitrogen at room temperature, followed by dipping for 1 hour with stirring every 15 minutes after the reduction, filtration was conducted by using a glass filter. Bubbling occurred on dipping. 500 ml of pure water was added, followed by washing for 30 minutes and further separation by filtration. This operation was repeated five times. The pH of the wash was 8.8 at the first time, and the pH of the wash was 6.8 at the fifth time. To the resulting extruded solid separated by filtration, 100 g of a 0.5 mol/l of potassium chloride solution was added and, after stirring and allowing to stand 30 minutes, the resulting extruded solid was separated by filtration again. This operation was repeated three times. The resulting extruded solid was dried at 60° C. for 4 hours to obtain a gray solid. After heating from room temperature to 350° C. under air over 1 hour, the solid was calcined at the same temperature for 3 hours. After the completion of the calcination, 500 ml of pure water was added and the mixture was stirred and, furthermore, the solid was separated by filtration. This operation was repeated five times over 5 hours and, after adding dropwise an aqueous silver nitrate solution to the wash, it was confirmed that potassium chloride is not remained. Then, 50.7 g of a bluish gray extruded ruthenium oxide catalyst supported on titanium oxide was obtained by drying this resultant extruded solid at 60° C. for 4 hours. Furthermore, the same operation from the impregnation step was repeated to obtain 50.8 g of a bluish gray extruded ruthenium oxide catalyst supported on titanium oxide. These catalysts were mixed to obtain 101.5 g of a bluish gray extruded ruthenium oxide catalyst supported on titanium oxide.

Incidentally, the calculated value of the content of ruthenium oxide as the active component (A) of the catalyst was as follows.

$RuO_2/(RuO_2+TiO_2(\text{rutil crystal})+TiO_2(\text{binder})) \times 100 = 2.0\%$ by weight The calculated value of the content of ruthenium was as follows.

$Ru/(RuO_2+TiO_2(\text{rutil crystal})+TiO_2(\text{binder})) \times 100 = 1.5\%$ by weight Rutil titanium oxide shows that thermal conductivity of solid phase is 7.5 W/m. ° C. measured at 200° C. The calculated value of the content of rutil titanium oxide as component (B) was as follows.

$TiO_2(\text{rutil crystal})/(RuO_2+TiO_2(\text{rutil crystal})+TiO_2(\text{binder})) \times 100 = 93.4\%$ by weight X-ray diffraction analysis of the titanium oxide catalyst used was conducted under the same conditions as those of Example 1. As a result, the content of the rutile crystal was 97%.

According to the same reaction manner as that described in Example 2 except that the catalyst was diluted by mixing 2.50 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the oxygen gas (206 ml/min.) was passed through the reaction tube, the reaction was conducted. 2.0 Hours after the beginning of the reaction, the formation activity of chlorine per unit weight of the catalyst was $4.83 \times 10^{-4}$ mol/min.g-catalyst.

EXAMPLE 13

A catalyst was prepared by the following process. That is, 10.0 g of a titanium oxide powder (MT-600B, rutile crystal system, manufactured by TAYCA Corporation ) was impregnated with an aqueous solution of 0.407 g of commercially available ruthenium chloride ($RuCl_3 \cdot nH_2O$, Ru content: 37.3% by weight) and 17.8 g of pure water, and then evaporated under reduced pressure at 40° C. over 2 hours. After drying at 60° C. for 2 hours, the powder was sufficiently ground to obtain a dark green powder. This powder was dipped in a solution of 2.1 g of a 2N potassium hydroxide solution and 30.0 of pure water at room temperature, followed by stirring. After 1 minute, under nitrogen, a solution of 0.59 g of hydrazine monohydrate and 5.0 g of pure water was added to the suspension under stirring at room temperature under nitrogen. Bubbling occurred on dipping. After 1 hour, the reduced powder was separated by filtration. To the resulting powder, 500 ml of pure water was added, followed by washing for 30 minutes and further separation by filtration. This operation was repeated five times. The pH of the wash was 8.8 at the first time, and the pH of the wash was 7.4 at the fifth time. To the powder separated by filtration, 50 g of a 2 mol/l of potassium chloride solution was added and, after stirring, the powder was separated by filtration again. This operation was repeated three times. The resulting solid was dried at 60° C. for 4 hours to obtain a beige powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 9.23 g of a bluish gray powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 2.0\%$ by weight

The calculated value of the content of ruthenium was as follows.

$Ru/(RuO_2+TiO_2) \times 100 = 1.5\%$ by weight

According to the same reaction manner as that described in Example 2 except that the catalyst was diluted by mixing 2.5 g of the ruthenium oxide catalyst supported on titanium oxide thus obtained with 5 g of a commercially available spherical (1 mm in size) alumina carrier (SSA995, manufactured by Nikkato Co.) and then charged in a quartz reaction tube (inner diameter: 12 mm) and that the hydrogen chloride gas (211 ml/min.) and the oxygen gas (211 ml/min.) were passed through the reaction tube, the reaction was conducted. 1.8 Hours after the beginning of the reaction, the formation activity of chlorine per unit weight of the catalyst was $4.40 \times 10^{-4}$ mol/min.g-catalyst.

EXAMPLE 14

A catalyst was prepared by the following process. That is, 270 g of pure water and 134 g of a 30 wt % titanium sulfate solution (manufactured by Wako Pure Chemical Industry, Ltd.) were mixed at room temperature. The resulting solution was mixed with 10.0 g of a titanium oxide powder (PT-101, 100% rutile crystal, manufactured by Ishihara Techno Corporation ) at room temperature. Then, the resulting suspension was hydrolyzed by heating to 102° C. under stirring over 7 hours using an oil bath. After the completion of the hydrolysis, the reaction solution was cooled to room temperature, allowed to stand overnight, and then separated by filtration. 0.5 liter of pure water was added to the resulting white precipitate and, after washing for 30 minutes, the precipitate was separated by filtration. This operation was repeated eight times. Then, the resulting precipitate was dried at 60° C. for 4 hours to obtain 25.0 g of a white powder. This powder was heated to 300%in an air over 1 hour and then calcined at the same temperature for 5 hours to obtain 23.2 g of a white solid. Furthermore, 20.2 g of this powder was taken out, heated to 500° C. under air over 1.4 hour and then calcined at the same temperature for 3 hours to obtain 19.5 g of a white solid. The resulting solid was ground to obtain a titanium oxide powder.

The resulting titanium oxide powder (9.5 g) was impregnated with an aqueous solution prepared previously by dissolving 1.27 g of commercially available ruthenium chloride ($RuCl_3 \cdot nH_2O$, Ru content: 37.3% by weight) and 9.5 g of pure water, and then evaporated under reduced pressure at 40° C. over 2 hours. After drying at 60° C. for 2 hours, the powder was sufficiently ground to obtain a black powder. This powder was dipped in a solution of 6.6 g of a 2N potassium hydroxide solution and 28.5 g of pure water at room temperature, followed by stirring. After 1 minute, a solution of 1.83 g of hydrazine monohydrate and 4.8 g of pure water was added to the suspension under stirring at roam temperature under nitrogen. Bubbling occurred on dipping. After 1 hour, the reduced powder was separated by filtration. To the resulting powder, 500 ml of pure water was added, followed by washing for 30 minutes and further separation by filtration. This operation was repeated five times. The pH of the wash was 8.2 at the first time, and the pH of the wash was 6.6 at the fifth time. To the powder separated by filtration, 48 g of a 2 mol/l of potassium chloride solution was added and, after stirring, the powder was separated by filtration again. This operation was repeated three times. The resulting solid was dried at 60° C. for 4 hours to obtain 10.2 g of a black powder. After heating from room temperature to 350° C. in an air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 8.93 g of a black powder was obtained by drying this powder at 60° C. for 4 hours. The resulting powder was molded to adjust the particle size to 8. 6–16. 0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 6.2\%$ by weight

The calculated value of the content of ruthenium was as follows.

$RU/(RuO_2+TiO_2) \times 100 = 4.7\%$ by weight

X-ray diffraction analysis of the titanium oxide catalyst used was conducted under the same conditions as those of Example 1. As a result, a peak intensity of a rutile crystal ($2\theta = 27.4°$) was 1497 cps. On the contrary a peak intensity of an anatase crystal ($2\theta = 25.3°$) was not detected. Consequently, the content of the rutile crystal was 100%.

Under the same conditions as those of Example 5 except that the amount of the sample was 2.36 g and the amount of toluene was 40 ml, the content of the OH group of the carrier was measured. As a result, 51 ml of a methane gas was evolved. The content of the OH group of the carrier was $3.7 \times 10^{-4}$ (mol/g-carrier).

According to the same reaction manner as that described in Example 2 except that the catalyst was diluted by mixing 2.5 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the hydrogen chloride gas (211 ml/min.) and the oxygen gas (211 ml/min.) were passed through the reaction tube, the reaction was conducted. 2.3 Hours after the beginning of the reaction, the formation activity of chlorine per unit weight of the catalyst was $8.18 \times 10^{-4}$ mol/min.g-catalyst.

EXAMPLE 15

A catalyst was prepared by the following process. That is, a titanium oxide powder (100% rutile crystal manufactured by Sakai Chemical Industry Co., Ltd.) was previously heated from room temperature to 500° C. under air over 1.4 hours and calcined at the same temperature for 3 hours. Then, 10.0 g of the calcined one was dipped in an aqueous solution of 1.34 g of commercially available ruthenium chloride ($RuCl_3.nH_2O$, Ru content; 37.3% by weight) and 17.8 g of pure water, evaporated under reduced pressure at 40° C. over 2 hours, and then dried at 60° C. for 2 hours. After drying, the powder was sufficiently ground to obtain a blackish brown powder. This powder was dipped in a solution of 6.9 g of a 2N potassium hydroxide solution, 30.0 g of pure water and 1.93 g of hydrazine monohydrate under nitrogen at room temperature. Bubbling occurred on dipping. After 1 hour, the reduced powder was separated by filtration. To the resulting powder, 500 ml of pure water was added, followed by washing for 30 minutes and further separation by filtration. This operation was repeated five times. The pH of the wash was 8.7 at the first time, and the pH of the wash was 7.4 at the fifth time. To the powder separated by filtration, 50 g of a 2 mol/l of potassium chloride solution was added and, after stirring, the powder was separated by filtration again. This operation was repeated three times. The resulting solid was dried at 60° C. for 4 hours to obtain a black powder. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 9.7 g of a black powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 6.2\%$ by weight

The calculated value of the content of ruthenium was as follows.

$Ru/(RuO_2+TiO_2) \times 100 = 4.7\%$ by weight

X-ray diffraction analysis of the titanium oxide catalyst used was conducted under the same conditions as those of Example 1. As a result, a peak intensity of a rutile crystal ($2\theta=27.4°$) was 907 cps. On the contrary, a peak intensity of an anatase crystal ($2\theta=25.3°$) was not detected. Consequently, the content of the rutile crystal was 100%.

Under the same conditions as those of Example 5 except that the amount of the sample was 1.64 g and the amount of toluene was 40 ml, the content of the OH group of the carrier was measured. As a result, 54 ml of a methane gas was evolved. The content of the OH group of the carrier was $6.0 \times 10^{-4}$ (mol/g-carrier).

According to the same reaction manner as that described in Example 2 except that the catalyst was diluted by mixing 2.5 g of the ruthenium oxide catalyst supported on titanium oxide thus obtained with 10 g of a commercially available spherical (2 mm in size) alumina carrier (SSA995, manufactured by Nikkato Co.) and then charged in a quartz reaction tube (inner diameter: 12 mm) and that the hydrogen chloride gas (211 ml/min.) and the oxygen gas (211 ml/min.) were passed through the reaction tube, the reaction was conducted. 1.8 Hours after the beginning of the reaction, the formation activity of chlorine per unit weight of the catalyst was $7.85 \times 10^{-4}$ mol/min.g-catalyst.

EXAMPLE 16

A catalyst was prepared by the following process. That is, 10.1 g of a titanium oxide powder (SSP-HJ, anatase crystal, manufactured by Sakai Chemical industry Co., Ltd.) was impregnated with an aqueous solution prepared previously by dissolving 1.35 g of commercially available ruthenium chloride ($RuCl_3.nH_2O$, Ru content: 37.3% by weight) in 4.5 g of pure water, and then dried at 60° C. for 2 hours. After drying, the powder was sufficiently ground in a mortar to obtain a black powder. To reduce this powder with sodium boron hydride, a solution was prepared by dissolving 1.65 g of sodium boron hydride in 330 g of ethanol and cooled in an ice bath. To this sodium boron hydride solution, the total amount of ruthenium chloride supported on titanium oxide was added with stirring. Bubbling occurred on addition. After 1 hour, the supernatant was removed by decantation. 500 ml of pure water was added, followed by washing for 30 minutes and further separation by filtration. This operation was repeated five times. The pH of the wash at the first time was 9.3, and the pH of the wash at the fifth time was 5.3. The resulting cake was dried at 60° C. for 4 hours. As a result, 9.8 g of a black powder was obtained. Then, the resulting powder was impregnated with an aqueous solution of 1.21 g of potassium chloride and 4.2 g of pure water. The resulting powder was dried at 60° C. for 4 hours. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 9.3 g of a black powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

$RuO_2/(RuO_2+TiO_2) \times 100 = 6.1\%$ by weight

The calculated value of the content of ruthenium was as follows.

Ru/(RuO$_2$+TiO$_2$)×100=4.7% by weight

Under the same conditions as those of Example 5 except that the amount of the sample was 1.79 g and the amount of toluene was 40 ml, the content of the OH group of the carrier was measured. As a result, 111 ml of a methane gas was evolved. The content of the OH group of the carrier was 18.6×10$^{-4}$ (mol/g-carrier).

According to the same reaction manner as that described in Example 2 except that 2.5 g of the ruthenium oxide catalyst supported on titanium oxide thus obtained was charged in a reaction tube in the same manner as that in Example 2 and that the hydrogen chloride (187 ml/min.) and the oxygen gas (199 ml/min.) were passed through the reaction tube, the reaction was conducted. 2.0 Hours after the beginning of the reaction, the formation activity of chlorine per unit weight of the catalyst was 3.59×10$^{-4}$ mol/min.g-catalyst.

EXAMPLE 17

A catalyst was prepared by the following process. That is, 10.0 g of a titanium oxide powder (P25, manufactured by Nippon AEROSIL Co., Ltd.) was impregnated with an aqueous solution prepared previously by dissolving 1.34 g of commercially available ruthenium chloride (RuCl$_3$.nH$_2$O, Ru content: 37.3% by weight) in 4.8 g of pure water, and then dried at 60° C. for 2 hours. After drying, the powder was sufficiently ground in a mortar to obtain a black powder. To reduce this powder with sodium boron hydride, a solution was prepared by dissolving 1.66 g of sodium boron hydride in 330 g of ethanol and cooled in an ice bath. To this sodium boron hydride solution, the total amount of ruthenium chloride supported on titanium oxide was added with stirring. Bubbling occurred on addition. After 1 hour, the supernatant was removed by decantation. 500 ml of pure water was added, followed by washing for 30 minutes and further separation by filtration. This operation was repeated nine times. The pH of the wash at the first time was 9.6, and the pH of the wash at the ninth time was 7.7. The resulting cake was dried at 60° C. for 4 hours. As a result, a black powder was obtained. Then, the resulting powder was impregnated with an aqueous solution of 1.22 g of potassium chloride and 4.7 g of pure water. The impregnated powder was dried at 60° C. for 4 hours. After heating from room temperature to 350° C. under air over 1 hour, the powder was calcined at the same temperature for 3 hours. After the completion of the calcination, 500 ml of pure water was added and the mixture was stirred and, furthermore, the powder was separated by filtration. This operation was repeated five times and, after adding dropwise an aqueous silver nitrate solution to the wash, it was confirmed that potassium chloride is not remained. Then, 9.5 g of a black powder was obtained by drying this powder at 60° C. for 4 hours. The resulting powder was molded to adjust the particle size to 8.6–16.0 mesh, thereby obtaining a ruthenium oxide catalyst supported on titanium oxide.

Incidentally, the calculated value of the content of ruthenium oxide was as follows.

RuO$_2$/(RuO$_2$+TiO$_2$)×100=6.2% by weight

The calculated value of the content of ruthenium was as follows.

Ru/(RuO$_2$+TiO$_2$)×100=4.7% by weight

X-ray diffraction analysis of the titanium oxide powder used was conducted. As a result, the content of the rutile crystal was 17%.

According to the same reaction manner as that described in Example 2 except that 2.5 g of the ruthenium oxide catalyst supported on titanium oxide thus obtained was charged in a reaction tube in the same manner as that in Example 2 and that the hydrogen chloride (195 min/m.) and the oxygen gas (198 ml/min.) were passed through the reaction tube and the internal temperature was adjusted to 299° C., the reaction was conducted. 2.0 Hours after the beginning of the reaction, the formation activity of chlorine per unit weight of the catalyst was 4.31×10$^{-4}$ mol/min.g-catalyst.

EXAMPLE 18

A catalyst was prepared by the following process. That is, 60 g of a commercially available 100% rutile type titanium oxide powder (STR-60N, manufactured by Sakai Chemical Industry Co., Ltd.) and 60 g of a α-alumina powder (A131-03, manufactured by Sumitomo Chemical Co., Ltd.) were sufficiently mixed. To the mixed one, a mixed solution of 15.8 g of 38 wt % TiO$_2$ sol (CSB, manufactured by Sakai Chemical Industry Co., Ltd.) and 50 g of pure water was added. Until suitable viscosity was obtained, the mixture was dried at room temperature under air flow. After drying, the mixture was sufficiently kneaded. The weight loss by drying was 14 g. This kneaded one was extruded into a form of a noodle of 1.5 mm φ in size, followed by drying at 60° C. under air for 4 hours using a drier. The weight of the dried one was 101 g. Using a muffle furnace, the dried one was heated from room temperature to 500° C. in an air over 1.4 hours and calcined at the same temperature for 3 hours to obtain 99.5 g of a titanium oxide-α-alumina carrier.

The sane operation was repeated to obtain 218 g of a titanium oxide-α-alumina carrier.

Then, a extruded titanium oxide-α-alumina carrier was obtained by cutting the resulting noodle-shaped titanium oxide-α-alumina carrier into pieces of about 5 mm in size.

Then, 2.03 g of commercially available ruthenium chloride (RuCl$_3$.nH$_2$O, Ru content: 37.3% by weight) was dissolved in 14.6 g of water, followed by sufficient stirring to obtain an aqueous ruthenium chloride solution. The resulting aqueous ruthenium chloride solution was added dropwise to 50 g of the extruded titanium oxide-α-alumina carrier, thereby to support ruthenium chloride by impregnation. The supported one was dried under air at 60° C. for 2 hours to obtain a ruthenium chloride supported on titanium oxide-α-alumina.

The resulting ruthenium chloride supported on titanium oxide-α-alumina was added to a mixed solution of 10.5 g of an aqueous potassium hydroxide solution adjusted to 2 mol/l, 300 g of pure water and 2.54 g of hydrazine monohydrate under nitrogen at room temperature, followed by dipping for 1 hour stirring every 15 minutes. At the time of dipping, bubbling was observed in the solution. After the reduction, filtration was conducted by using a glass filter. 0.5 liter of pure water was added to the glass filter and, after allowing to stand for 30 minutes, filtration was conducted again. This operation was repeated five times to obtain a brownish white extruded solid. Then, 100 g of an aqueous KCl solution adjusted to 0.5 mol/l was added to the resulting extruded solid and, after allowing to stand for 30 minutes, filtration was conducted under reduced pressure. The same operation was repeated three times.

The resulting extruded solid was dried under air at 60° C. for 4 hours, heated to 350° C. under air over 1 hour, and then calcined at the same temperature for 3 hours.

0.5 liter of pure water was added to the calcined one and the mixture was stirred. After allowing to stand for 30 minutes, further more filtration was conducted by using a glass filter. This operation was repeated five times over 5 hours to remove potassium chloride until white turbidity does not occur when 0.2 mol/l of an aqueous silver nitrate solution is added to the filtrate. Then, the resultant was dried in an air at 60° C. for 4 hours to obtain 50 g of a bluish gray ruthenium oxide catalyst supported on titanium oxide-α-alumina.

The same operation was repeated four time to obtain 200 g of a ruthenium oxide catalyst supported on titanium oxide-α-alumina.

According to the same reaction manner as that described in Example 2 except that 2.50 g of the ruthenium oxide catalyst supported on titanium oxide-α-alumina thus obtained was diluted with 10 g of a commercially available spherical (2 mm in size) alumina carrier (SSA995, manufactured by Nikkato Co.) and then charged in a quartz reaction tube (inner diameter: 12 mm) and that the oxygen gas (192 ml/min.) was passed through the reaction tube, the reaction was conducted. 2.0 Hours after the beginning of the reaction, the formation activity of chlorine per unit weight of the catalyst was $4.62 \times 10^{-4}$ mol/min.g-catalyst.

Then, the controllability of the reaction temperature of the ruthenium oxide catalyst supported on titanium oxide-α-alumina was evaluated.

That is, 40.6 g of the resulting ruthenium oxide catalyst supported on titanium oxide-α-alumina was charged in a nickel reaction tube (outer diameter: 29 mm φ, inner diameter: 25 mm φ, outer diameter of sheath tube for thermocouple : 6 mm φ). The length of the catalyst bed was 9.2 cm and the volume of catalyst was 42.5 ml.

Incidentally, the calculated value of the content of ruthenium oxide as the active component (A) of the catalyst was as follows.

$RuO_2/(RuO_2+TiO_2(\text{rutile crystal})+\alpha\text{-}Al_2O_3+TiO_2(\text{binder}))\times 100=$ 2.0% by weight Rutil titanium oxide shows that thermal conductivity of solid phase is 7.5 W/m·° C. measured at 200° C. The calculated value of the content of rutile titanium oxide as the component (B) was as follows.

$TiO_2$ (rutile crystal )/$(RuO_2+TiO_2$ (rutile crystal )+α-$Al_2O_3+TiO_2$ (binder))×100=47% by weight α-$Al_2O_3$ shows that thermal conductivity of solid phase is 23 W/m·° C. measured at 200° C. The calculated value of the content of α-alumina as the component (B) was as follows.

α-$Al_2O_3/(RuO_2+TiO_2(\text{rutile crystal})+\alpha\text{-}Al_2O_3+TiO_2(\text{binder}))\times$ 100=47% by weight The calculated value of $TiO_2$ (binder) used to form this catalyst was 4.7% by weight.

Then, the nickel reaction tube was heated in a salt bath of sodium nitrite and potassium nitrate and the hydrogen chloride gas (0.88 Nl/min.) and the oxygen gas (0.53 Nl/min.) were supplied. 3.7 Hours after the beginning of the reaction, when the temperature of the salt bath is 260° C., the maximum temperature of the catalyst bed is exhibited at the point which is 3 cm from the catalyst bed inlet and the internal temperature (hot spot) became stable at 301° C. The gas at the reaction outlet was sampled by passing it through an aqueous 30% potassium iodide solution, and then the amount of chlorine formed and amount of the non-reacted hydrogen chloride were respectively determined by iodometric titration and neutralization titration. As a result, the conversion of hydrogen chloride was 50.4%.

Furthermore, the bath temperature was raised by 11° C. in total over 5 hours and 50 minutes to make it constant at 271° C. As a result, the internal temperature became stable at 331.4° C. Even after 10 minutes, the bath temperature was constant at 271° C. and the internal temperature was stable at 331.5° C., and the temperature was satisfactorily controlled.

Furthermore, the bath temperature was raised by 8° C. in total over 1 hour and 15 minutes to make it constant at 279° C. As a result, the internal temperature became stable at 351.9° C. Even after 10 minutes, the bath temperature was constant at 279° C. and the internal temperature was stable at 351.9° C., and the temperature was satisfactorily controlled.

EXAMPLE 19

A catalyst was prepared by the following process. That is, 0.81 g of commercially available ruthenium chloride hydrate ($RuCl_3$.nH2O Ru content: 37.3% by weight) was dissolved in 6.4 g of water, followed by sufficient stirring to obtain an aqueous ruthenium chloride solution. The resulting aqueous solution was added dropwise to 20 g of a titanium oxide carrier powder (P-25, manufactured by Nippon AEROSIL Co., Ltd.), thereby to support ruthenium chloride by impregnation. The supported ruthenium chloride on titanium oxide powder was ground, and then sufficiently mixed until the whole color became homogeneous yellowish green. 20.2 g of a supported ruthenium chloride on titanium oxide was obtained by dying the supported one under air at 60° C. for 2 hours. The same operation was repeated twice to obtain 40.4 g of the same supported one.

Then, 40.4 g of the resulting supported ruthenium chloride on titanium oxide was added to a mixed solution of 8.36 g of an aqueous potassium hydroxide solution adjusted to 2 mol/l, 140 g of pure water and 2.14 g of a hydrazine monohydrate with stirring under nitrogen at room temperature, followed by stirring at room temperature for 60 minutes. Then, the mixed solution was filtered by using a glass filter to obtain a beige cake.

0.5 liter of pure water was added to the resulting cake and filtration was conducted again by using a glass filter. This operation was repeated five times to obtain a brownish white cake.

Then, 200 g of an aqueous KCl solution adjusted to 0.25 mol/l was added to the resulting cake and, after allowing to stand for 30 minutes, filtration was conducted under reduced pressure. The same operation was repeated three times to obtain a brownish white cake. The resulting cake was dried under air at 60° C. for 4 hours, and ground by using a mortar to obtain 39.4 g of greenish gray powder. Then, 8 g of the resulting greenish gray powder and 8 g of α-alumina powder (AES-12, manufactured by Sumitomo Chemical Co., Ltd.) were sufficiently mixed. To the mixed one, a mixed solution of 2.1 g of 38 wt % $TiO_2$ sol (CSB, manufactured by Sakai Chemical Industry Co., Ltd.) and 4.0 g of pure water was added and mixed sufficiently. Until suitable viscosity is obtained, pure water was added, followed by kneading. The amount of pure water added is 0.45 g. The kneaded one was extruded into a form of a noodle of 1.5 mm ø in size, followed by drying at 60° C. under air for 4 hours using a drier. The weight of the dried one was 5.93 g. Using a muffle furnace, the dried one was heated from room temperature to 350° C. under air over 1 hour and calcined at the same temperature for 3 hours. Then, 0.5 liter of pure water was added to the calcined one and filtration was conducted by using a glass filter. This operation was repeated five times to obtain a bluish gray solid. The resulting solid was dried under air at 60° C. for 4 hours using a drier to obtain 5.86 g of a catalyst. Then, a bluish gray extruded ruthenium oxide catalyst supported on titanium oxide mixed with α-alumina was obtained by cutting the resulting solid into pieces of about 5 mm in size.

Incidentally, the calculated value of the content of ruthenium oxide as the active component (A) of the catalyst was as follows.

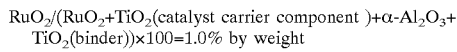

$RuO_2/(RuO_2+TiO_2(\text{catalyst carrier component})+\alpha\text{-}Al_2O_3+TiO_2(\text{binder}))\times 100 = 1.0\%$ by weight α-$Al_2O_3$ shows that thermal conductivity of solid phase is 23 W/m·° C. measured at 200° C. The calculated value of the content of α-alumina as the component (B) was as follows.

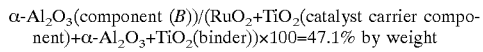

α-$Al_2O_3$(component $(B)$)/($RuO_2$+$TiO_2$(catalyst carrier component)+α-$Al_2O_3$+$TiO_2$(binder))×100=47.1% by weight The calculated value of the content of $TiO_2$ (binder) used to form this catalyst was 4.8% by weight.

According to the same reaction manner as that described in Example 2 except that the catalyst was diluted by mixing 2.50 g of the ruthenium oxide catalyst supported on titanium oxide mixed with α-alumina thus obtained with 5 g of a commercially available spherical (1 mm in size) α-alumina carrier (SSA995, manufactured by Nikkato Co.) and then charged in a quartz reaction tube (inner diameter: 12 mm) and that the oxygen gas (211 ml/min.) and hydrogen chloride gas (211 ml/min.) was passed through the reaction tube, the reaction was conducted. 1.8 Hours after the beginning of the reaction, the formation activity of chlorine per unit weight of the catalyst was $3.05 \times 10^{-4}$ mol/min.g-catalyst.

Then, the controllability of the ruthenium oxide catalyst supported on titanium oxide mixed with α-alumina was evaluated.

That is, 5 g of the catalyst thus obtained was charged in a quartz reaction tube (outer diameter: 15 mm, inner diameter: 12 mm) without being diluted with an α-alumina sphere. The hydrogen chloride gas (192 ml/min.) and the oxygen gas (192 ml/min.) were supplied. Then, the quartz reaction tube was heated in a electric furnace and the internal temperature (hot spot) was adjusted to 300° C. 1.8 Hours after the beginning of the reaction, the conversion of hydrogen chloride was 21%. Furthermore, the furnace temperature was slowly raised, step by step, by 1° C. 5.7 Hours after the beginning of the reaction, the internal temperature became stable at 328° C. Furthermore, the furnace temperature was raised by 3% over 32 minutes. As a result, the internal temperature became stable at 335° C., and the temperature was satisfactorily controlled.

EXAMPLE 20

A catalyst was prepared by the following process. That is, 6.02 g of a spherical (1–2 mm in size) 5 wt % metal ruthenium catalyst supported on titanium oxide (manufactured by N.E. Chemcat Co., Ltd. titanium oxide is anatase crystal ) was impregnated with an aqueous potassium chloride solution adjusted to 0.5 mol/l until water oozes out on the surface of the catalyst, and then dried under air at 60° C., for 10 to 60 minutes. This operation was repeated twice. The amount of the potassium chloride solution added was 3.04 g at the first time, 2.89 g at the second time respectively. The total amount was 5.83 g. The calculated value of the molar ratio of the amount of potassium chloride added to a Ru atom in the catalyst becomes 1:1. This solid was dried under air at 60° C. for 4 hours, and heated from room temperature to 350° C. under air over about 1 hour, and then calcined at the same temperature for 3 hours to obtain a spherical solid. 0.5 liter of pure water was added to the resulting solid and the solid followed by stirring at room temperature for 1 minutes. Then, the solid was filtered. This operation was repeated four times until white turbidity does not occur when 0.2 mol/l of an aqueous silver nitrate solution is added to the filtrate.

Then, the resulting solid was dried in an air at 60° C. for 4 hours to obtain 5.89 g of a bluish black 6.6 wt % ruthenium oxide catalyst supported on titanium oxide.

According to the same reaction manner as that described in Example 2 except that 2.5 g of the spherical 6.6 wt % ruthenium oxide catalyst supported on titanium oxide obtained was charged in a quartz reaction tube and that the hydrogen chloride gas (187 ml/min.) and the oxygen gas (199 ml/min.) were passed through the reaction tube, the reaction was conducted. 2.0 Hours after the beginning of the reaction, the formation activity of chlorine per unit weight of the catalyst was $407 \times 10^{-4}$ mol/min.g-catalyst.

Then, 10 g of the spherical 6.6 wt % ruthenium oxide catalyst supported on titanium oxide was prepared by the same process as described above.

Then, the mixture catalyst system which comprises the molding of ruthenium oxide catalyst supported on titanium oxide and the molding of α-alumina was evaluated whether the catalyst system can attain enough reaction conversion by keeping the whole catalyst bed at sufficient temperature for desirable reaction rate in the oxidation of hydrogen chloride. That is, 9.84 g (10 ml) of the molding of the resulting 6.6 wt % ruthenium oxide catalyst supported on titanium oxide was sufficiently mixed with 65.3 g (30 ml) of α-alumina (SSA995, sphere of 2 mm in size, manufactured by Nikkato Co., Ltd.) and was charged in a quartz reaction tube (outer diameter: 25 mm ø, outer diameter of sheath tube for thermocouple: 4 mm ø). The length of catalyst bed was 11 cm.

Incidentally, the calculated value of the content of ruthenium oxide as the active component (A) of the catalyst was as follows.

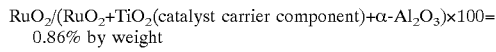

$RuO_2/(RuO_2+TiO_2(\text{catalyst carrier component})+\alpha\text{-}Al_2O_3)\times 100 = 0.86\%$ by weight α-$Al_2O_3$ shows that thermal conductivity of solid phase is 23 W/m·° C. measured at 200° C. The calculated value of the content of α-alumina as the component (B) of the catalyst system was as follows.

Figure 8:
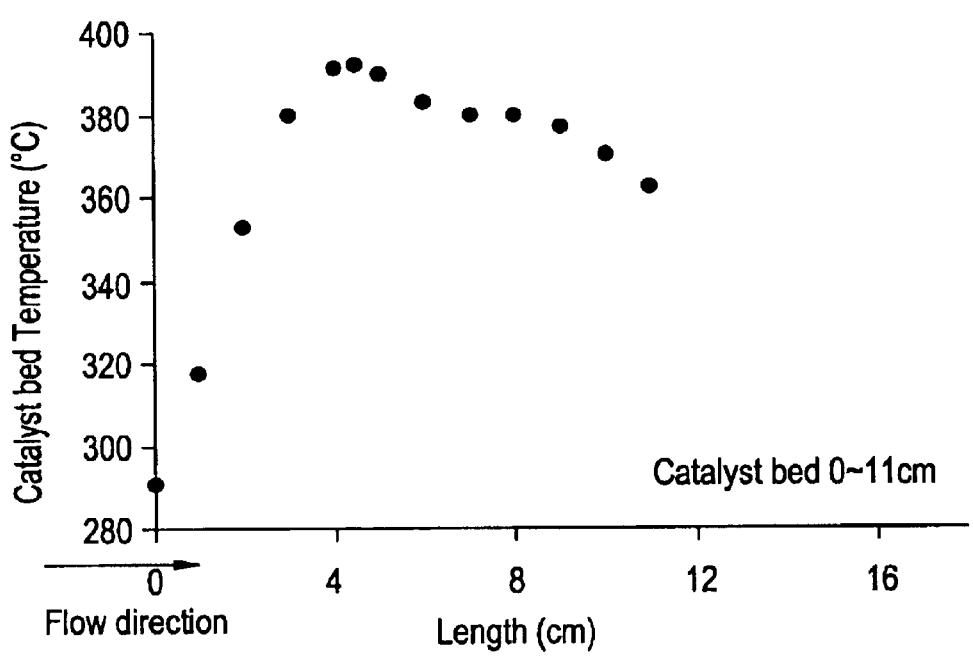

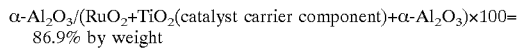

α-$Al_2O_3$/($RuO_2$+$TiO_2$(catalyst carrier component)+α-$Al_2O_3$)×100= 86.9% by weight Then, the quartz reaction tube was heated in a electric furnace and the hydrogen chloride gas (593 ml/min.) and the oxygen gas (300 ml/min.) were supplied. 1 Hour and 15 minutes after the beginning of the supply of hydrogen chloride and oxygen, when the temperature of the electric furnace was 306° C., the maximum temperature (hot spot) of the catalyst bed was exhibited at the point of 4.5 cm from the catalyst bed inlet and the internal temperature became stable at 391° C. The temperature distribution of the catalyst bed was as shown in FIG. 8. The gas at the reaction outlet was sampled by passing it through an aqueous 30% potassium iodide solution, and then the amount of chlorine formed and amount of the non-reacted hydrogen chloride were respectively determined by iodometric titration and neutralization titration. As a result, the conversion of hydrogen chloride was 74.9% and the formation activity of chlorine per unit weight of the catalyst was 14.9 mol chlorine/1-catalyst system·h.

EXAMPLE 21

The controllability of the reaction temperature of the mixture catalyst system which comprises the molding of ruthenium oxide catalyst supported on titanium oxide and the molding of α-alumina was evaluated. That is, 80.1 g of the resulting 6.6 wt % ruthenium oxide catalyst supported on titanium oxide(anatase crystal) obtained by the same production process of example 20 was sufficiently mixed with 88.3 g of α-alumina (SSA995, sphere of 2 mm in size, manufactured by Nikkato Co., Ltd.) and was charged in a nickel reaction tube (inner diameter: 18 mm ø, outer diameter of sheath tube for thermocouple e: 5 mm ø). The length of the catalyst system bed was 54 cm.

Incidentally, the calculated value of the content of ruthenium oxide as the active component (A) of the catalyst was as follows.

$$RuO_2/(RuO_2+TiO_2(\text{catalyst carrier component})+\alpha\text{-}Al_2O_3)\times100=3.2\% \text{ by weight}$$

α-$Al_2O_3$ shows that thermal conductivity of solid phase is 23 W/m·° C. measured at 200° C. The calculated value of the content of α-alumina as the component (B) of the catalyst system was as follows.

$$\alpha\text{-}Al_2O_3/(RuO_2+TiO_2(\text{catalyst carrier component})+\alpha\text{-}Al_2O_3)\times100=52.4\% \text{ by weight}$$

Then, the nickel reaction tube was heated in a salt bath of sodium nitrite and potassium nitrate and the hydrogen chloride gas (6.1 l/min.) and the oxygen gas (3.05 l/min.) were supplied. 1.6 Hours after the beginning of the reaction, when the temperature of the salt bath is 280° C., the maximum temperature of the catalyst bed is exhibited at the point which is 10 cm from the catalyst bed inlet and the internal temperature (hot spot) became stable at 291° C. Furthermore, the bath temperature was raised by 21° C. over 43 minutes to make it constant at 301° C. As a result, the internal temperature became stable at 322° C. Furthermore, the bath temperature was raised by 14° C. over 1 hour and 40 minutes to make it constant at 315° C. As a result, the internal temperature became stable at 355° C. Even after 15 minutes, the bath temperature was constant at 315° C. and the internal temperature was stable at 355° C. and the temperature was satisfactorily controlled.

EXAMPLE 22

A catalyst was prepared by the following process That is, 30.0 g of a titanium oxide powder (No. 1, anatase crystal, manufactured by Catalysts & Chemicals Industries Co., Ltd.) was kneaded with 9.0 g of a crystalline cellulose (manufactured by MERCK Co.), 24.4 g of a titanium oxide sol (CSB, $TiO_2$ content: 38% by weight, manufactured by Sakai Chemical Industry Co., Ltd.) and 25.4 g of water. The kneaded one was dried at 60° C. and the resultant was molded into a rod-shaped solid. This rod-shaped solid was dried at 60° C. for 4 hours to obtain 48.8 g of a white solid. The resulting solid was heated to 500° C. under air over 3 hours and calcined at the same temperature for 5 hours to obtain 37.1 g of a white rod-shaped titanium oxide carrier. Then, the resulting solid was ground to obtain 27.0 g of a solid having a particle size of 8.6–16 mesh.

Figure 4:
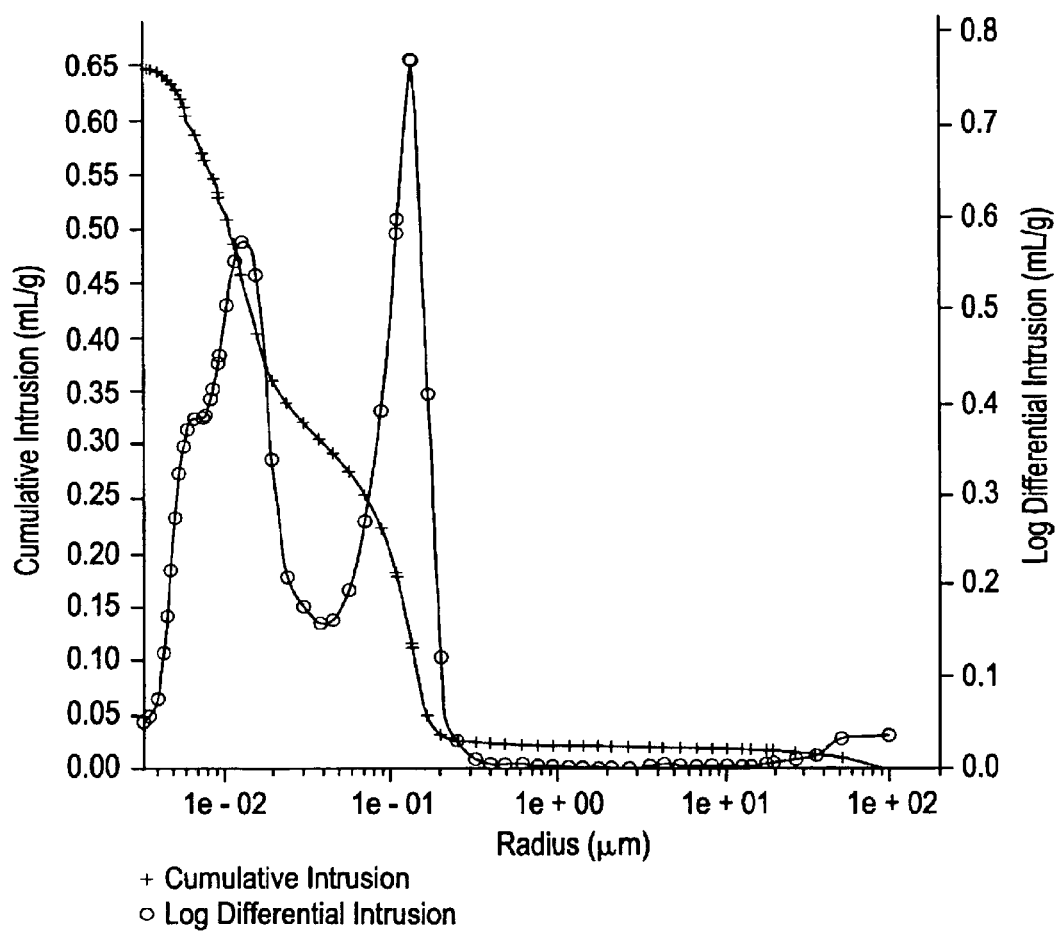

Then, 15.0 g of the titanium oxide carrier thus obtained was taken out and impregnated with a solution prepared by dissolving 2.05 g of commercially available ruthenium chloride hydrate ($RuCl_3 \cdot nH_2O$, Ru content: 37.3% by weight) in 9.0 g of pure water, and dried at 60° C. for 4 hours, thereby to support ruthenium chloride. 5.5 g of ruthenium chloride supported on the titanium oxide was taken out. Then, a solution of 1.11 g of sodium boron hydride ($NaBH_4$), 4.0 g of water and 42.1 g of ethanol was prepared. After the solution was sufficiently cooled in an ice bath, 5.5 g of the ruthenium chloride supported on titanium oxide was added and ruthenium chloride was reduced. At this time, bubbling was observed in the solution. After the bubbling was terminated, the reduced solid was separated by filtration. After washing again with 500 ml of pure water for 30 minutes, the solid was separated by filtration. This operation was repeated five times. Then, this solid was dried at 60° C. for 4 hours to obtain 5.0 g of a bluish black solid. Then, this solid was impregnated with a solution prepared by dissolving 0.60 g of potassium chloride in 2.9 g of pure water, and dried at 60° C. for 4 hours. The dried one was heated to 350° C. in an air over 1 hour and calcined at the same temperature for 3 hours. Then, the calcined solid was washed with 500 ml of pure water and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.1 g of a bluish black ruthenium oxide catalyst supported on titanium oxide having a particle size of 8.6–16 mesh. The pore radius of the resulting catalyst was within a range from 0.04 to 0.4 micrometer. The pore distribution curve of this catalyst measured by a mercury porosimeter is shown in FIG. 4.

Incidentally, the calculated value of the content of ruthenium oxide was as follows.

$$RuO_2/(RuO_2+TiO_2)\times100=6.3\% \text{ by weight}$$

The calculated value of the content of ruthenium was as follows.

$$Ru/(RuO_2+TiO_2)\times100=4.8\% \text{ by weight}$$

According to the same reaction manner as that described in Example 2 except that 2.5 g of the ruthenium oxide catalyst supported on titanium oxide thus obtained was charged in a reaction tube in the same manner as that in Example 2 and that the hydrogen chloride as (187 ml/min.) and the oxygen gas (199 ml/min.) was passed through the reaction tube and the internal temperature was adjusted to 301° C., the reaction was conducted. 2.0 Hours after the beginning of the reaction, the formation activity of chlorine per unit weight of the catalyst was $4.87\times10^{-4}$ mol/min·g-catalyst.

EXAMPLE 23

A catalyst was prepared by the following process. That is, 26.5 g of a titanium oxide powder (No. 1, manufactured by Catalysts & Chemicals Industries Co., Ltd.) was kneaded with 8.0 g of a fibrous cellulose (filter paper 5B, manufactured by Toyo Roshi Kaisha Ltd.) dispersed in water, 20.9 g of a titanium oxide sol (CSB, $TiO_2$ content: 38% by weight, manufactured by Sakai Chemical Industry Co., Ltd.) and water. The kneaded one was dried at 60° C. and the resultant was molded into a rod-shaped solid. This rod-shaped solid was dried at 60° C. for 4 hours to obtain 41.1 g of a white solid. The resulting solid was heated to 500° C.

under air over 3 hours and calcined at the same temperature for 5 hours to obtain 31.5 g of a white rod-shaped titanium oxide cattier. Then, the resulting solid was ground to obtain 20.4 g of a solid having a particle size of 8.6–16 mesh.

Figure 5:
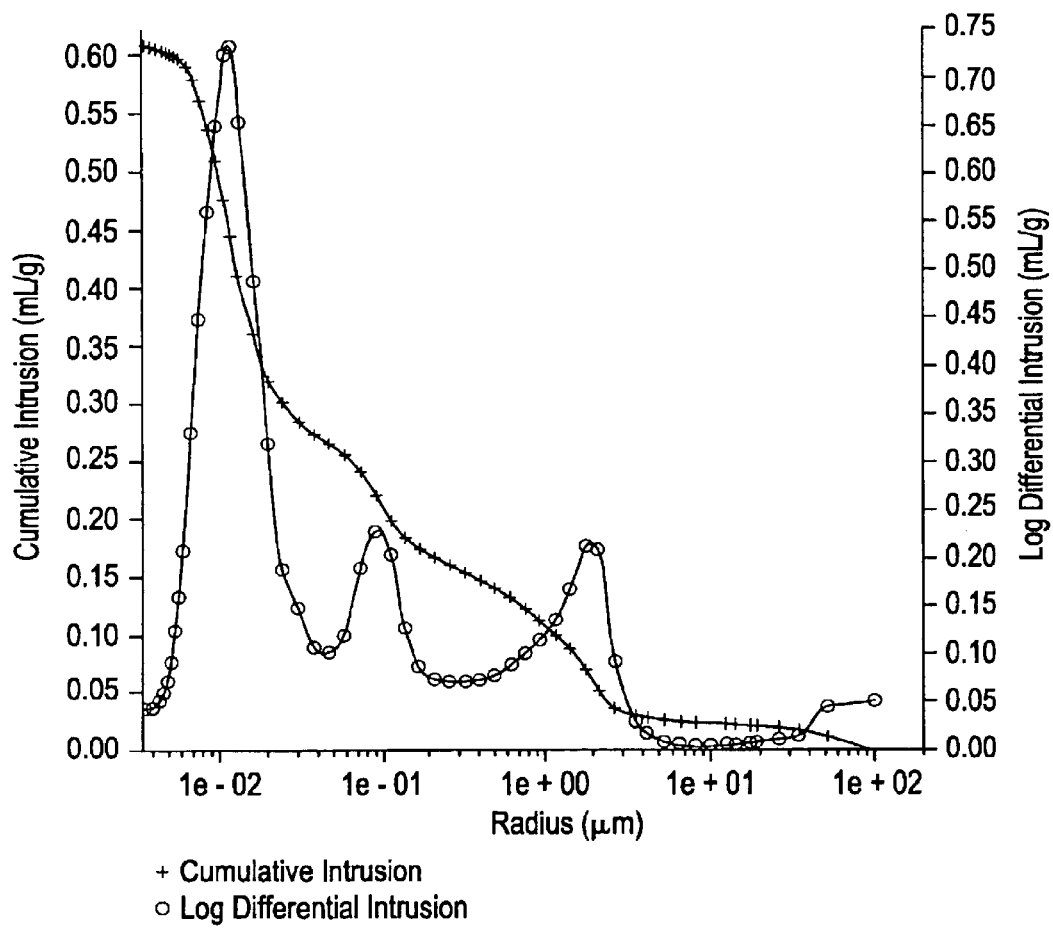

Then, 5.0 g of the titanium oxide carrier thus obtained was taken out and impregnated with a solution prepared by dissolving 0.73 g of commercially available ruthenium chloride hydrate ($RuCl_3 \cdot n_2O$, Ru content: 35.5% by weight) in 2.8 g of pure water, and dried at 60° C. for 2 hours, thereby to support ruthenium chloride. Then, a solution of 0.52 g of sodium boron hydride ($NaBH_4$), 2.0 g of water and 40.0 g of ethanol was prepared. After the solution was sufficiently cooled in an ice bath, an already prepared ruthenium chloride supported on titanium oxide was added and ruthenium chloride was reduced. At this time, bubbling was observed in the solution. After the bubbling was terminated, the supernatant was separated by decantation. 200 ml of water was added to the reduced solid, followed by decantation. This operation was repeated five times. After adding 200 ml of water, the pH was 9.4. The pH was then adjusted to 7.1 by pouring 4.0 g of 0.1 N HCl into this solution. The supernatant was removed by decantation. After washing again with 500 ml of pure water for 30 minutes, the solid was separated by filtration. This operation was repeated five times. The pH of the filtrate at the fifth time was 7.1. Then, this solid was dried at 60° C. for 4 hours to obtain 5.0 g of a bluish black solid. Then, this solid was impregnated with a solution prepared by dissolving 0.20 g of potassium chloride in 2.8 g of pure water, and dried at 60° C. for 4 hours. The dried one was heated to 350° C. under air over 1 hour and calcined at the same temperature for 3 hours. Then, the calcined solid was washed with 500 ml of pure water and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 4.9 g of a bluish black ruthenium oxide catalyst supported on titanium oxide having a particle size of 8.6–16 mesh. The pore radius of the resulting catalyst was within a range from 0.04 to 5 micrometer. The pore distribution curve of this catalyst measured by a mercury porosimeter is shown in FIG. 5.

Incidentally, the calculated value of the content of ruthenium oxide was as follows.

$RuO_2/(RuO_2+TiO_2) \times 100 = 6.3\%$ by weight

The calculated value of the content of ruthenium was as follows.

$Ru/(RuO_2+TiO_2) \times 100 = 4.8\%$ by weight

According to the same reaction manner as that described in Example 2 except that 2.5 g of the ruthenium oxide catalyst supported on titanium oxide thus obtained was charged in a reaction tube in the same manner as that in Example 2 and that the hydrogen chloride as (187 ml/min.) and the oxygen gas (199 ml/min.) was passed through the reaction tube, the reaction was conducted. 2.0 Hours after the beginning of the reaction, the formation activity of chlorine per unit weight of the catalyst was $4.62 \times 10^{-4}$ mol/min.g-catalyst.

EXAMPLE 24

A catalyst was prepared by the following process. That is, 40.3 g of a titanium oxide powder (No. 1, manufactured by Catalysts & Chemicals Industries Co., Ltd.) was kneaded with 12.8 g of a fibrous cellulose (filter paper 5B, manufactured by Toyo Roshi Kaisha Ltd.) dispersed in water, 31.5 g of a titanium oxide sol (CSB, $TiO_2$ content: 38% by weight, manufactured by Sakai Chemical Industry Co., Ltd.) and water. The kneaded one was dried at 60° C. and the resultant was molded into a rod-shaped solid. This rod-shaped solid was dried at 60° C. for 4 hours to obtain 64.3 g of a white solid. The resulting solid was heated to 500° C. under air over 3 hours and calcined at the same temperature for 5 hours to obtain 48.5 g of a white rod-shaped titanium oxide cattier. Then, the resulting solid was ground to obtain 28.0 g of a solid having a particle size of 8.6–16 mesh.

Figure 6:
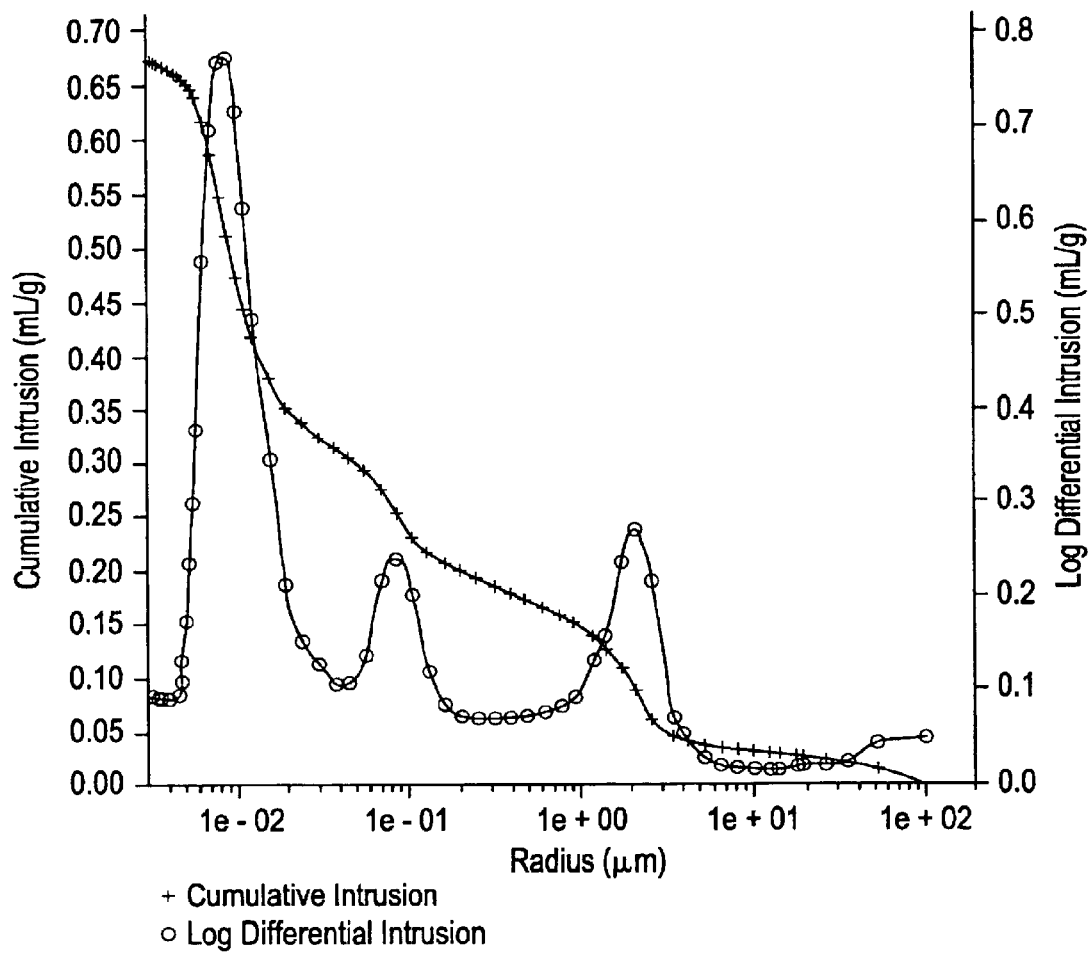

Then, 5.1 g of the titanium oxide carrier thus obtained was taken out and was impregnated with a 0.5N potassium hydroxide solution until water oozed out on the surface of the carrier, and then dried at 60° C. for 2 hour. The impregnation amount of the aqueous potassium hydroxide solution was 3.6 g at this time. The resulting carrier was impregnated with a solution prepared by dissolving 0.71 g of commercially available ruthenium chloride hydrate ($RuCl_3 \cdot nH_2O$, Ru content: 35.5% by weight) in 3.0 g of ethanol, and immediately dried at 60° C. for 2 hours, thereby to support ruthenium chloride. Then, a solution of 0. 55 g of sodium boron hydride ($NaBH_4$) 2.0 g of water and 42.3 g of ethanol was prepared. After the solution was sufficiently cooled in an ice bath, an already prepared ruthenium chloride supported on titanium oxide was added and ruthenium chloride was reduced. At this time, bubbling was observed in the solution. After the bubbling was terminated, the supernatant was removed by decantation. 200 ml of water was added to the reduced solid, followed by decantation. This operation was repeated five times After adding 200 ml of water, the pH was 9.2. The pH was then adjusted to 6.7 by pouring 3.6 g of 0.1N HCl into this solution. The supernatant was removed by decantation. After washing again with 500 ml of pure water for 30 minutes, the solid was separated by filtration. This operation was repeated five times. Then, this solid was dried at 60° C. for 4 hours to obtain 5.2 g of a bluish black solid. Then, this solid was impregnated with a solution prepared by dissolving 0.63 g of potassium chloride in 3.2 g of pure water, and dried at 60° C. for 4 hours. The dried one was heated to 350° C. under air over 1 hour and calcined at the same temperature for 3 hours. Then, the calcined solid was washed with 500 ml of pure water and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.1 g of a bluish black ruthenium oxide catalyst supported on titanium oxide having a particle size of 8.6–16 mesh. The pore radius of the resulting catalyst was within a range from 0.04 to 6 micrometer. The pore distribution curve of this catalyst measured by a mercury porosimeter is shown in FIG. 6.

Furthermore, the thickness of the $RuO_2$ layer was measured by using a magnifying glass having graduation. As a result, ruthenium oxide was supported at the location which is 0.3 mm from the outer surface. The measured particle size of the catalyst was 1.5 mm. With respect to the range S/L wherein ruthenium oxide is supported on the surface of the catalyst, L and S were determined as described above. As a result, the calculated value of S/L was 0.2.

Incidentally, the calculated value of the content of ruthenium oxide was as follows.

$RuO_2/(RuO_2+TiO_2) \times 100 = 6.2\%$ by weight

The calculated value of the content of ruthenium was as follows.

Ru/(RuO$_2$+TiO$_2$)×100=4.7% by weight

According to the same reaction manner as that described in Example 2 except that 2.5 g of the ruthenium oxide catalyst supported on titanium oxide thus obtained was charged in a reaction tube in the same manner as that in Example 2 and that the hydrogen chloride gas (195 ml/min.) and the oxygen gas (198 ml/min.) was passed through the reaction tube, the reaction was conducted. 2.0 Hours after the beginning of the reaction, the formation activity of chlorine per unit weight of the catalyst was 4.30×10$^{-4}$ mol/min.g-catalyst.

EXAMPLE 25

A catalyst was prepared by the following process. That is, 5.1 g of a spherical (1–2 mm ø in size) titanium oxide carrier (CS300S-12, manufactured by Sakai Chemical Industry Co., Ltd.) was impregnated with a 2 mol/l ammonium hydrogencarbonate solution until water oozed out on the surface of the carrier, and then dried at 60° C. for 2 hour. The resulting carrier was impregnated with a solution prepared by dissolving 0.71 g of commercially available ruthenium chloride hydrate (RuCl$_3$.nH$_2$O, Ru content: 35.5% by weight) in 2.2 g of ethanol, and immediately dried at 60° C. for 2 hours, thereby to support ruthenium chloride. Then, a solution of 0.50 g of sodium boron hydride (NaBH$_4$) and 60.9 g of ethanol was prepared. After the solution was sufficiently cooled in an ice bath, an already prepared ruthenium chloride supported on titanium oxide was added and ruthenium chloride was reduced. At this time, bubbling was observed in the solution. After the bubbling was terminated, the supernatant was removed by decantation. 200 ml of water was added to the reduced solid, followed by decantation. This operation was repeated five times. After adding 200 ml of water, the pH was 4.5. The added pure water was removed by decantation. After washing again with 500 ml of pure water for 30 minutes, the solid was separated by filtration. This operation was repeated five times. The pH of the wash at the fifth time was 5.2. Then, this solid was dried at 60° C. for 4 hours to obtain 5.4 g of a bluish black solid. Then, this solid was impregnated with a solution prepared by dissolving 0.19 g of potassium chloride in 1.9 g of pure water, and dried at 60° C. for 4 hours. The dried one was heated to 350° C. under air over 1 hour and calcined at the same temperature for 3 hours. Then, the calcined solid was washed with 500 ml of pure water for 30 minutes and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.4 g of a black ruthenium oxide catalyst supported on titanium oxide. Furthermore, the thickness of the RuO$_2$ layer was measured by EPMA. As a result, ruthenium oxide was supported at the location which is 0.15–0.25 mm from the outer surface. The measured particle size of the catalyst was within a range from 1.4 to 1.6 mm.

The calculated value of the range S/L wherein ruthenium oxide is supported on the surface of the catalyst was within a range from 0.09 to 0.18.

Incidentally, the calculated value of the content of ruthenium oxide was as follows.

RuO$_2$/(RuO$_2$+TiO$_2$)×100=6.1% by weight

The calculated value of the content of ruthenium was as follows.

Ru/(RuO$_2$+TiO$_2$)×100=4.6% by weight

According to the same reaction manner as that described in Example 2 except that 2.5 g of the ruthenium oxide catalyst supported on titanium oxide thus obtained was charged in a reaction tube in the same manner as that in Example 2 and that the hydrogen chloride as (187 ml/min.) and the oxygen gas (199 ml/min.) was passed through the reaction tube and the internal temperature was adjusted to 302° C., the reaction was conducted. 2.0 Hours after the beginning of the reaction, the formation activity of chlorine per unit weight of the catalyst was 4.47×10$^{-4}$ mol/min.g-catalyst.

EXAMPLE 26

A catalyst was prepared by the following process. That is, 5.0 g of a spherical (1–2 mm ø in size) titanium oxide carrier (CS300S-12, manufactured by Sakai Chemical Industry Co., Ltd.) was impregnated with a 2 mol/l ammonium carbonate solution until water oozed out on the surface of the carrier, and then dried at 60° C. for 2 hours. The resulting carrier was impregnated with a solution prepared by dissolving 0.70 g of commercially available ruthenium chloride hydrate (RuCl$_3$.nH$_2$O, Ru content: 35.5% by weight) in 1.5 g of ethanol, and immediately dried at 60° C. for 2 hours, thereby to support ruthenium chloride. Then, a solution of 0.50 g of sodium boron hydride (NaBH$_4$), 2.1 g of water and 41.1 g of ethanol was prepared. After the solution was sufficiently cooled in an ice bath, an already prepared ruthenium chloride supported on titanium oxide was added and ruthenium chloride was reduced. At this time, bubbling was observed in the solution. After the bubbling was terminated, the supernatant was removed by decantation. 200 ml of water was added to the reduced solid, followed by decantation. This operation was repeated five times. After adding 200 ml of water, the pH was 3.9. The added pure water was removed by decantation. After washing again with 500 ml of pure water for 30 minutes, the solid was separated by filtration. This operation was repeated five times. The pH of the wash at the fifth time was 5.6. Then, this solid was dried at 60° C. for 4 hours to obtain 5.3 g of a black solid. Then, this solid was impregnated with a solution prepared by dissolving 0.19 g of potassium chloride in 1.9 g of pure water, and dried at 60° C. for 4 hours. The dried one was heated to 350° C. under air over 1 hour and calcined at the same temperature for 3 hours. Then, the calcined solid was washed with 500 ml of pure water and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.2 g of a black ruthenium oxide catalyst supported on titanium oxide. Furthermore, the thickness of the RuO$_2$ layer was measured by EPMA. As a result, ruthenium oxide was supported at the location which is 0.19–0.30 mm from the outer surface. The measured particle size of the catalyst was within a range from 1.5 to 1.6 mm.

The calculated value of the range S/L wherein ruthenium oxide is supported on the surface of the catalyst was within a range from 0.13 to 0.19.

Incidentally, the calculated value of the content of ruthenium oxide was as follows.

RuO$_2$/(RuO$_2$+TiO$_2$)×100=6.2% by weight

The calculated value of the content of ruthenium was as follows.

$$Ru/(RuO_2+TiO_2) \times 100 = 4.7\% \text{ by weight}$$

According to the same reaction manner as that described in Example 2 except that 2.5 g of the ruthenium oxide catalyst supported on titanium oxide thus obtained was charged in a reaction tube in the same manner as that in Example 2 and that the hydrogen chloride as (187 ml/min.) and the oxygen gas (199 ml/min.) was passed through the reaction tube, the reaction was conducted. 2.0 Hours after the beginning of the reaction, the formation activity of chlorine per unit weight of the catalyst was $4.34 \times 10^{-4}$ mol/min.g-catalyst.

EXAMPLE 27

A catalyst was prepared by the following process. That is, 5.0 g of a spherical (1–2 mm φ in size) titanium oxide carrier (CS300S-12, manufactured by Sakai chemical Industry Co Ltd.) was impregnated with a 2.0N potassium hydroxide solution until water oozed out on the surface of the carrier, and then dried at 60° C. for 2 hours. The resulting carrier was impregnated with a solution prepared by dissolving 0.71 g of commercially available ruthenium chloride hydrate ($RuCl_3 \cdot nH_2O$, Ru content: 35.5% by weight) in 3.0 g of ethanol, and immediately dried at 60° C. for 2 hours, thereby to support ruthenium chloride. Then, a solution of 0.57 g of sodium boron hydride ($NaBH_4$), 2.0 g of water and 42.5 g of ethanol was prepared. After the solution was sufficiently cooled in an ice bath, an already prepared ruthenium chloride supported on titanium oxide was added and ruthenium chloride was reduced. At this time, bubbling was observed in the solution. After the bubbling was terminated, the supernatant was removed by decantation. 200 ml of water was added to the reduced solid, followed by decantation. This operation was repeated five times. After washing again with 500 ml of pure water for 30 minutes, the solid was separated by filtration. This operation was repeated five times. Then, this solid was dried at 60° C. for 4 hours to obtain 5.1 g of a black solid. Then, this solid was impregnated with a solution prepared by dissolving 0.19 g of potassium chloride in 1.8 g of pure water, and dried at 60° C. for 4 hours. The dried one was heated to 350° C. under air over 1 hour and calcined at the same temperature for 3 hours. Then, the calcined solid was washed with 500 ml of pure water for 30 minutes and then separated by filtration. This operation was repeated five times. After adding dropwise an aqueous silver nitrate solution to the filtrate, it was confirmed that potassium chloride is not remained. After washing, the solid was dried 60° C. for 4 hours to obtain 5.1 g of a black ruthenium oxide catalyst supported on titanium oxide. Furthermore, the thickness of the $RuO_2$ layer was measured by EPMA. As a result, ruthenium oxide was supported at the location which is 0.11–018 mm from the outer surface. The measured particle size of the catalyst was within a range from 1.5 to 1.7 mm.

The calculated value of the range S/L wherein ruthenium oxide is supported on the surface of the catalyst was within a range from 0.06 to 0.11.

Incidentally, the calculated value of the content of ruthenium oxide was as follows.

$$RuO_2/(RuO_2+TiO_2) \times 100 = 6.2\% \text{ by weight}$$

The calculated value of the content of ruthenium was as follows.

$$Ru/(RuO_2+TiO_2) \times 100 = 4.7\% \text{ by weight}$$

According to the same reaction manner as that described in Example 2 except that 2.5 g of the ruthenium oxide catalyst supported on titanium oxide thus obtained was charged in a reaction tube in the same manner as that in Example 2 and that the hydrogen chloride as (187 ml/min.) and the oxygen gas (199 ml/min.) was passed through the reaction tube, the reaction was conducted. 2.0 Hours after the beginning of the reaction, the formation activity of chlorine per unit weight of the catalyst was $4.29 \times 10^{-4}$ ml/min.g-catalyst.

EXAMPLE 28

A catalyst was prepared by the following process. That is, 122 g of chromium nitrate enneahydrate was dissolved in 600 ml of pure water and the solution was heated to 42° C. Then, 130 g of 25 wt % ammonia water was added dropwise over 2 hours with stirring, followed by stirring at the same temperature for additional 30 minutes. The formed precipitate was separate by filtration under reduced pressure. 1 liter of water was added to the formed precipitate, followed by stirring and further filtration under reduced pressure. After the precipitate was washed by repeating this operation five times, and then dried at 60° C. to obtain a bluish green solid. The resulting bluish green solid was ground, and heated under air from room temperature to 375° C. over 1 hour, and then calcined at the same temperature for 3 hours to obtain 23.5 g of a black chromium oxide powder.

Then, 0.89 g of commercially available ruthenium chloride hydrate ($RuCl_3 \cdot nH_2O$, Ru content: 35.5% by weight) was dissolved in 2.16 g of pure water to obtain an aqueous ruthenium chloride solution. 1.64 g of the resulting aqueous solution was added dropwise until the pores of the 6.0 g of chromium oxide are nearly impregnated with the aqueous solution, followed by drying at 60° C. Then, 1.40 g of the remaining aqueous ruthenium chloride solution was added dropwise to the chromium oxide carrier, thereby to support the total amount of ruthenium chloride by impregnation to obtain a black powder. The resulting black powder was dried in an air at 60° C., heated under air from room temperature to 350° C. over 1 hour, and then calcined at the same temperature for 3 hours to obtain 6.3 g of a black powder. The resulting powder was molded to adjust the particle size to 12–18.5 mesh, thereby to obtain a calcined catalyst of ruthenium chloride supported on chromium oxide.

Incidentally, the calculated value of the content of ruthenium oxide was as follows.

$$RuO_2/(RuO_2+TiO_2) \times 100 = 6.5\% \text{ by weight}$$

The calculated value of the content of ruthenium was as follows.

$$Ru/(RuO_2+TiO_2) \times 100 = 4.9\% \text{ by weight}$$

According to the same reaction manner as that described in Example 2 except that the catalyst was diluted by sufficiently mixing 2.5 g of the calcined ruthenium chloride supported on chromium oxide thus obtained with 5 g of a titanium oxide carrier adjusted to 12–18.5 mesh and then charged in a quartz reaction tube (inner diameter: 12 mm) and that the hydrogen chloride gas (200 ml/min.) and the oxygen gas (200 ml/min.) were passed through the reaction tube and the internal temperature was adjusted to 301° C., the reaction was conducted. 2.2 Hours after the beginning of the reaction, the formation activity of chlorine per unit weight of the catalyst was $6.1\times10^{-4}$ mol/min.g-catalyst. The formation activity of chlorine per unit weight of Ru was $124\times10^{-4}$ mol/min.g-catalyst.

EXAMPLE 29

A catalyst was prepared by the following process. That is, 1.10 g of commercially available ruthenium chloride hydrate ($RuCl_3.nH_2O$, Ru content: 35.5% by weight) was dissolved in 1000 ml of an aqueous 0.1 mol/l hydrochloric acid solution, and the solution was allowed to stand for 30 minutes. Then, 7.5 g of the chromium oxide powder obtained in Example 30 was suspended in this solution and the pH was adjusted to 4.5 by adding an aqueous 0.1 mol/l potassium hydroxide solution with stirring, thereby precipitation-supporting ruthenium on chromium oxide Then, this suspension was heated to 60° C. with adjusting the pH to 4.5, and then stirred for 5 hours. After the completion of stirring, the suspension was air-cooled to not more than 40° C., filtered under reduced pressure, and then dried at 60° C. to obtain a solid. The solid was ground, heated under air from room temperature to 170° C. over 1 hour, and then calcined at the same temperature for 8 hours. The calcined one was heated under air from room temperature to 375° C. over 1 hour, and then calcined at the same temperature for 8 hours. 7.6 g of the resulting black powder was washed with 0.5 liter of pure water ten times over 1 day, and then dried under air at 60° C. over 8 hours to obtain 7.1 g of a black powder. The resulting powder was molded to adjust the particle size to 12–18.5 mesh, thereby to obtain a catalyst of ruthenium oxide supported on chromium oxide.

Incidentally, the calculated value of the content of ruthenium oxide was as follows.

$RuO_2/(RuO_2+Cr_2O_3)\times100=6.4\%$ by weight

The calculated value of the content of ruthenium was as follows.

$Ru/(RuO_2+Cr_2O_3)\times100=4.9\%$ by weight

According to the same reaction manner as that described in Example 2 except that the catalyst was diluted by sufficiently mixing 2.5 g of the ruthenium oxide supported on chromium oxide thus obtained with 5 g of a titanium oxide carrier adjusted to 12–18.5 mesh and then charged in a quartz reaction tube (inner diameter: 12 mm) and that the hydrogen chloride gas (187 ml/min.) and the oxygen gas (194 ml/min.) were passed through the reaction tube, the reaction was conducted. 2.0 Hours after the beginning of the reaction, the formation activity of chlorine per unit weight of the catalyst was $4.75\times10^{-4}$ mol/min.g-catalyst. The formation activity of chlorine per unit weight of Ru was $97.6\times10^{-4}$ mol/min.g-catalyst.

COMPARATIVE EXAMPLE 1

A catalyst was prepared by the following process. That is, 0.70 g of a commercially available ruthenium chloride hydrate ($RuCl_3.3H_2O$, Ru content: 35.5%) was dissolved in 4.0 g of water. After the aqueous solution was sufficiently stirred, 5.0 g of silica (Cariact G-10, manufactured by Fuji Silysia Chemical Co., Ltd.) obtained by adjusting a particle size to 12 to 18.5 mesh and drying under air at 500° C. for 1 hour, was impregnated with the solution of ruthenium chloride dropwise, thereby to support ruthenium chloride by impregnation. The supported one was heated from room temperature to 100° C. under a nitrogen flow (100 ml/min.) over 30 minutes, dried at the same temperature for 2 hours, and then air-cooled to room temperature to obtain a black solid. The resulting solid was heated from room temperature to 250° C. over 1 hour and 30 minutes under an air flow of 100 ml/min., dried at the same temperature for 3 hours and then air-cooled to room temperature to obtain 5.37 g of black ruthenium chloride catalyst supported on silica. Incidentally, the calculated value of the content of ruthenium was as follows.

$Ru/(RuCl_3.3H_2O+SiO_2)\times100=4.5\%$ by weight

According to the same manner as that described in Example 2 except that 2.5 g of the ruthenium chloride catalyst supported on silica thus obtained was charged in a reaction tube without being diluted with a titanium oxide carrier in the same manner as that in Example 2 and that the hydrogen chloride gas (202 ml/min.) and the oxygen gas (213 ml/min.) were passed through the reaction tube and the internal temperature was adjusted to 300° C., the reaction was conducted. 1.7 Hours after the beginning of the reaction, the formation activity of chlorine per unit weight of the catalyst was $0.49\times10^{-4}$ mol/min.g-catalyst.

COMPARATIVE EXAMPLE 2

A catalyst was prepared by the following process. That is, 8.0 g of a powder obtained by grinding a spherical titanium oxide (CS-300, manufactured by Sakai Chemical Industry Co., Ltd.) in a mortar was sufficiently mixed with 0.53 g of a ruthenium dioxide powder (manufactured by NE Chemcat Co., Ltd.) with grinding in a mortar, and then molded to adjust the particle size to 12–18.5 mesh, thereby to obtain a ruthenium oxide-titanium oxide mixed catalyst. Incidentally, the calculated value of the content of ruthenium oxide was 6.2% by weight. The calculated value of the content of ruthenium was 4.7% by weight.

According to the same manner as that described in Example 2 except that 2.5 g of the ruthenium oxide-titanium oxide mixed catalyst thus obtained was charged in the reaction tube in the same manner as that in Example 2 and that the hydrogen chloride gas (199 ml/min.) and the oxygen gas (194 ml/min.) were passed through the reaction tube and the internal temperature was adjusted to 299° C., the reaction was conducted. 2.3 Hours after the beginning of the reaction, the formation activity of chlorine per unit weight of the catalyst was $0.83\times10^{-4}$ mol /min.g-catalyst.

COMPARATIVE EXAMPLE 3

A catalyst was prepared by the following process. That is, 41.7 g of commercially available tetraethyl orthosilicate was dissolved in 186 ml of ethanol and 56.8 g of titanium tetraisopropoxide was poured into the solution. After stirring at room temperature for 30 minutes, an aqueous solution which is obtained by sufficiently mixing an aqueous 0.01 mol/l acetic acid solution, prepared by dissolving 0.14 g of acetic acid in 233 ml of pure water, with 93 ml of ethanol was added dropwise. As the solution added dropwise, a white precipitate was produced. After the completion of the dropwise addition, the solution was stirred at room temperature for 1 hour, heated with stirring and then refluxed on an oil bath at 102° C. for 1 hour. The temperature of the solution at this time was 80° C. This solution was air-cooled, filtered with a glass filer, washed with 500 ml of pure water and then filtered again. After this operation was repeated twice, the resultant was dried under air at 60° C. for 4 hour, heated from room temperature to 550° C. for 1.5 hour and then calcined at the same temperature for 3 hours to obtain 27.4 g of a white solid. The resulting solid was ground to obtain a titania silica powder.

The resulting titania silica powder (8.0 g) was impregnated with a solution prepared by dissolving 1.13 g of a commercially available ruthenium chloride hydrate ($RuCl_3 \cdot nH_2O$, Ru content: 35.5%) in 8.2 g of water, followed by drying in air at 60° C. for 1 hour to support ruthenium chloride. The supported one was heated from room temperature to 300° C. under a mixed flow of hydrogen (50 ml/min.) and nitrogen (100 ml/min.) over 1.5 hour, reduced at the same temperature for 1 hour and then air-cooled to room temperature to obtain 8.4 g of a grayish brown metal ruthenium supported on titania silica powder.

The resulting metal ruthenium supported on titania silica powder (8.4 g) was heated from room temperature to 600° C. under air flow over 3 hours and 20 minutes and then calcined at the same temperature for 3 hours to obtain 8.5 g of a gray powder. The resulting powder was molded to adjust the particle size to 12 to 18.5 mesh, thereby to obtain a ruthenium oxide catalyst supported on titania silica.

Incidentally, the calculated value of the content of ruthenium oxide was as follows.

$RuO_2/(RuO_2+TiO_2+SiO_2) \times 100 = 6.2\%$ by weight

The calculated value of the content of ruthenium was as follows.

$Ru/(RuO_2+TiO_2+SiO_2) \times 100 = 4.7\%$ by weight

According to the same reaction manner as that described in Example 2 except that the ruthenium oxide catalyst supported on titania silica (2.5 g) thus obtained was charged in a reaction tube without diluting with the titanium oxide carrier in the same manner as that described in Example 2 and that the hydrogen chloride gas (180 ml/min.) and the oxygen gas (180 ml/min.) were passed through the reaction tube, the reaction was conducted. 1.8 Hours after the beginning of the reaction, the formation activity of chlorine per unit weight of the catalyst was $0.46 \times 10^{-4}$ mol/min.g-catalyst.

COMPARATIVE EXAMPLE 4

A catalyst was prepared by the following process. That is, 60.3 g of chromium nitrate enneahydrate was dissolved in 600 ml of water and the solution was heated to 45° C. Then, 64.9 g of 25 wt % ammonia water was added dropwise over 1.5 hours with stirring, followed by stirring at the same temperature for additional 30 minutes. 3.3 liter of water was added to the formed precipitate and, after allowing to stand overnight to cause sedimentation, the supernatant was removed by decantation. Then, 2.7 liter of water was added, followed by stirring sufficiently for 30 minutes. The precipitate was washed by repeating this operation five times. After the precipitate was washed, the supernatant was removed by decantation. Then, 49 g of 20 wt % silica sol was added and, after stirring, the mixture was evaporated to dryness at 60° C. using a rotary evaporator. The resultant was dried at 60° C. for 8 hours and then dried at 120° C. for 6 hours to obtain a green solid. Then, this solid was calcined in air at 600° C. for 3 hours and then molded to obtain a $Cr_2O_3$—$SiO_2$ catalyst of 12.5 to 18 mesh.

According to the same reaction manner as that described in Example 2 except that 2.5 g of the $Cr_2O_3$—$SiO_2$ catalyst thus obtained was charged in the reaction tube without being diluted with a titanium oxide carrier in the same manner as that described in Example 2 and that the oxygen gas (200 ml/min.) was passed through the reaction tube and the internal temperature was adjusted to 301° C., the reaction was conducted. 3.7 Hours after the beginning of the reaction, the formation activity of chlorine per unit weight of the catalyst was $0.19 \times 10^{-4}$ mol/min.g-catalyst.

COMPARATIVE EXAMPLE 5

A catalyst was prepared by the following process. That is, 10.1 g of a spherical (1–2 mm in size) titanium oxide carrier (CS-300S-12, manufactured by Sakai Chemical Industry Co., Ltd.) was impregnated with a solution prepared previously by dissolving 1.34 g of commercially available ruthenium chloride ($RuCl_3 \cdot nH_2O$, Ru content 37.3% by weight) in 3.7 g of pure water, and then dried at 60° C. for 4 hours. As a result, a blackish brown solid was obtained. To reduce this solid with hydrogen, the solid was heated from room temperature to 250° C. under a mixed gas flow of hydrogen (20 ml/min.) and nitrogen (200 ml/min.) over 2 hours, and then reduced at the same temperature for 8 hours. After the reduction, 10.3 g of a black solid was obtained. Then, the resulting solid was heated to 350° C. under air over 1 hour, and then calcined at the same temperature for 3 hours. As a result, 10.6 g of a black ruthenium oxide catalyst supported on titanium oxide was obtained. Incidentally, the calculated value of the content of ruthenium oxide was as follows.

$RuO_2/(RuO_2+TiO_2) \times 100 = 61\%$ by weight

The calculated value of the content of ruthenium was as follows.

$Ru/(RuO_2+TiO_2) \times 100 = 4.7\%$ by weight

X-ray diffraction analysis of the titanium oxide used was conducted under the same conditions as those of Example 1. As a result, the content of the rutile crystal was 0%.

According to the same reaction manner as that described in Example 2 except that 2.5 g of the ruthenium oxide catalyst supported on titanium oxide thus obtained was charged in the reaction tube in the same manner as that described in Example 2 and that the hydrogen chloride (187 ml/min.) and the oxygen gas (199 ml/min.) were passed through the reaction tube, the reaction was conducted. 2.0 Hours after the beginning of the reaction, the formation activity of chlorine per unit weight of the catalyst was $2.89 \times 10^{-4}$ mol/min.g-catalyst.

COMPARATIVE EXAMPLE 6

A catalyst was prepared by the following process. That is, 10.0 g of a spherical (1–2 mm in size) 5 wt % supported metal ruthenium-titanium oxide catalyst (manufactured by N.E. Chemcat Co., Ltd.) was impregnated with an aqeous 0.5 mol/l of potassium chloride solution until water oozed out on the surface of the catalyst, and then dried at 60° C. for 1 hour. This operation was repeated twice. The impregnation amount of the aqueous potassium chloride solution was 3.31 g at the first time, and 3.24 g at the second time. The total amount was 6.55 g. The calculated value of the molar ratio of potassium chloride to ruthenium was 0.66. Then, the resulting solid was dried. The dried one was heated to 350° C. under air over 1 hour, and then calcined at the same temperature for 3 hours. Then, the resulting solid was washed with 500 ml of pure water for 30 minutes and filtered off. This operation was repeated five times. An aqueous silver nitrate solution was added dropwise to the filtrate and it was confirmed that potassium chloride is not remained.

After washing, the solid was dried at 60° C. for 4 hours to obtain 9.9 g of a spherical black ruthenium oxide catalyst supported on titanium oxide. Incidentally, the calculated value of the content of ruthenium oxide was as follows.

$RuO_2/(RuO_2+TiO_2)\times100=6.6\%$ by weight

The calculated value of the content of ruthenium was as follows.

$Ru/(RuO_2+TiO_2)\times100=5.0\%$ by weight

According to the same reaction manner as that described in Example 2 except that the catalyst was diluted by sufficiently mixing 2.5 g of the ruthenium oxide catalyst supported on titanium oxide thus obtained with titanium oxide carrier and then charged in a quartz reaction tube (inner diameter: 12 mm) and that the hydrogen chloride (187 ml/min.) and the oxygen gas (199 ml/min.) were passed through the reaction tube, the reaction was conducted. 2.0 Hours after the beginning of the reaction, the formation activity of chlorine per unit weight of the catalyst was $4.03\times10^{-4}$ mol/min.g-catalyst.

COMPARATIVE EXAMPLE 7

40.1 g of a 6.6 wt % ruthenium oxide catalyst supported on titanium oxide (anatase crystal) obtained in the same manner as that described in Example 20 was charged in the same reaction tube as that in Example 18, and then heated in the same salt bath. The length of the catalyst bed was 9.2 cm.

Incidentally, the calculated value of the content of ruthenium oxide as the active component (A) of the catalyst was 6.6% by weight.

According to the method for evaluation of the controllability of the reaction temperature of Example 18, the reaction was conducted. The hydrogen chloride gas (0.88 l/min.) and the oxygen gas (0.53 l/min.) were supplied. 5.5 Hours after the beginning of the reaction, the bath temperature became constant at 276° C. and the internal temperature (hot spot) became stable at 301.5° C. The conversion of hydrogen chloride at this time was 37%. Even after 50 minutes, the bath temperature was constant at 277° C. and the internal temperature was stable at 302.3° C. Then, the bath temperature was raised by 4° C. in total over 55 minutes to make it constant at 281° C. As a result, the internal temperature raised to 348° C. and it became difficult to control the reaction temperature. At the time when the internal temperature raised to 348° C., supply of the reaction gas was stopped and the reaction operation ended.

COMPARATIVE EXAMPLE 8

According to the same manner as that described in Example 20 except for using 65.3 g (51 ml) of a high purity quartz ball (quartz glass (thermal conductivity of a solid phase at 227° C. is 1.6 W/m·° C.) sphere of 2 mm in size, manufactured by Nikkato Co.) wherein purity of $SiO_2$ is not less than 99.99% in place of α-alumina, a catalyst system was obtained. The length of the catalyst bed in the same reaction tube as that in Example 20 was 16.5 cm.

Incidentally, the calculated value of the content of ruthenium oxide as the active component (A) of the catalyst was as follows.

$RuO_2/(RuO_2+TiO_2(\text{catalyst carrier component})+SiO_2)\times100=0.86\%$ by weight Quartz glass used is not a component (B) because thermal conductivity of a solid phase at 227° C. is 1.6W/m·° C.

According to the same manner as that described in Example 22 except that the temperature of the electric furnace was controlled so that the maximum temperature (hot spot) of the catalyst bed becomes the same temperature as that in Example 22, the reaction was conducted.

Figure 9:
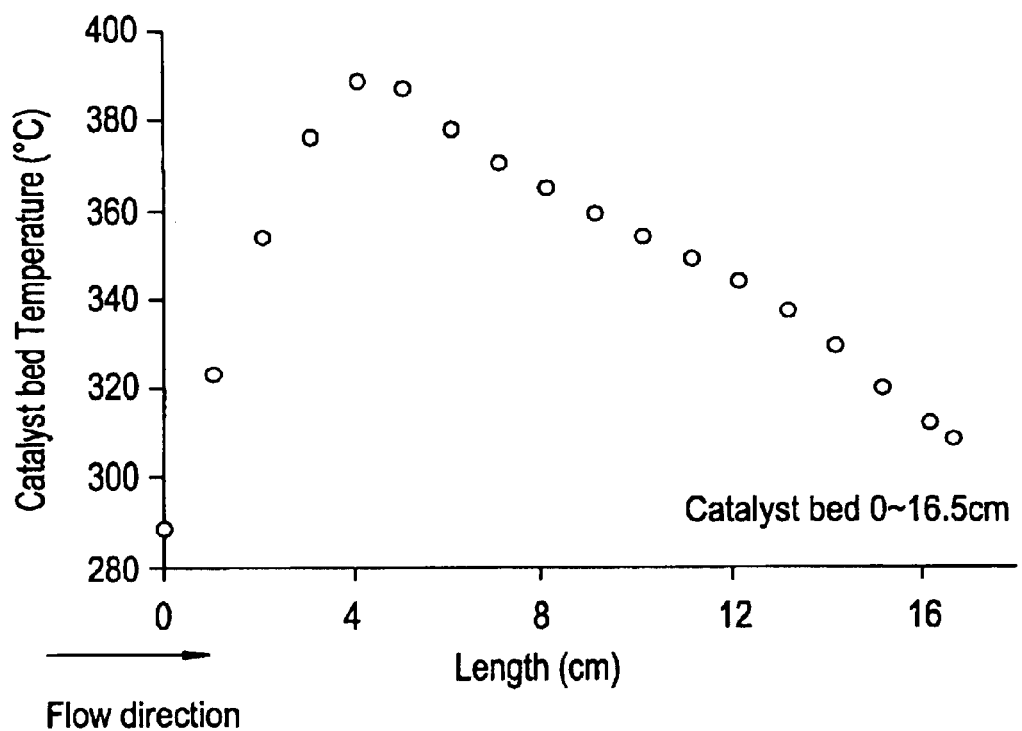

1 Hour and 15 minutes after the beginning of the supply of hydrogen chloride and oxygen, the temperature of the electric furnace became constant at 297° C. and the maximum temperature (hot spot) of the catalyst bed became stable at 390° C. at the point which is 4 cm from the catalyst bed inlet and, furthermore, the temperature distribution of the catalyst bed was as shown in FIG. 9 According to the same manner as that described in Example 20, the formation amount of chlorine and the amount of the non-reacted hydrogen chloride were measured. As a result, the conversion of hydrogen chloride was 62.3% and the formation efficiency of chlorine was 8.1 mol chlorine/l-catalyst system.h. (Results are summarized in the Table.)

TABLE

|  | Temperature of catalyst bed (° C.) (hot spot) | Conversion of hydrogen chloride[1] (%) | Formation efficiency of chlorine[2] (mol chlorine/ catalyst system.h) |
|---|---|---|---|
| Example 20 | 391 | 74.9 | 14.9 |
| comparative Example 8 | 390 | 62.3 | 8.1 |

[1]Conversion of hydrogen chloride = ((mol formed chlorine per unit time × 2)/(mol supplied chlorine per unit time )) × 100
[2]Formation efficiency of chlorine = (mol formed chlorine per unit time)/ (volume of charged catalyst system)

COMPARATIVE EXAMPLE 9

121 g of a 6.6 wt % ruthenium oxide catalyst supported on titanium oxide obtained in the same manner as that described in Example 20 was charged in the same reaction tube as that in Example 21, and then heated in the same salt bath. The length of the catalyst bed was 54 cm. Incidentally, the calculated value of the content of ruthenium oxide as the active component (A) of the catalyst was 6.6% by weight. According to the same method for evaluation of the controllability of the reaction temperature of Example 21, the reaction was conducted. The hydrogen chloride gas (6.1 l/min.) and the oxygen gas (3.05 l/min.) were supplied.

8.4 Hours after the beginning of the reaction, the bath temperature became constant at 295.5° C. and the internal temperature (hot spot) became stable at 330° C. Then, the bath temperature was raised by 5.5° C. in total over 23 minutes to make it constant at 301° C. As a result, the internal temperature raised to 350° C. and it became difficult to control the reaction temperature. At the time when the internal temperature raised to 350° C., supply of the reaction gas was stopped and the reaction operation ended.

What is claimed is:

1. A supported ruthenium oxide catalyst obtained by supporting on a titanium oxide carrier containing not less than 80% by weight of rutile titanium oxide, wherein prior to forming said catalyst the titanium oxide carrier contains an OH group bound to Ti in an amount of $3\times10^{-4}$ to $10\times10^{-4}$ mol per one gram of the titanium oxide carrier.

2. The catalyst according to claim 1, wherein the content of rutile titanium oxide is not less than 90% by weight.

3. The catalyst according to claim 1, wherein the titanium oxide carrier contains an OH group bound to Ti in an amount of $3.3\times10^{-4}$ to $10\times10^{-4}$ mol per one gram of the titanium oxide carrier.

4. The catalyst according to claim 1, which is a supported ruthenium oxide catalyst obtained by supporting a ruthenium compound on a carrier, reducing the supported one by using a reducing hydrogenated compound, and oxidizing.

5. The catalyst according to claim 1, which is a supported ruthenium oxide catalyst obtained by supporting a ruthenium compound on a carrier, treating the supported one by using a reducing compound, and oxidizing.

6. The catalyst according to claim 1, which is a supported ruthenium oxide catalyst obtained by supporting a ruthenium compound on a carrier, treating the supported one by using an alkali solution of a reducing compound, and oxidizing.

7. The catalyst according to claim 2, wherein the titanium oxide carrier contains an OH group bound to Ti in an amount of $3.3 \times 10^{-4}$ to $10 \times 10^{-4}$ mole per one gram of the titanium oxide carrier.

* * * * *